US012735911B2

(12) United States Patent
Qiao et al.

(10) Patent No.: US 12,735,911 B2
(45) Date of Patent: Sep. 15, 2026

(54) METHOD FOR CONTROLLING CLEANING DEVICE AND CLEANING DEVICE

(71) Applicant: XINGMAI INNOVATION TECHNOLOGY (SUZHOU) CO., LTD, Suzhou (CN)

(72) Inventors: Liang Qiao, Suzhou (CN); Shengle Wang, Suzhou (CN); Yang Liu, Suzhou (CN); Guanliang Liu, Suzhou (CN)

(73) Assignee: XINGMAI INNOVATION TECHNOLOGY (SUZHOU) CO., LTD, Suzhou (CN)

(*) Notice: Subject to any disclaimer, the term of this patent is extended or adjusted under 35 U.S.C. 154(b) by 0 days.

(21) Appl. No.: 19/346,504

(22) Filed: Sep. 30, 2025

(65) Prior Publication Data

US 2026/0028845 A1 Jan. 29, 2026

Related U.S. Application Data

(63) Continuation of application No. PCT/CN2025/097993, filed on May 29, 2025.

(30) Foreign Application Priority Data

May 29, 2024 (CN) ......................... 202410683326.2
Jun. 21, 2024 (WO) ................ PCT/CN2024/100765

(Continued)

(51) Int. Cl.
*E04H 4/16* (2006.01)
*C02F 1/00* (2023.01)

(Continued)

(52) U.S. Cl.
CPC ........... *E04H 4/1654* (2013.01); *C02F 1/001* (2013.01); *C02F 1/008* (2013.01); *G05D 1/6484* (2024.01);

(Continued)

(58) Field of Classification Search
CPC ....... E04H 4/1654; E04H 4/1209; E04H 4/16; E04H 4/1636; C02F 1/001; G05D 1/6484
See application file for complete search history.

(56) References Cited

U.S. PATENT DOCUMENTS 6,594,844 B2 * 7/2003 Jones .................. G05D 1/0238 15/49.1
7,155,308 B2 * 12/2006 Jones .................. G05D 1/0238 701/25

(Continued)

FOREIGN PATENT DOCUMENTS

CN 103989443 A 8/2014
CN 109124503 A * 1/2019 ............. A47L 11/28

(Continued)

OTHER PUBLICATIONS

Zhang, Lei et al.; Transition method of stair cleaning robot from stairs to middle platform and then to stairs; CN Patent No. CN103989443A; English language abstract; Aug. 20, 2014; 1 page.

(Continued)

*Primary Examiner* — Justin S Lee
(74) *Attorney, Agent, or Firm* — Soleado Law, PC

(57) ABSTRACT

The present disclosure provides a method for controlling a cleaning device and a cleaning device. The cleaning device includes a first distance sensor disposed at a bottom. The control method includes: in a process in which the cleaning device moves on a bottom of a pool, when the cleaning device approaches or collides with an obstacle, controlling the cleaning device to climb the obstacle; and in a process of climbing the obstacle, if the obstacle is determined as a step, controlling the cleaning device to move from a first surface of the step to a second surface of the step, where the step at least includes the approximately vertical first surface and the approximately horizontal second surface, where the (Continued)

obstacle is determined as the step at least based on a detection value of the first distance sensor.

21 Claims, 11 Drawing Sheets

(30) Foreign Application Priority Data

| | | |
|---|---|---|
| Nov. 29, 2024 | (WO) | PCT/CN2024/135845 |
| Jan. 6, 2025 | (WO) | PCT/CN2025/070882 |
| Jan. 19, 2025 | (WO) | PCT/CN2025/073171 |
| Jan. 21, 2025 | (WO) | PCT/CN2025/073739 |
| Jan. 24, 2025 | (WO) | PCT/CN2025/074953 |
| Mar. 26, 2025 | (WO) | PCT/CN2025/085184 |

(51) Int. Cl.

| | |
|---|---|
| ***G05D 1/648*** | (2024.01) |
| *A46B 13/00* | (2006.01) |
| *A46B 13/02* | (2006.01) |
| *C02F 103/44* | (2006.01) |
| *G05D 105/10* | (2024.01) |
| *G05D 107/00* | (2024.01) |

(52) U.S. Cl.

CPC ............. *A46B 13/001* (2013.01); *A46B 13/02* (2013.01); *A46B 2200/3073* (2013.01); *C02F 2103/44* (2013.01); *C02F 2201/008* (2013.01); *G05D 2105/10* (2024.01); *G05D 2107/29* (2024.01)

(56) References Cited

U.S. PATENT DOCUMENTS

| | | | | |
|---|---|---|---|---|
| 8,397,330 | B2 | 3/2013 | Pichon et al. | |
| 10,420,447 | B2 * | 9/2019 | Jones | A47L 9/2826 |
| 10,954,683 | B2 | 3/2021 | Adlivankin et al. | |
| 11,821,233 | B2 | 11/2023 | van der Meijden et al. | |
| 11,939,791 | B2 | 3/2024 | Witelson | |
| 2013/0091641 | A1 | 4/2013 | Ben Zion | |
| 2014/0076789 | A1 * | 3/2014 | Shlomi-Shlomi | E04H 4/1209 901/44 |
| 2014/0096329 | A1 * | 4/2014 | Garti | E04H 4/1636 15/1.7 |
| 2016/0145884 | A1 * | 5/2016 | Erlich | E04H 4/1654 15/1.7 |
| 2018/0066443 | A1 | 3/2018 | Zerweck et al. | |
| 2019/0032356 | A1 * | 1/2019 | Witelson | E04H 4/1654 |
| 2019/0345728 | A1 * | 11/2019 | Adlivankin | A47L 11/4061 |
| 2020/0095792 | A1 | 3/2020 | Miller et al. | |
| 2022/0298818 | A1 | 9/2022 | Bernini et al. | |
| 2023/0374807 | A1 | 11/2023 | Liu et al. | |
| 2024/0254796 | A1 | 8/2024 | van der Meijden et al. | |

FOREIGN PATENT DOCUMENTS

| | | | | | |
|---|---|---|---|---|---|
| CN | 109394101 | A | * | 3/2019 | A47L 13/50 |
| CN | 109441157 | A | | 3/2019 | |
| CN | 209413368 | U | | 9/2019 | |
| CN | 111003111 | A | | 4/2020 | |
| CN | 111757832 | A | * | 10/2020 | |
| CN | 211773479 | U | | 10/2020 | |
| CN | 112096133 | A | | 12/2020 | |
| CN | 212053969 | U | | 12/2020 | |
| CN | 114059811 | A | | 2/2022 | |
| CN | 114690761 | A | * | 7/2022 | G05D 1/0242 |
| CN | 115559573 | A | * | 1/2023 | E04H 4/1654 |
| CN | 218500644 | U | | 2/2023 | |
| CN | 218709488 | U | | 3/2023 | |
| CN | 115977436 | A | | 4/2023 | |
| CN | 116101463 | A | * | 5/2023 | B63C 11/52 |
| CN | 116166018 | A | * | 5/2023 | G05D 1/0214 |
| CN | 116201403 | A | | 6/2023 | |
| CN | 116280114 | A | * | 6/2023 | E04H 4/16 |
| CN | 219118889 | U | | 6/2023 | |
| CN | 219344188 | U | * | 7/2023 | |
| CN | 116594411 | A | * | 8/2023 | G05D 1/0692 |
| CN | 116607827 | A | | 8/2023 | |
| CN | 116657965 | A | * | 8/2023 | E04H 4/16 |
| CN | 219447294 | U | | 8/2023 | |
| CN | 219724005 | U | * | 9/2023 | |
| CN | 219864311 | U | * | 10/2023 | |
| CN | 116999943 | A | | 11/2023 | |
| CN | 117120696 | A | | 11/2023 | |
| CN | 219948386 | U | | 11/2023 | |
| CN | 117266637 | A | | 12/2023 | |
| CN | 117322812 | A | | 1/2024 | |
| CN | 117364727 | A | | 1/2024 | |
| CN | 117569655 | A | | 2/2024 | |
| CN | 117930840 | A | | 4/2024 | |
| CN | 119148750 | A | | 12/2024 | |
| CN | 119165878 | A | | 12/2024 | |
| CN | 222177770 | U | | 12/2024 | |
| CN | 120143809 | A | | 6/2025 | |
| CN | 120178864 | A | | 6/2025 | |
| CN | 120178865 | A | | 6/2025 | |
| EP | 2447449 | A2 | * | 5/2012 | E04H 4/1654 |
| EP | 3293326 | A1 | * | 3/2018 | E04H 4/1654 |
| EP | 3567188 | A1 | * | 11/2019 | A47L 11/4061 |
| EP | 4019712 | A1 | * | 6/2022 | E04H 4/1654 |
| ES | 2575786 | T3 | * | 7/2016 | |
| ES | 2890026 | T3 | * | 1/2022 | E04H 4/1654 |
| FR | 3026128 | A1 | * | 3/2016 | E04H 4/1654 |
| JP | 2023-38576 | A | | 3/2023 | |
| KR | 10-2014-0052413 | A | | 5/2014 | |
| KR | 10-2015-0053373 | A | | 5/2015 | |
| WO | 2023/030044 | A1 | | 3/2023 | |
| WO | 2023/165069 | | | 7/2023 | |
| WO | WO-2024093092 | A1 | * | 5/2024 | G05D 1/0242 |

OTHER PUBLICATIONS

Wu, Tingjun et al.; Swimming pool bottom cleaning machine; CN Patent No. CN109441157A; English language abstract; Mar. 8, 2019; 1 page.

Wu, Yajun et al.; Water surface cleaning robot; CN Patent No. CN111003111A; English language abstract; Apr. 14, 2020; 1 page.

Zhong, Xianyou et al., Cleaning vehicle capable of automatically cleaning swimming pool wall and cleaning method thereof, CN Patent No. CN112096133A, English language abstract, Dec. 18, 2020, 1 page.

Cha, Xiahong, et al.; Swimming pool cleaning device; CN Patent No. CN114059811A; English language abstract; Feb. 18, 2022; 1 page.

Zhang, Shilei; Pool cleaning robot; CN Patent No. CN115977436A; English language abstract; Apr. 18, 2023; 1 page.

Liu Wei et al.; Swimming pool cleaning robot; CN Patent No. CN116201403A; English language abstract; Jun. 2, 2023; 1 page.

Zhicheng Power (Beijing) Technology Co., Ltd.; Swimming pool cleaning robot with auxiliary cleaning function; CN Patent No. CN116607827A; English language abstract; Aug. 18, 2023; 1 page.

Wang, Shengle; Filter assembly and underwater cleaning equipment; CN Patent No. CN116999943A; English language abstract; Nov. 7, 2023; 1 page.

Zhang, Shilei; Walking device used in liquid and swimming pool cleaning robot; CN Patent No. CN117120696A; English language abstract; Nov. 24, 2023; 1 page.

Liu, Hanjun et al., Base, automatic cleaning device and automatic cleaning method, Espacenet, Dec. 22, 2023, 1 page.

Yue, Yunfei et al.; Base station and cleaning system; CN Patent No. CN117322812A; English language abstract; Jan. 2, 2024; 1 page.

Shenzhen UBTECH Robotics Co., Ltd.; Water surface cleaning device and swimming pool cleaning robot; CN Patent No. CN117364727A; English language abstract; Jan. 9, 2024; 1 page.

Shenzhen U-Jiyuan Technology Co., Ltd.; Swimming pool cleaning equipment; CN Patent No. CN117569655A; English language abstract; Feb. 20, 2024; 1 page.

(56) References Cited

OTHER PUBLICATIONS

Che, Lixuan et al.; Control method and device of underwater cleaning robot and underwater cleaning robot; CN Patent No. CN117930840A; English language abstract; Apr. 26, 2024; 1 page.
Wu, Tingjun et al.; Swimming pool bottom cleaning machine; CN Patent No. CN209413368U; English language abstract; Sep. 20, 2019; 1 page.
Wu, Yajun et al.; Water surface cleaning robot with good anti-collision effect; CN Patent No. CN211773479U; English language abstract; Oct. 27, 2020; 1 page.
Wu, Tingjun et al.; High-reliability pool bottom cleaning vehicle; CN Patent No. CN212053969U; English language abstract; Dec. 1, 2020; 1 page.
Liu, Yinghao et al.; Base station of cleaning equipment and cleaning system; CN Patent No. CN218500644U; English language abstract; Feb. 21, 2023; 1 page.
Zhong, Liang et al., Swimming pool cleaning robot with disinfection and sterilization functions, CN Patent No. CN218709488U; English language abstract; Mar. 24, 2023; 1 page.
Zhang, Shilei; Pool cleaning robot; CN Patent No. CN219118889U; English language abstract; Jun. 2, 2023; 1 page.
Liu, Chuanang et al.; Underwater detector with floating device; CN Patent No. CN219447294U; English language abstract; Aug. 1, 2023; 1 page.
Zhang, Shilei; Traveling assembly and cleaning robot with same; CN Patent No. CN219948386U; English language abstract; Nov. 3, 2023; 1 page.
Wang, Shengle; Bearing assembly and pool robot system; CN Patent No. CN222177770U; English language abstract, Dec. 17, 2024; 1 page.
Nitta, Akihiko; Autonomous Travel Cleaning Device; JP Patent No. JP2023038576A; English language abstract; Mar. 17, 2023; 1 page.
Ryu, Sung Moo et al.; Apparatus of Cleaning Bottom of Water Container; English language abstract; KR Patent No. KR20140052413A; English language abstract; May 7, 2014; 1 page.
Lee, Seok Woo et al.; Underwater Cleaning Robot; KR Patent No. KR20150053373A; English language abstract; May 18, 2015; 1 page.
Liu, Yinghao et al., Base Station of Cleaning Device, and Cleaning System, Espacenet, Mar. 9, 2023, 1 page.
Wang, Si'Ao et al.; Automatic Swimming Pool Cleaning Robot Capable of Laterally Translating; WO2023165069A1; English language abstract; Sep. 7, 2023; 1 page.
ISR and Written Opinion of the International Search Authority, Application No. PCT/CN2025/085184, Dated Jul. 9, 2025, Original Chinese and English translation, pp. 1-18.
ISR and Written Opinion of the International Search Authority, Application No. PCT/CN2025/097993, Dated Jul. 24, 2025, Original Chinese and English translation pp. 1-16.
ISR and Written Opinion of the International Search Authority, Application No. PCT/CN2024/100765, Dated Sep. 26, 2024, English, pp. 1-11.
ISR and Written Opinion of the International Search Authority, Application No. PCT/CN2024/135845, Dated Mar. 10, 2025, English, pp. 1-14.
ISR and Written Opinion of the International Search Authority, Application No. PCT/CN2025/070882, Dated Apr. 20, 2025, English, pp. 1-12.
ISR and Written Opinion of the International Search Authority, Application No. PCT/CN2025/074953, Dated May 9, 2025, English, pp. 1-10.
Zheng Kai et al.; Anti-falling control method, terminal, medium and equipment; CN Patent No. CN119148750A; English language abstract; Dec. 17, 2024; 1 page.
Zheng Kai et al.; Anti-falling method of underwater cleaning equipment, terminal, medium and equipment; CN Patent No. CN119165878A; English language abstract; Dec. 20, 2024; 1 page.
Tang Gujie et al.; Pool Automatic Cleaning Device and Control Method Therefor; CN Patent No. CN120143809A; English language abstract; Jun. 13, 2025; 1 page.
Zheng Kai et al.; Method for Controlling Pool Automatic Cleaning Device and Corresponding Automatic Pool Cleaning Device; CN Patent No. CN120178864A; English language abstract; Jun. 20, 2025; 1 page.
Zheng Kai et al.; Method for controlling pool automatic cleaning device and corresponding automatic pool cleaning device; CN Patent No. CN120178865A; English language abstract; Jun. 20, 2025; 1 page.

* cited by examiner

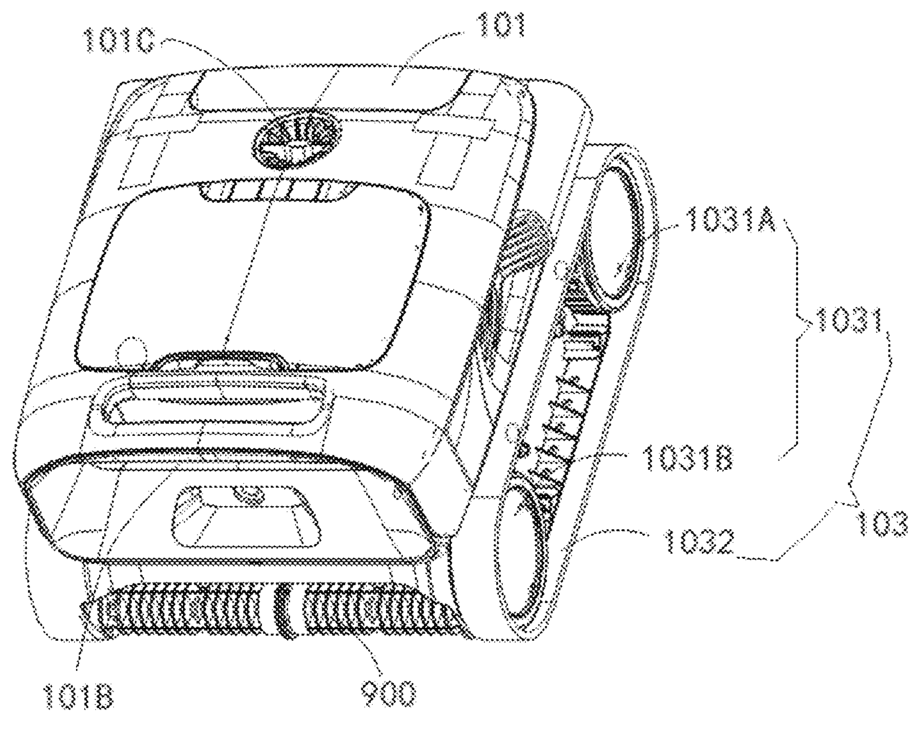
FIG. 3A
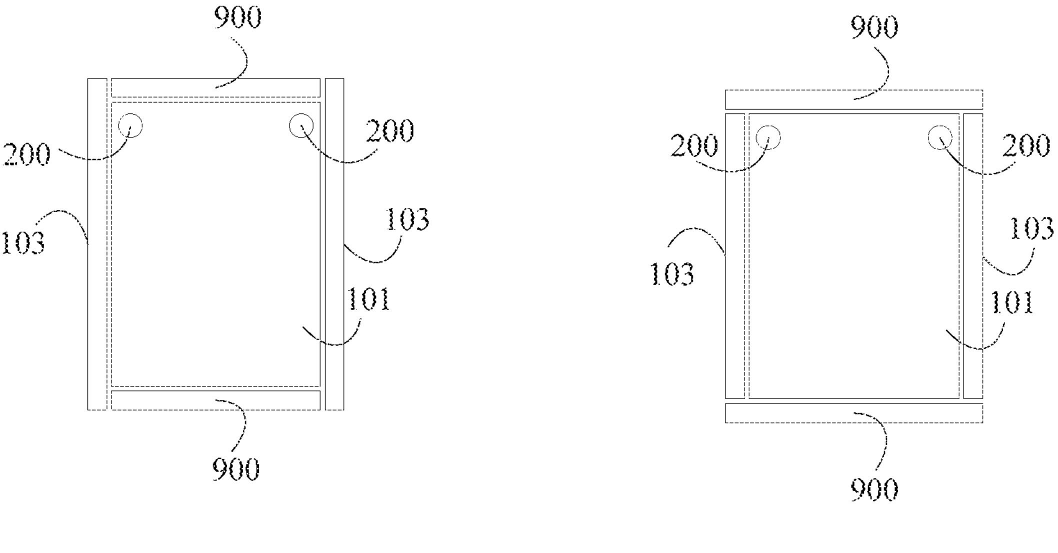
FIG. 3B
FIG. 3C

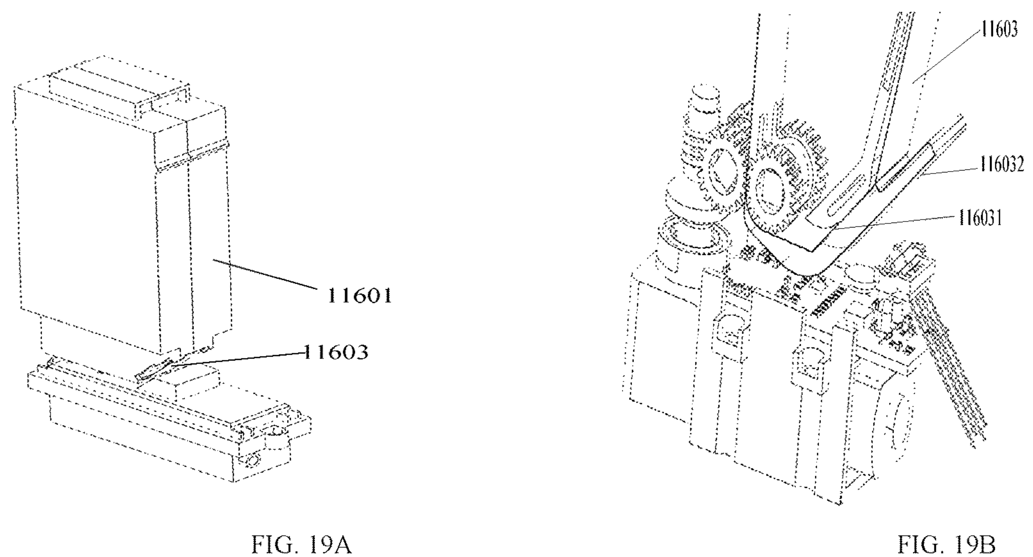
FIG. 19A
FIG. 19B
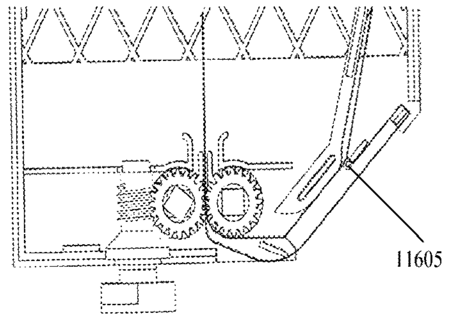
FIG. 19C
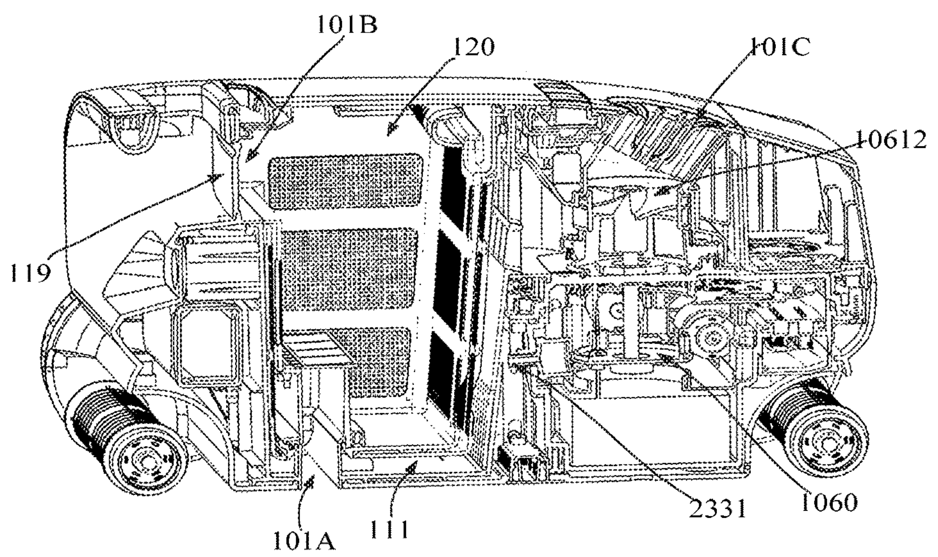
FIG. 20

METHOD FOR CONTROLLING CLEANING DEVICE AND CLEANING DEVICE

CROSS REFERENCE TO RELATED APPLICATIONS

The present disclosure is a continuation of International Patent Application No. PCT/CN2025/097993, filed on May 29, 2025 and entitled "METHOD FOR CONTROLLING CLEANING DEVICE AND CLEANING DEVICE", which claims priority to Chinese Patent Application No. 2024106833262, filed on May 29, 2024 and entitled "METHOD FOR CONTROLLING CLEANING DEVICE AND CLEANING DEVICE", International Patent Application No. PCT/CN2024/100765, filed on Jun. 21, 2024 and entitled "CLEANING DEVICE", International Patent Application No. PCT/CN2024/135845, filed on Nov. 29, 2024 and entitled "CLEANING DEVICE", International Patent Application No. PCT/CN2025/070882, filed on Jan. 6, 2025 and entitled "CLEANING DEVICE", International Patent Application No. PCT/CN2025/073171, filed on Jan. 19, 2025 and entitled "CLEANING SYSTEM", International Patent Application No. PCT/CN2025/073739, filed on Jan. 21, 2025 and entitled "CLEANING SYSTEM", International Patent Application No. PCT/CN2025/074953, filed on Jan. 24, 2025 and entitled "CLEANING SYSTEM", and International Patent Application No. PCT/CN2025/085184, filed on Mar. 26, 2025 and entitled "METHOD FOR CONTROLLING CLEANING SYSTEM AND CLEANING SYSTEM", which are hereby incorporated by reference herein.

TECHNICAL FIELD

The present disclosure relates to the technical field of operating devices for liquid, and in particular, to a method for controlling a cleaning device and a cleaning device.

BACKGROUND

In a conventional technology, a cleaning device (for example, a pool cleaning device) has limitations in cleaning path planning. A path of the cleaning device is random, and the cleaning device usually moves straight in a single direction. When the cleaning device meets a step, the cleaning device randomly changes a direction and then continues to perform cleaning in a straight-line direction. It is difficult to effectively clean the step in this manner, leading to insufficient cleaning coverage.

SUMMARY

According to a first aspect, the present disclosure provides a method for controlling a cleaning device. The cleaning device includes a first distance sensor disposed at a bottom. The control method includes: in a process in which the cleaning device moves on a bottom of a pool, when the cleaning device approaches or collides with an obstacle, controlling the cleaning device to climb the obstacle; and in a process of climbing the obstacle, if the obstacle is determined as a step, controlling the cleaning device to move from a first surface of the step to a second surface of the step, where the step at least includes the approximately vertical first surface and the approximately horizontal second surface, where the obstacle is determined as the step at least based on a detection value of the first distance sensor.

In a specific implementation, after the controlling the cleaning device to move from a first surface of the step to a second surface of the step, the method further includes: adjusting an orientation of the cleaning device on a second surface of an $N^{th}$ step, enabling a first side surface of the cleaning device to be substantially parallel to a first surface of an $N+1^{st}$ step, where N≥1 and N is a natural number; and controlling the cleaning device to move in an adjusted orientation and clean the second surface of the $N^{th}$ step.

In a specific implementation, the cleaning device further includes a second distance sensor disposed on a first side surface of the cleaning device. After the controlling the cleaning device to move from a first surface of the step to a second surface of the step, the method further includes: when a front end of the cleaning device touches or approaches a first surface of an $N+1^{st}$ step, adjusting an orientation of the cleaning device on a second surface of an $N^{th}$ step, enabling the first side surface of the cleaning device to be substantially parallel to the first surface of the $N+1^{st}$ step, so that the second distance sensor faces the first surface of the $N+1^{st}$ step, where N≥1 and N is a natural number; and controlling the cleaning device to move in an adjusted orientation and clean the second surface of the $N^{th}$ step.

In a specific implementation, after the controlling the cleaning device to move from a first surface of the step to a second surface of the step, the method further includes: controlling, at least in a case where the detection value of the first distance sensor is greater than a first distance threshold, the cleaning device to stop moving, rotate, or move backward on the second surface of the step. The first distance threshold is determined based on a distance between the first distance sensor and a plane when the cleaning device moves on the plane.

In a specific implementation, the cleaning device further includes a suction mechanism and a first water outlet in fluid communication with the suction mechanism. The first water outlet is at least partially located at a top of the cleaning device. The controlling the cleaning device to move from a first surface of the step to a second surface of the step includes: after at least a part of the cleaning device crosses a joint between the first surface and the second surface of the step, or the cleaning device moves on the first surface of the step until the first distance sensor goes beyond the first surface of the step, controlling the cleaning device to stop moving or reduce a moving speed, or controlling water to be sprayed out through a part of the first water outlet in a direction away from the cleaning device, where the part of the first water outlet is located at the top of the cleaning device, enabling the cleaning device to be located on the second surface of the step.

In a specific implementation, the cleaning device further includes a suction mechanism and a first water outlet in fluid communication with the suction mechanism. The first water outlet is at least partially located at a top of the cleaning device. The cleaning device further includes a moving mechanism configured to allow the cleaning device to move. The controlling the cleaning device to move from a first surface of the step to a second surface of the step includes: controlling a front portion of the cleaning device to move upward along the first surface of the step until the moving mechanism of the cleaning device is substantially attached to the first surface of the step, and the cleaning device is in an approximately vertical posture; and controlling the cleaning device to stop moving or reduce a moving speed, or controlling water to be sprayed out through a part of the first water outlet in a direction away from the cleaning device, where the part of the first water outlet is located at the top of the cleaning device, enabling the cleaning device to be switched from the approximately vertical posture to an approximately horizontal posture on the second surface of the step.

In a specific implementation, the method further includes: determining the obstacle as the step at least in a case where the detection value gradually increases from a stable value, then gradually decreases, and returns to the stable value. The stable value is the detection value of the first distance sensor when the cleaning device moves on a plane.

In a specific implementation, the cleaning device further includes a second distance sensor disposed on a first side surface of the cleaning device. After the controlling the cleaning device to move from a first surface of the step to a second surface of the step, the method further includes: controlling the cleaning device to move along a first surface of an N+1$^{st}$ step. In a process in which the cleaning device moves along the first surface of the N+1$^{st}$ step, the second distance sensor faces the first surface of the N+1$^{st}$ step, and a detection value of the second distance sensor is less than a third distance threshold. N≥1 and N is a natural number. The third distance threshold indicates a minimum distance between the cleaning device and an edge when the cleaning device moves along the edge.

The method further includes: in the process in which the cleaning device moves along the first surface of the N+1$^{st}$ step, if the detection value of the second distance sensor is greater than the third distance threshold, controlling the cleaning device to move toward the first surface of the N+1$^{st}$ step until the detection value of the second distance sensor is less than or equal to the third distance threshold.

In a specific implementation, the cleaning device further includes a third distance sensor located at a front portion. The third distance sensor is configured to detect a distance between the cleaning device and an obstacle in front of the cleaning device. The method further includes: controlling, at least in a case where a detection value of the third distance sensor is less than or equal to a fourth distance threshold, the cleaning device to move backward or turn around or translate for a preset distance in a direction away from a first surface of an N+1$^{st}$ step to continue to clean a second surface of an N$^{th}$ step. The preset distance is less than or equal to a width of the cleaning device. N≥1 and N is a natural number.

In a specific implementation, the method further includes: after the cleaning device cleans a second surface of an N$^{th}$ step, controlling the cleaning device to rotate at a tail end of the N$^{th}$ step, enabling a front portion of the cleaning device to be aligned with a first surface of an N+1$^{st}$ step, and then controlling the cleaning device to climb to a second surface of the N+1$^{st}$ step. N≥1 and N is a natural number.

In a specific implementation, the method further includes: if a cleaning condition of the cleaning device is not met, or the cleaning device finishes cleaning the step, controlling the cleaning device to move from an N$^{th}$ step toward an N-1$^{st}$ step or the bottom of the pool, or controlling the cleaning device to continue to climb an N+1$^{st}$ step. N≥1 and N is a natural number.

In a specific implementation, the cleaning device further includes a depth sensor. The depth sensor is configured to detect depth information of the cleaning device. If it is determined, based on the depth information, that a depth of the cleaning device is less than or equal to a preset depth, the cleaning condition of the cleaning device is not met; or if a width of a second surface of the N$^{th}$ step is less than or equal to a length or a width of the cleaning device, the cleaning condition of the cleaning device is not met.

In a specific implementation, the cleaning device further includes a third distance sensor disposed at a front portion. The third distance sensor is configured to detect a distance between the cleaning device and an obstacle in front of the cleaning device. The method further includes: after the cleaning device performs cleaning along an edge of a first surface of an N+1$^{st}$ step on a second surface of an N$^{th}$ step, controlling, at least in a case where a detection value of the third distance sensor is less than or equal to a fourth distance threshold, and a width of the second surface of the N$^{th}$ step is greater than a width of the cleaning device, the cleaning device to translate for a first distance in a direction away from the first surface of the N+1$^{st}$ step, and then controlling the cleaning device to move backward or turn around to continue to clean the second surface of the N$^{th}$ step.

According to a second aspect, the present disclosure provides a cleaning device, including a body; a first water inlet disposed at a bottom of the body; a filtering unit at least partially disposed inside the body; a first water outlet disposed at a top of the body; a suction mechanism at least in fluid communication with the first water inlet, the filtering unit, and the first water outlet to form a water flow, where the water flow flows through the first water inlet, the filtering unit, and the first water outlet; at least one roller brush assembly disposed at a bottom of a front portion of the body and configured to clean a to-be-cleaned surface; and a moving mechanism disposed on each of two sides of the body and configured to allow the cleaning device to move on the to-be-cleaned surface.

The cleaning device further includes: at least one first distance sensor disposed at the bottom of the body, adjacent to the moving mechanism, located behind the roller brush assembly, and configured to detect a distance between the cleaning device and the to-be-cleaned surface; and at least one second distance sensor disposed on a first side surface of the body and configured to detect a distance between the first side surface of the cleaning device and an obstacle.

In a specific implementation, the first water inlet is located behind the roller brush assembly, and the at least one first distance sensor is located between the first water inlet and the roller brush assembly.

In a specific implementation, the cleaning device includes one first distance sensor. The first distance sensor is centered at a front end of the bottom of the cleaning device.

In a specific implementation, the cleaning device includes two first distance sensors. The two first distance sensors are substantially symmetrically disposed at the bottom of the body, and the two first distance sensors are sensors of a same type or sensors of different types.

In a specific implementation, the cleaning device further includes at least one third distance sensor. The third distance sensor is disposed at the front portion of the body and configured to detect a distance between the front portion of the cleaning device and an obstacle.

In a specific implementation, at least one transmission channel is disposed inside the body. A first opening located at the bottom of the body and a second opening located inside the body are disposed on two sides of the at least one transmission channel, and the first distance sensor is adjacent to the second opening.

BRIEF DESCRIPTION OF THE DRAWINGS

To illustrate the technical solutions in embodiments of the present disclosure more clearly, the following briefly introduces the accompanying drawings needed for describing embodiments. It is clear that the accompanying drawings in the following descriptions are merely some embodiments of the present disclosure, and a person of ordinary skill in the art may further obtain other accompanying drawings from these accompanying drawings without creative efforts.

FIG. 3A is a schematic structural view of a cleaning device according to an embodiment of the present disclosure;

FIG. 3B is a bottom view of a cleaning device according to an embodiment of the present disclosure;

FIG. 3C is a bottom view of a cleaning device according to an embodiment of the present disclosure;

FIG. 19A is a schematic structural view of a water quality test sensor according to an embodiment of the present disclosure;

FIG. 19B is a partial schematic structural view of a water quality test sensor according to an embodiment of the present disclosure;

FIG. 19C is a partial schematic structural view of a water quality test sensor according to an embodiment of the present disclosure;

FIG. 20 is a schematic view of a longitudinal section of a cleaning device according to an embodiment of the present disclosure;

REFERENCE NUMERALS

Figure 1:
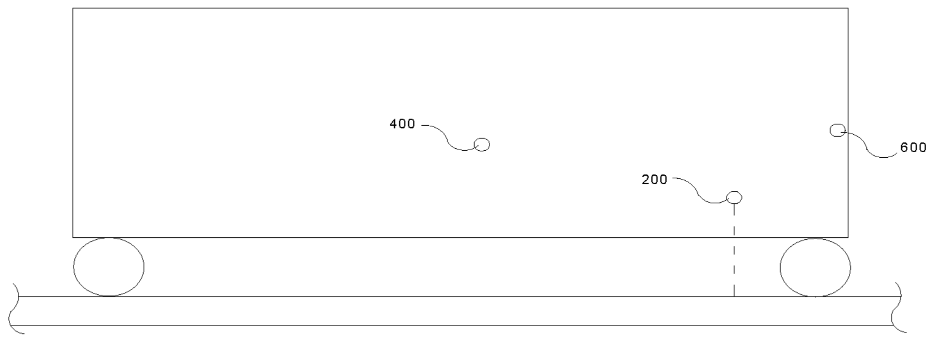
FIG. 1 is a side view of a cleaning device on a plane according to an embodiment of the present disclosure.

100: cleaning device; 101: body; 10101: first wall; 10102: second wall; 101A: first water inlet; 101B: second water inlet; 101C: first water outlet; 1011: first side surface; 1012: second side surface; 1013: mounting hole; 102: power supply unit; 103: moving mechanism; 1031: wheel assembly; 1032: track; 1031A: second wheel; 1031B: first wheel; 1060: suction mechanism; 10611: main motor; 10612: main impeller;

111: first accommodating cavity; 1113: second water outlet; 1121: first distance sub-sensor; 1122: second distance sub-sensor; 1151: reagent storage assembly; 1152: spreading drive assembly; 11601: test box; 11603: test strip; 116031: test paper; 116032: protection film; 11605: stripping part; 1170: device communication module; 1171: first sub-module; 1172: second sub-module; 119: second blocking part;

120: filtering box; 1213: first blocking part;

140: vision sensor; 140*a:* first vision sub-sensor; 140*b:* second vision sub-sensor; 1401: shooting unit; 1402: light supplement part;

171: roller brush assembly; 180: propulsion assembly;

1961: transmission channel; 19611: first opening; 19612: second opening;

200: first distance sensor; 220: electronic control box; 231: control system; 233: depth sensor; 2331: detection end; 238: temperature sensor; 2401: antenna;
300: fifth distance sensor; 301: first step; 302: second step; 303: third step;
400: pose sensor; 410: communication sensor; 4101: light convergence apparatus; 41031: top end; 41032: bottom end; 4102: light dispersion apparatus;
500: second distance sensor;
600: third distance sensor;
700: fourth distance sensor;
900: cleaning unit;
2000: station; 2140: assembly communication module; 2141: third sub-module; 2142: fourth sub-module;
3301: first horizontal surface; 3302: first slope surface.

DETAILED DESCRIPTION

The following clearly and completely describes the technical solutions in embodiments of the present disclosure with reference to the accompanying drawings in embodiments of the present disclosure. It is clear that the described embodiments are merely some but not all of embodiments of the present disclosure. All other embodiments obtained by a person of ordinary skill in the art based on embodiments of the present disclosure without creative efforts shall fall within the protection scope of the present disclosure.

An "embodiment" mentioned in this specification indicates that a particular feature, structure, or characteristic described with reference to this embodiment may be included in at least one embodiment of the present disclosure. The phrase shown in various positions in this specification may not necessarily refer to a same embodiment, and is not an independent or optional embodiment exclusive from another embodiment. It is explicitly and implicitly understood by a person skilled in the art that embodiments described in this specification may be combined with another embodiment.

The present disclosure provides a cleaning device 100. The cleaning device 100 can clean liquid and/or a to-be-cleaned surface in a target region. The target region may be a region in which the cleaning device 100 performs cleaning. For example, the target region may be a swimming pool, a pipe, a hull, an oil well, or the like, but is not limited thereto. The cleaning device may be a robotic vacuum cleaner, a floor washing robot, a delivery robot, a pool cleaning robot, or another device having a cleaning function. The delivery robot may be a food delivery robot, an item delivery robot, or another delivery robot. An example in which the cleaning device operates in a pool is used in this embodiment. Correspondingly, the to-be-cleaned surface may be any surface in the pool that can be cleaned, for example, a surface of a pool wall or a surface of a step. The step may be a step of a stair in a house or an office building, a step of a stair in a pool, or a step in other scenarios.

The cleaning device may be a robot whose power consumption unit is powered by a rechargeable battery disposed inside or a device whose power consumption unit is powered through an external cable. If the cleaning device can move on a bottom of the pool and the pool wall, the cleaning device can clean the bottom of the pool and the pool wall. If the cleaning device can move underwater and move on the pool wall and the water surface, the cleaning device can clean the bottom of the pool, the pool wall, and the water surface. In a specific embodiment, the bottom of the pool may include a bottom wall, and the pool wall may include a side wall.

Figure 2:
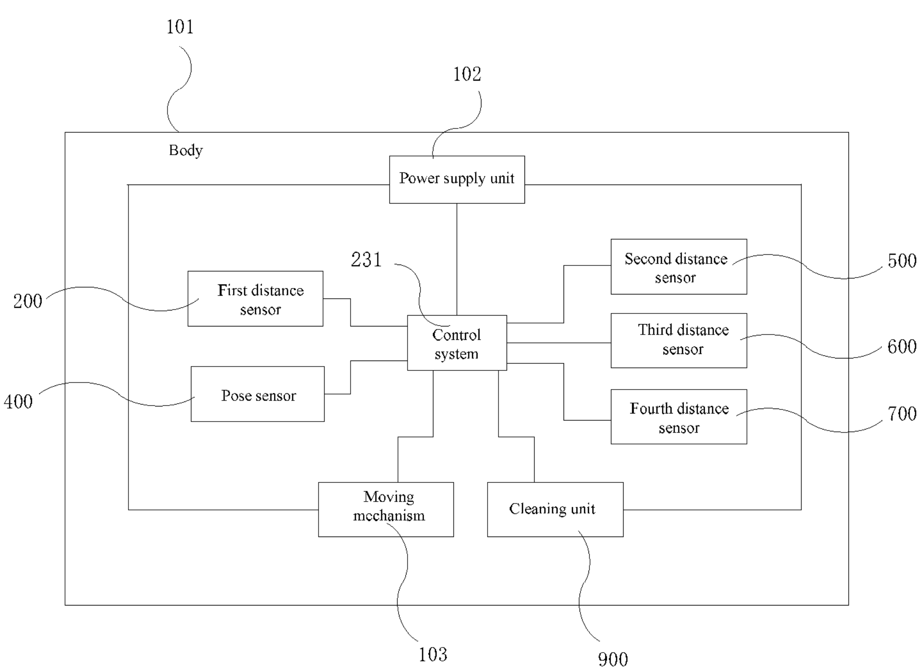
FIG. 2 is a schematic structural view of modules of a cleaning device according to an embodiment of the present disclosure.
Figure 3D:
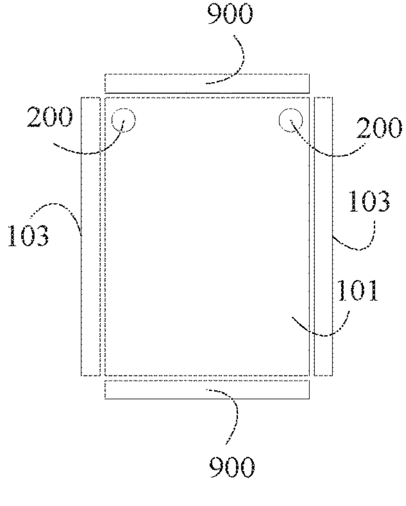
FIG. 3D is a bottom view of a cleaning device according to an embodiment of the present disclosure.
Figure 4A:
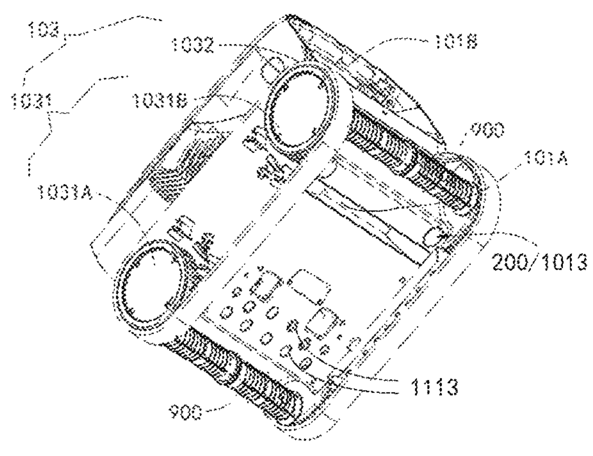
FIG. 4A is a schematic structural view of a moving mechanism of a cleaning device according to an embodiment of the present disclosure.

In one embodiment, as shown in FIG. 2, FIG. 3A, and FIG. 4A, the cleaning device includes a body 101 (also referred to as a cleaning device body), at least one first water inlet 101A (also referred to as a second debris inlet) and/or at least one second water inlet 101B (also referred to as a first debris inlet) disposed on the body 101, a filtering unit (also referred to as a filtering assembly), a first water outlet 101C (also referred to as a liquid outlet portion), and a suction mechanism 1060 (also referred to as a suction assembly, a water pump, or a drive pump). The first water inlet 101A is at least partially located at a bottom of the body 101, the second water inlet 101B is at least partially located at a side portion of the body 101 (for example, any one or more of a front side, a rear side, a left side, or a right side of the body 101), the filtering unit and the suction mechanism are at least partially disposed in the body 101, and the first water outlet 101C is at least partially located at a top of the body 101, to form a water flow channel (denoted as a cleaning water path) from the first water inlet 101A/second water inlet 101B-filtering unit-suction mechanism-first water outlet 101C. The water flow channel is used for the cleaning device to clean the to-be-cleaned surface. When the cleaning device moves underwater or moves on the pool wall or the water surface, under the action of the suction assembly, liquid in the pool is sucked into the filtering unit through a liquid inlet portion. The filtering unit filters the liquid entering the filtering unit. The liquid filtered by the filtering unit is finally discharged from the body 101 through the first water outlet 101C after flowing through the suction assembly, and trash carried by the liquid is collected in the filtering unit. In this way, the liquid in the pool is cleaned. In some embodiments, the suction assembly includes a main water pump. In some embodiments, the filtering unit includes a filtering box 120 (also referred to as a dust box) configured to filter liquid entering the filtering box. Trash carried by the liquid is collected in the filtering box 120. The filtering box 120 may be disposed in a first accommodating cavity 111 (also referred to as a dust box cavity).

In some embodiments, the body 101 includes a first side surface 1011 and a second side surface 1012 disposed opposite to each other in a width direction of the body 101. For example, the first side surface 1011 is a right side surface, and the second side surface 1012 is a left side surface.

Figure 18:
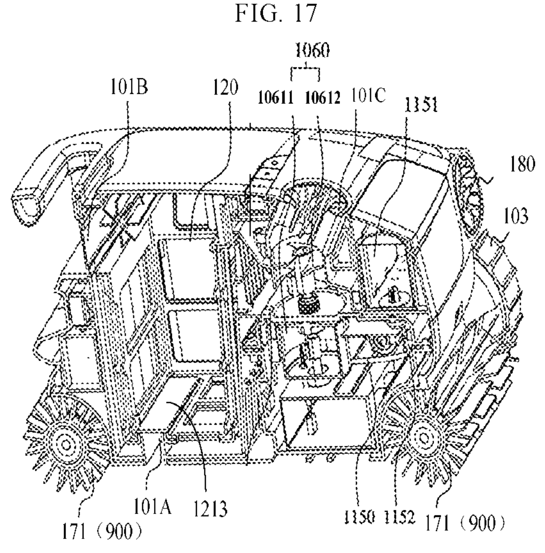
FIG. 18 is a schematic view of a longitudinal section of a cleaning device according to an embodiment of the present disclosure.

In some embodiments, as shown in FIG. 18, the suction mechanism 1060 includes a main water pump. The main water pump includes a main impeller 10612. A main motor 10611 of the main water pump is configured to drive the main impeller. In one embodiment, the main motor 10611 may be disposed in an electronic control box. An output shaft of the main motor extends out of the electronic control box and extends into a cover body and is connected to the main impeller 10612.

In some embodiments, as shown in FIG. 18, the cleaning device 100 further includes a first blocking part 1213. The first blocking part 1213 is configured to directly or indirectly cover the first water inlet 101A. The first blocking part 1213 is configured to be opened to expose the first water inlet 101A at least when the cleaning device cleans the bottom of the pool and the pool wall, so that trash in the target region is sucked into the filtering unit through the first water inlet 101A. The first blocking part 1213 is further configured to cover the first water inlet 101A when the cleaning device 100 does not use the first water inlet 101A, for example, when the second water inlet 101B is used or when a cleaning mode is changed, to prevent the trash in the filtering unit from flowing back to the target region through the first water inlet 101A.

In some embodiments, the cleaning device 100 further includes a second blocking part 119 (also referred to as an anti-regurgitation door or a blocking door) The second blocking part 119 is configured to directly or indirectly cover the second water inlet 101B. The second blocking part 119 is configured to be opened to expose the second water inlet 101B at least when the cleaning device cleans the water surface, so that the trash in the target region is sucked into the filtering unit through the second water inlet 101B. The second blocking part 119 is further configured to cover the second water inlet 101B when the cleaning device 100 does not use the second water inlet 101B, for example, when the first water inlet 101A is used or when a cleaning mode is changed, to prevent the trash in the filtering unit from flowing back to the target region through the second water inlet 101B. The first blocking part 1213 or the second blocking part may be made of a flexible material and/or a rigid material.

In some embodiments, the cleaning device does not include the second water inlet 101B, but only includes the first water inlet 101A. The cleaning device can clean the bottom of the pool and the pool wall.

In some embodiments, the cleaning device does not include the first water inlet 101A, but only includes the second water inlet 101B. The second water inlet 101B communicates with the filtering unit and is configured to allow liquid on the water surface to enter the filtering unit. At least a part of the second water inlet 101B may be disposed at a front portion or a rear portion of the body 101. When the cleaning device moves on the water surface, the liquid in the pool enters the filtering unit through the second water inlet 101B and then is filtered, and the filtered liquid is discharged from the body 101 through the first water outlet 101C. In this way, the water surface is cleaned. In other words, the cleaning device can only clean the water surface of the pool.

In some embodiments, the cleaning device includes the first water inlet 101A and the second water inlet 101B. At least a part of the second water inlet 101B may be disposed at an upper portion of the front portion or an upper portion of the rear portion of the body 101. For example, the second water inlet 101B is disposed on a front side wall of the front portion of the body 101 and is closer to the top of the body 101 than to the bottom of the body 101, or the second water inlet 101B is disposed on a rear side wall of the rear portion of the body 101 and is closer to the top of the body 101 than to the bottom of the body 101. Alternatively, the second water inlet 101B is disposed on a side wall of the front portion or the rear portion of the body 101 and is higher than the first water inlet 101A in a height direction of the cleaning device. When the cleaning device moves on the water surface, the liquid on the water surface enters the filtering unit through the second water inlet 101B and then is filtered, and the filtered liquid is discharged from the body 101 through the first water outlet 101C. In this way, the water surface is cleaned. In other words, the cleaning device can clean the bottom of the pool, the pool wall, and the water surface.

In one embodiment, the cleaning device further includes a second water outlet 1113 (also referred to as a water discharge opening). As shown in FIG. 4A, at least one second water outlet 1113 is disposed at the bottom of the body 101. When the cleaning device is in a cleaning state or an operation state under the water surface or on the water surface, liquid under the water surface or on the water surface may enter the body 101 through the second water outlet 1113. In or after a process in which the cleaning device leaves the water (that is, leaves the water surface), because the cleaning device is lifted out of the liquid, the liquid in the body 101 may be discharged from the cleaning device through the second water outlet 1113.

Figure 4B:
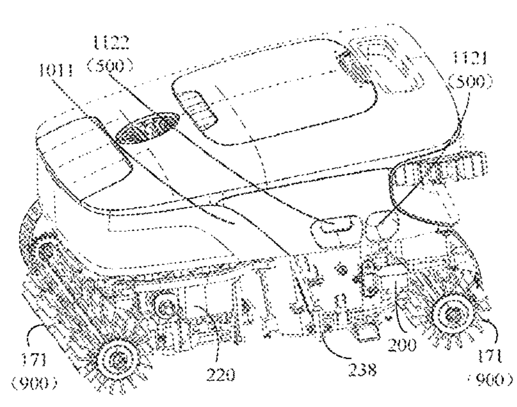
FIG. 4B is a partial schematic structural view of a cleaning device according to an embodiment of the present disclosure.

In one embodiment, the cleaning device further includes a cleaning unit 900 disposed on the body 101. The cleaning unit 900 is configured to clean the bottom of the pool, the wall, or the surface of the step in a moving process of the cleaning device. In one embodiment, as shown in FIG. 4B or FIG. 18, the cleaning unit 900 includes at least one roller brush assembly 171. The at least one roller brush assembly 171 is located at the front portion of the body 101. A roller brush assembly 171 may also be disposed at the rear portion of the body 101. The first water inlet 101A may be spaced from and disposed behind the roller brush assembly 171, or there may be an overlapping region between the first water inlet 101A and the roller brush assembly 171, that is, when the cleaning device is placed horizontally, a projection of the roller brush assembly 171 and a projection of the first water inlet 101A on a horizontal surface at least partially overlap. In some embodiments, in a cleaning process of the cleaning device, the roller brush assembly 171 first scrubs the to-be-cleaned surface, and then a dust-loaded water flow cleaned by the roller brush assembly 171 is sucked into the filtering unit in the body 101 through the first water inlet 101A disposed behind the roller brush assembly 171.

In one embodiment, the cleaning device further includes a moving mechanism 103 (also referred to as a moving unit) disposed on the body 101 and configured to allow the body 101 to move on the to-be-cleaned surface. The moving mechanism 103 at least includes a wheel assembly 1031. The wheel assembly 1031 is rotatably connected to the body 101. The wheel assemblies 1031 are respectively disposed on two sides of the body 101. Each wheel assembly 1031 includes at least one first wheel 1031B and at least one second wheel 1031A spaced from each other. When the cleaning device normally moves, the first wheel 1031B is located at the front portion of the body 101, and the second wheel 1031A is located at the rear portion of the body 101. The moving mechanism 103 may further include a track 1032. The track 1032 is sleeved on the wheel assembly 1031 and may rotate with the wheel assembly 1031, and the track 1032 may be in contact with the to-be-cleaned surface. If one of the first wheel 1031B and the second wheel 1031A is a driving wheel, and the other is a driven wheel, the driving wheel rotates to drive, through the track 1032, the driven wheel to rotate. It may be understood that a plurality of driven wheels spaced from each other may be disposed in the wheel assembly 1031 based on a length of the body 101 to improve reliability of the moving mechanism 103.

Figure 3E:
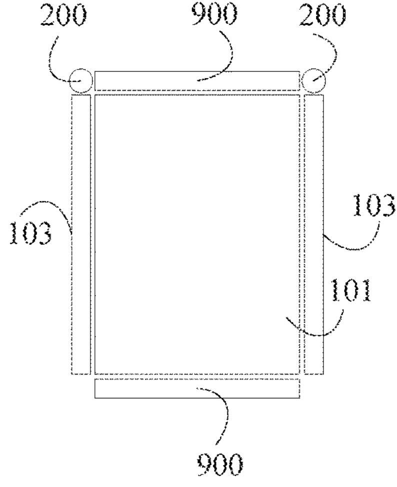
FIG. 3E is a bottom view of a cleaning device according to an embodiment of the present disclosure.

In some embodiments, as shown in FIG. 3A and FIG. 3B, the at least one cleaning unit 900 is disposed between the moving mechanisms 103 on the two sides. In some other embodiments, as shown in FIG. 3C, two sides of the at least one cleaning unit 900 extend to edges of the body 101 to increase a cleaning coverage area of the cleaning unit 900. In this case, in a forward direction of the cleaning device, the cleaning unit 900 located at the front portion of the body 101 is entirely located in front of the moving mechanism 103, and a projection of the cleaning unit 900 and a projection of the moving mechanism 103 overlap. In still some embodiments, as shown in FIG. 3D and FIG. 3E, in the forward direction of the cleaning device, the cleaning unit 900 located at the front portion of the body 101 is entirely located in front of the moving mechanism 103, and a projection of the cleaning unit 900 is located between the moving mechanisms 103 on the two sides and does not overlap or partially overlap a projection of the moving mechanism 103.

In one embodiment, the cleaning device 100 further includes a propulsion assembly 180 disposed on the body 101. The propulsion assembly 180 is configured to drive the cleaning device 100 to move on the water surface or in the water in the target region. The propulsion assembly 180 may be a component that can provide a driving force. For example, the propulsion assembly 180 may be a propeller. The propeller rotates to apply a driving force to the cleaning device 100. Under the action of the driving force, the cleaning device 100 may move on the water surface of the target region or may be suspended in the water at a specific depth and then move.

In one embodiment, as shown in FIG. 2, the cleaning device further includes a control system 231, for example, a microcontroller, an embedded control system, or an application-specific integrated circuit (ASIC). The control system may obtain various pieces of data information of the cleaning device 100 and analyze and process the obtained data information to control various components of the cleaning device 100. For example, the control system controls a moving direction and a moving distance of the body 101 based on obtained detection values of various sensors. The control system may be integrated on the cleaning device or may be independent of and electrically connected to the cleaning device.

In some embodiments, the control system is disposed in scaled space, to prevent water from entering an electronic component of the control system 231, so that problems such as a short circuit and damage to the electronic component of the control system 231 can be avoided. For example, the control system 231 may be disposed in the electronic control box 220 of the cleaning device 100. A region inside the electronic control box 220 is closed or sealed. The control system may include at least one control board. When a component is connected to the control board, the control system can control the component. The control board may be, but is not limited to, a printed circuit board (Printed Circuit Board, PCB).

In one embodiment, the cleaning device further includes a power supply unit 102 disposed in the body 101 and configured to supply power to the body 101. To ensure safety of the power supply unit 102, the power supply unit 102 needs to be disposed in a sealed housing, so that the following case can be avoided: During operation in the water, a fault occurs due to water seepage. Because the power supply unit 102 is disposed in the scaled housing and cannot be removed and mounted frequently, a charging interface assembly needs to be disposed on the cleaning device to facilitate connection between the power supply unit 102 and an external power source, so that the power supply unit 102 can be charged.

In addition, if the cleaning device has a water surface cleaning function and an underwater cleaning function, the cleaning device has a first motion state, a second motion state, and a third motion state. The first motion state at least includes a state in which the cleaning device operates on the bottom of the pool. The second motion state at least includes a state in which the cleaning device operates on the pool wall or is parallel to the pool wall and operates. The third motion state at least includes a state in which the cleaning device operates on the water surface. The cleaning device further includes a mode switching member, so that the cleaning device can be switched between the first motion state and the third motion state or between the second motion state and the third motion state. In this way, the cleaning device can float up and submerge.

In some embodiments, after entering the target region, the cleaning device may be directly in any one of the first motion state, the second motion state, and the third motion state to perform a cleaning task corresponding to a motion state. The cleaning device may alternatively be first in a motion state and then switched to another motion state. For example, the cleaning device is first in the third motion state. In this state, the cleaning device may or may not temporarily perform a corresponding cleaning task. Then, the cleaning device is switched from the third motion state to the first motion state to perform a cleaning task corresponding to the first motion state.

In one embodiment, the cleaning device further includes a plurality of sensors disposed on the body 101. Each sensor may be disposed at any position on the body 101. A station may also include a sensor that may be disposed at any position on the station. The plurality of sensors at least include at least one of the following: a distance sensor, a vision sensor, a temperature sensor, a humidity sensor, a pose sensor, an anomaly sensor, a communication sensor 410, a cleanliness sensor, a water quality test sensor, an in-position detection sensor, a position arrival detection sensor, a submersion sensor, a depth sensor, or a water level detection sensor.

In one embodiment, an example in which the sensor included in the cleaning device and/or the station is a distance sensor is used. The distance sensors include at least one of the following: a first distance sensor 200 (also referred to as a topography detection assembly) disposed at the bottom of the body 101, a second distance sensor 500 disposed on the first side surface 1011 of the body 101, a third distance sensor 600 disposed on the front portion (or a front side) of the body 101, a fourth distance sensor 700 disposed on the second side surface 1012 of the body 101 (each of the second distance sensor 500, the third distance sensor 600, and the fourth distance sensor 700 may also be referred to as an identification assembly), or a fifth distance sensor 300 disposed on the front portion (or the front side) of the body 101. The first distance sensor 200 may detect a distance between the bottom of the cleaning device and the to-be-cleaned surface. The second distance sensor 500 and the fourth distance sensor 700 are configured to detect a distance between an edge of the pool and the cleaning device or detect a distance between the cleaning device and an obstacle on each of two sides. The third distance sensor 600 may detect a distance between the front portion of the cleaning device and an obstacle. The fifth distance sensor 300 may detect a distance between the cleaning device and a specific object. The specific object may be a station (also referred to as a carrying assembly) or the like. The station is configured to implement at least one of the following functions: allowing the cleaning device to dock, cleaning the filtering box, charging the cleaning device, replacing a test box of a water quality test assembly (also referred to as a water quality test sensor), or replacing a reagent kit of a reagent spreading assembly. In one embodiment, the above distance sensor may be any sensor that can measure a distance, for example, a TOF (Time of Flight) sensor such as an ultrasonic sensor or an infrared sensor, or a vision sensor.

In some embodiments, the distance sensor may alternatively be disposed at a joint between different side surfaces of the body 101, for example, a joint between the front side and the first side surface 1011, a joint between the front side and the second side surface 1012, a joint between a rear side and the first side surface 1011, or a joint between the rear side and the second side surface 1012.

In some embodiments, the distance sensor at least includes a transmitting portion, a receiving portion, and a control unit that are disposed on the cleaning device or integrated on the distance sensor. The transmitting portion is configured to transmit a first signal to a to-be-detected object. The receiving portion is configured to receive a second signal reflected by the to-be-detected object. The control unit may determine a distance between the to-be-detected object and the distance sensor based on a related parameter, for example, a time difference between the first signal and the second signal calculated by the control unit. The control unit has a signal processing capability and may be a microcontroller, an embedded control system, an ASIC, or the like.

It should be noted that application ranges of distance sensors of different types vary to some extent. In one embodiment, because signals received and sent by the ultrasonic sensor are ultrasonic signals, the receiving portion has a specific requirement for a reflection angle of the to-be-received second signal. When an included angle between the received signal and the sent signal is large, for example, greater than 20°, the second signal may deviate from the receiving portion. Consequently, the receiving portion may not receive the second signal. In another embodiment, signals received and sent by the infrared sensor are infrared light signals. If a surface of the to-be-detected object is rough, diffuse reflection of the second signal to be received by the receiving portion may occur. Therefore, the receiving portion with high sensitivity can always receive the second signal, but a dark light absorption material or strong ambient light may weaken signal strength, limiting application of the infrared sensor. In comparison, the infrared sensor is more adaptable in a non-extreme material scenario with a short distance, and the ultrasonic sensor has more advantages in a complex light environment with medium and long distances. Each of the infrared sensor and the ultrasonic sensor has a specific scenario in which each of the infrared sensor and the ultrasonic sensor is better applied. A user may choose a type of the distance sensor based on a type of the to-be-detected object.

In one embodiment, the distance sensor is connected to the control system 231. The control system adjusts a moving posture of the cleaning device based on distance information obtained by the distance sensor, so that the cleaning device can avoid an obstacle or move along an edge of the obstacle. Specifically, moving along the edge of the obstacle may include moving along an edge of the bottom wall of the target region, moving along an edge of the water surface, or the like. The moving posture of the cleaning device is adjusted, so that the cleaning device 100 is prevented from deviating from an original motion path. For example, the cleaning device 100 is prevented from climbing the side wall in the height direction or directly hitting the side wall when the cleaning device needs to move on the bottom wall. In addition, a possibility of damage to the cleaning device 100 can be reduced. For example, the following case can be avoided: The cleaning device slips, climbs the side wall, or hits the side wall, causing the cleaning device 100 to flip or be damaged. The distance sensor is disposed, so that the cleaning device 100 can safely move and perform cleaning. The distance sensor may further identify a distance between the distance sensor and an obstacle, for example, a side wall, facing the distance sensor, so that the cleaning device 100 can move and perform cleaning at a specific distance from the side wall. This prevents the cleaning device 100 from scraping against the side wall.

In one embodiment, the first distance sensor 200 is configured to detect a topography of a to-be-cleaned surface under the cleaning device 100 to adjust the moving posture of the cleaning device 100. For example, the first distance sensor 200 detects a distance between the first distance sensor 200 and the to-be-cleaned surface under the cleaning device 100 to determine whether a topography in the moving direction of the cleaning device 100 is a dent lower than a current motion surface (that is, determine whether there is a motion surface under at least a part of the cleaning device 100), for example, an overhanging region, so that when the cleaning device 100 is about to enter the overhanging region, the cleaning device 100 can perform steering or turn around, to avoid the following case: The cleaning device 100 steps into the overhanging region, causing the cleaning device 100 to flip or be damaged, thereby protecting the cleaning device 100, or so that when the cleaning device 100 is about to enter the overhanging region, the cleaning device 100 can flip (for example, the cleaning device flips from a vertical state to a horizontal state) to reach another motion surface different from the previous motion surface. In this way, travel requirements in some scenarios can be met. This improves movement flexibility of the cleaning device 100. The motion surface is a plane of the to-be-cleaned surface, and the plane is in contact with the moving mechanism 103. The distance information is transmitted by the first distance sensor 200 to the control system connected to the first distance sensor 200, so that a type of the topography of the to-be-cleaned surface under the cleaning device 100 can be determined by the control system.

The cleaning device 100 may include one or more first distance sensors 200. When a plurality of first distance sensors 200 are included, the plurality of first distance sensors 200 may be dispersedly disposed to expand a detection range of the first distance sensors 200. For example, when two first distance sensors 200 are included, the two first distance sensors 200 may be respectively adjacent to the front side and the rear side of the body 101.

In some embodiments, as shown in FIG. 4A, the first distance sensor 200 may be disposed close to the bottom of the cleaning device, for example, on a front portion of the bottom, on the front side and close to the bottom, on a rear portion of the bottom, or on the rear side and close to the bottom, so that the first distance sensor 200 can detect whether the cleaning device meets the overhanging region in the moving process. Certainly, the first distance sensor 200 may alternatively be disposed at any position close to an outer edge of the cleaning device. A physical spacing between the first distance sensor 200 and the outer edge of the cleaning device is shortened, so that when the cleaning device moves to an edge of the overhanging region, the first distance sensor 200 at the outer edge of the body 101 can preferentially sense the overhanging region, enabling the moving direction of the cleaning device to be adjusted in time. This reduces a risk that the cleaning device accidentally falls due to an inertial effect and adjustment lag.

In a specific embodiment, as shown in FIG. 3B, FIG. 3C, FIG. 3D, FIG. 3E, and FIG. 4A, the first distance sensor 200 may be disposed adjacent to one or more of the moving mechanism 103, the roller brush assembly 171, and the first water inlet 101A of the cleaning device 100. For example, the first distance sensor is disposed adjacent to the first wheel 1031B or the second wheel 1031A to conveniently detect in time whether the cleaning device meets the overhanging region when the cleaning device moves forward or backward. For example, in the forward direction of the cleaning device 100, the first distance sensor 200 may be disposed behind the roller brush assembly 171, disposed behind the roller brush assembly 171 and in front of the first water inlet 101A, disposed behind the roller brush assembly 171 and the first water inlet 101A, or as shown in FIG. 3E, disposed on each of two sides of the roller brush assembly 171 and in front of the moving mechanism 103. Based on the above disposition, when the cleaning device approaches the edge of the overhanging region, the roller brush assembly 171 may clean the edge of the overhanging region. Then, when the first distance sensor 200 detects the overhanging region, the cleaning device is controlled to stop moving, move backward, or turn around to avoid falling into the overhanging region.

In some embodiments, at least two first distance sensors 200 are spaced from each other at the bottom of the body 101. The two first distance sensors 200 are arranged in a direction perpendicular to the moving direction of the cleaning device or in the width direction of the cleaning device, and are respectively located close to inner sides of the moving mechanisms 103. The two first distance sensors are disposed to respectively detect whether there is an overhanging region on two sides of the cleaning device. In one specific embodiment, the cleaning device 100 includes two first distance sensors 200. The two first distance sensors 200 are both disposed in a region at the bottom of the body 101, and the region is close to the front side. One first distance sensor 200 is close to one moving mechanism 103, and the other first distance sensor 200 is close to the other moving mechanism 103.

In some embodiments, the first distance sensor 200 is turned on only when the first distance sensor identifies that the cleaning device 100 is located in a region of a specific type and/or performs a specific task. For example, when the cleaning device 100 is located on a platform (for example, a tanning ledge in the swimming pool which is also referred to as a shallow platform) provided with steps and/or performs a cleaning task on the platform, the first distance sensor 200 is turned on. In this way, the following case can be avoided: The first distance sensor 200 is turned on for a long time, causing the cleaning device 100 to perform operations such as performing steering or turning around in a case where the cleaning device 100 incorrectly identifies a topography when the cleaning device 100 moves in a conventional region, affecting a cleaning effect of the cleaning device 100. The region of the specific type may be identified by a vision sensor 140 (mentioned below), a depth sensor 233 (mentioned below), and the like. However, this is not limited thereto.

In one embodiment, mounting holes 1013 such as those in FIG. 4A may be disposed at positions, on the body 101, at which the first distance sensor 200, the second distance sensor 500, the third distance sensor 600, and the fourth distance sensor 700 are disposed, so that the sensors can be mounted stably and reliably. The above distance sensors may be disposed adjacent to the mounting holes 1013 or away from the mounting holes 1013.

Figure 4C:
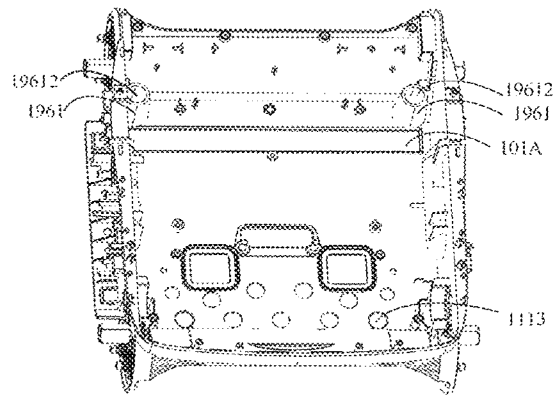
FIG. 4C is a partial schematic structural view of a bottom of a cleaning device according to an embodiment of the present disclosure.
Figure 4D:
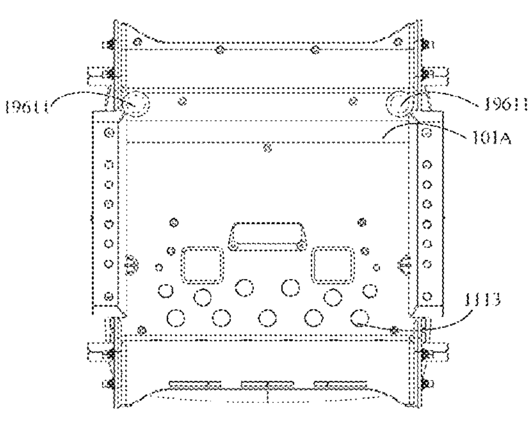
FIG. 4D is a partial schematic structural view of a bottom of a cleaning device according to an embodiment of the present disclosure.

In one embodiment, at least one transmission channel 1961 is disposed inside the body 101. As shown in FIG. 4B, the first distance sensor 200 is disposed inside the body 101 and close to the front side. As shown in FIG. 4C and FIG. 4D, the transmission channel 1961 protrudes from a bottom housing of the body 101 toward the inside of the body 101 and is presented as being of a hollow structure.

In one embodiment, a first opening 19611 and a second opening 19612 are disposed on two sides of the transmission channel 1961. The first opening 19611 is located at the bottom of the body 101. The first opening 19611 may be the mounting hole 1013 or may be independent of the mounting hole 1013, or there is no mounting hole 1013, and there is only the first opening 19611. The second opening 19612 is located inside the body 101, and a signal transceiver of the first distance sensor 200 is disposed close to the second opening 19612. Specifically, the signal transceiver of the first distance sensor 200 is disposed close to the second opening 19612 (that is, the signal transceiver of the first distance sensor 200 is disposed at an end of the transmission channel 1961, where the end is away from the bottom of the body 101), so that a transmitted detection signal can pass through the transmission channel 1961 and be transmitted to the outside of the body 101 through the first opening 19611. A process in which the first distance sensor 200 receives an external signal of the body 101 is opposite to the above process. The external signal of the body 101 is a signal from the outside of the body 101. For example, when the first distance sensor 200 is an ultrasonic sensor, the detection signal transmitted by the first distance sensor 200 is an ultrasonic signal, and the external signal may be a signal (also referred to as an echo signal) obtained through reflection of the ultrasonic signal. The signal transceiver of the first distance sensor is disposed at the end of the transmission channel 1961, where the end is away from the bottom of the body 101. When the signal transceiver is in an integrated transceiver form, if the distance sensor is too close to an object, overlapping time of the transmitted detection signal and the echo signal is too short. In this case, the signal transceiver may not have finished transmitting the signal when receiving the signal, causing a detection dead zone. Consequently, detection accuracy is reduced. The transmission channel 1961 is disposed, so that a transmission distance of the signal transceiver of the first distance sensor 200 is increased, to avoid the following problem: The signal transmission distance is too short, leading to a decrease in the detection accuracy.

In some embodiments, the signal transceiver of the first distance sensor 200 faces the bottom of the front portion of the cleaning device 100 and/or the bottom of the rear portion of the cleaning device 100. For example, the first distance sensor 200 is disposed at any position on the body 101, so that the signal transceiver of the first distance sensor 200 faces the bottom of the front portion and/or the bottom of the rear portion of the cleaning device to detect a topography of a to-be-cleaned surface under the bottom of the front portion and/or the bottom of the rear portion of the cleaning device 100. The transmission channel 1961 may be in a shape of a truncated cone tapering in a direction from the top of the body 101 to the bottom of the body 101 or in a form of a cylinder. This is not limited herein. The transmission channel 1961 may be integrally molded with the bottom housing of the body 101 or may be detachably disposed with the bottom housing of the body 101. The transmission channel 1961 is disposed, so that the first distance sensor 200 can be disposed inside the body 101, to avoid the following case: The first distance sensor 200 is disposed outside the body 101 and may be subject to interference from an external factor such as an environment. This reduces an impact of the external factor on a detection result of the first distance sensor 200. In addition, the signal transmitted by the first distance sensor 200 is constrained in the transmission channel 1961, to prevent the signal from being transferred and spread, so that it is ensured that the signal is directionally transmitted to the target region. This ensures accuracy of the detection result.

In one embodiment, the third distance sensor 600 is configured to detect a distance between the body and an obstacle in front of the body 101, for example, a distance between the body and a wall in front of the body 101. The second distance sensor 500 and/or the fourth distance sensor 700 are/is configured to detect a distance between the body and an obstacle on a side of the body 101, for example, a distance between the body and a wall on a side of the body 101.

Figure 16:
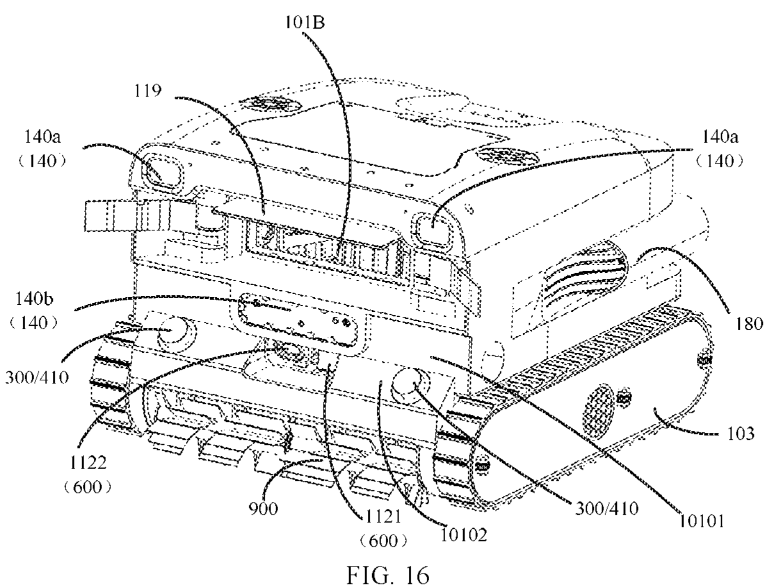
FIG. 16 is a schematic structural view of a cleaning device according to an embodiment of the present disclosure.

In some embodiments, the distance sensor includes a single distance sub-sensor (also referred to as an identification sub-part or a detection sub-assembly), for example, an ultrasonic sensor, an infrared sensor, or a vision sensor. In some other embodiments, as shown in FIG. 4B and FIG. 16, the distance sensor includes more than one distance sub-sensor. For example, each of the third distance sensor 600, the second distance sensor 500, and/or the fourth distance sensor 700 at least includes a first distance sub-sensor 1121 (also referred to as a first identification sub-part or a first detection sub-assembly) and a second distance sub-sensor 1122 (also referred to as a second identification sub-part or a second detection sub-assembly). The first distance sub-sensor and the second distance sub-sensor may be of a same type or different types and are disposed adjacent to each other or spaced from each other. The first distance sub-sensor and the second distance sub-sensor may be arranged left and right, arranged vertically, or arranged on one side surface in a staggered manner. The first distance sub-sensor and the second distance sub-sensor are disposed to expand an identification range, so that a special region topography is more easily identified.

In one specific embodiment, the first distance sub-sensor 1121 is an ultrasonic sensor, and the second distance sub-sensor 1122 is an infrared sensor. The ultrasonic sensor has a large detection range and can detect an obstacle far away from the cleaning device 100. The infrared sensor has a small detection range and can only detect an obstacle close to the cleaning device 100. In most scenarios, the ultrasonic sensor may be used as a primary detection sensor, and the infrared sensor may be used as an auxiliary detection sensor, or only the ultrasonic sensor may be used. However, when the cleaning device 100 is close to an obstacle, and the obstacle is in a special shape, a detection effect of the infrared sensor is usually better than that of the ultrasonic sensor. In this case, the infrared sensor may be used as a primary detection sensor, and the ultrasonic sensor may be used as an auxiliary detection sensor, or only the infrared sensor may be used. For example, when a joint between the bottom wall and the side wall is arc-shaped, and a slope is large (for example, greater than 90°), the ultrasonic sensor may not receive a returned signal and obtain distance data after sending a detection signal to the wall. Consequently, the ultrasonic sensor may misidentify the joint as an operational region, causing the cleaning device 100 to climb in the height direction of the side wall or directly hit the side wall. The infrared sensor is disposed, so that an obstacle close to the cleaning device 100 can be more accurately detected.

In one specific embodiment, the infrared sensor and the ultrasonic sensor can jointly detect the region topography of the target region. For example, if both the ultrasonic sensor and the infrared sensor can obtain distance data, a boundary of the side wall of the target region may be straight line-shaped. If only the infrared sensor can obtain the distance data, the boundary of the side wall of the target region may be arc-shaped. The infrared sensor and the ultrasonic sensor are disposed to resolve a problem that it is difficult to identify some special region topographies only by using the ultrasonic sensor to detect the region topography of the target region. This improves detection sensitivity and accuracy and improves detection efficiency.

In one embodiment, the first distance sub-sensor and the second distance sub-sensor may be both ultrasonic sensors or infrared sensors.

In some embodiments, a detection direction of the first distance sub-sensor may be substantially identical to that of the second distance sub-sensor. In one embodiment, detection directions of the first distance sub-sensor and the second distance sub-sensor may be substantially parallel to the moving direction of the cleaning device 100 or the motion surface. For example, when the motion surface of the cleaning device 100 is the bottom wall, the detection directions of the first distance sub-sensor and the second distance sub-sensor may be substantially parallel to the bottom wall, and when the motion surface of the cleaning device 100 is the side wall, the detection directions of the first distance sub-sensor and the second distance sub-sensor are substantially parallel to the side wall. In another embodiment, the detection directions of the first distance sub-sensor and the second distance sub-sensor both tilt downward toward the body 101.

In some other embodiments, the detection directions of the first distance sub-sensor and the second distance sub-sensor may be different. For example, the detection direction of the first distance sub-sensor tilts downward toward the body 101, and the detection direction of the second distance sub-sensor is substantially parallel to the moving direction of the cleaning device 100 or the motion surface. Specifically, an example in which the distance sensor is the third distance sensor 600 is used for description. When the motion surface of the cleaning device 100 is the bottom wall, a detection direction of the first distance sub-sensor of the third distance sensor 600 tilts toward the bottom wall, and a detection direction of the second distance sub-sensor of the third distance sensor 600 is substantially parallel to the bottom wall. Further, when the front portion of the cleaning device 100 approaches the joint between the bottom wall and the side wall, the detection direction of the first distance sub-sensor tilts toward the joint, and the detection direction of the second distance sub-sensor is substantially parallel to the bottom wall and toward the side wall. An example in which the distance sensor is the second distance sensor 500 is used for description. When the motion surface of the cleaning device 100 is the bottom wall, a detection direction of the first distance sub-sensor of the second distance sensor 500 tilts toward the bottom wall, and a detection direction of the second distance sub-sensor of the second distance sensor 500 is substantially parallel to the bottom wall. Further, when the first side surface 1011 approaches the side wall, the detection direction of the first distance sub-sensor tilts toward the joint between the bottom wall and the side wall, and the detection direction of the second distance sub-sensor is substantially parallel to the bottom wall and toward the side wall. The detection direction of the first distance sub-sensor tilts downward toward the body 101, so that the first distance sub-sensor can face a boundary of the pool wall. This effectively improves the identification effect and efficiency of a boundary topography of the pool wall. In addition, the detection direction of the second distance sub-sensor is substantially parallel to the moving direction of the cleaning device 100 or the motion surface, so that an identification range of the second distance sub-sensor in the detection direction is expanded. This improves obstacle identification accuracy and expands an obstacle identification range. The first distance sub-sensor and the second distance sub-sensor cooperate with each other, so that boundary identification accuracy of the pool wall is improved while the obstacle identification accuracy is ensured. In this way, the cleaning device can subsequently better perform operations, for example, path planning, obstacle avoidance, or map construction. This improves an operation effect of the cleaning device.

In some embodiments, a tilt degree of the detection direction of the first distance sub-sensor of the third distance sensor 600 is less than or equal to that of the detection direction of the first distance sub-sensor of the second distance sensor 500 or the fourth distance sensor 700. For example, the detection direction of the first distance sub-sensor of the third distance sensor 600 tilts downward toward the body 101 at a first angle, for example, 5°, and the detection direction of the first distance sub-sensor of the second distance sensor 500 or the fourth distance sensor 700 tilts downward toward the body 101 at a second angle, for example, 10°. The first angle is less than or equal to the second angle. In this way, the following case can be avoided: The tilt degree of the detection direction of the first distance sub-sensor of the third distance sensor 600 is large, causing the cleaning device to misidentify a part of an operational region (for example, an uphill slope in a transition region between a deep end and a shallow end of the pool) in front of the cleaning device as a boundary of the target region. This improves the detection accuracy of the distance sensor.

In some embodiments, the distance sensor identifies the boundary of the target region, so that the cleaning device 100 can move along the boundary of the target region (for example, a boundary of the bottom wall). In addition, when the cleaning device 100 moves along the boundary of the target region, the control system connected to the distance sensor can record a motion trajectory and a moving distance of the cleaning device 100 and a change in the boundary topography of the target region, and generate a map of the target region based on these records. The distance sensor is disposed, so that construction of the map can be completed after the cleaning device 100 moves around the boundary of the target region by approximately one circle, which reduces time costs and is efficient. This effectively improves map construction efficiency.

In some embodiments, as shown in FIG. 16, the fifth distance sensor 300 is disposed on a front side wall of the body 101. The fifth distance sensor 300 is mainly configured to find the station. Because the station is disposed on a poolside, when the cleaning device is located in the pool, the station is higher than the cleaning device. To detect the station by the fifth distance sensor 300, the fifth distance sensor 300 is disposed on the front side wall of the body 101 and tilts upward, so that a probe of the fifth distance sensor 300 for transmitting a signal and/or receiving a signal tilts upward.

In some embodiments, the cleaning device actively identifies a position of the station by using the fifth distance sensor 300. A sensed part such as a signaler is disposed on the station and configured to cooperate with the fifth distance sensor 300.

In one specific embodiment, the fifth distance sensor 300 may include at least two ranging units. An example in which the fifth distance sensor 300 is disposed on the front portion of the cleaning device is used. If the fifth distance sensor 300 includes a first ranging unit and a second ranging unit, the first ranging unit and the second ranging unit may be respectively disposed on a left side and a right side of the front portion of the cleaning device, and a distance between the first ranging unit and the second ranging unit is a preset value. A ranging signal is sent by at least one of the first ranging unit and the second ranging unit, and the signaler of the station receives the ranging signal and then returns a feedback signal. The position of the station may be obtained based on time at which the first ranging unit and the second ranging unit receive the feedback signal and the distance between the first ranging unit and the second ranging unit. Alternatively, the signaler directly sends a ranging signal, and the position of the station may be obtained based on time at which the first ranging unit and the second ranging unit receive the ranging signal and the distance between the first ranging unit and the second ranging unit.

An example in which the sensor included in the cleaning device and/or the station is a pose sensor (also referred to as a tilt detection unit) is used. The pose sensor 400 is configured to detect a real-time posture and/or position of the cleaning device or the station, for example, whether the cleaning device tilts, a specific tilt angle, a specific tilt direction, a moving distance, a moving speed, or a moving direction. The pose sensor may include a relative pose sensor and an absolute pose sensor. The relative pose sensor is configured to obtain a posture of the cleaning device relative to a local reference object (for example, a tilt angle of the cleaning device relative to the motion surface). The absolute pose sensor is configured to obtain a posture of the cleaning device relative to an absolute reference object (for example, a tilt angle of the cleaning device relative to a horizontal surface). The pose sensor may be, but is not limited to, an inertial measurement unit (Inertial Measurement Unit, IMU), an inclination sensor, or the like. The IMU may include an accelerometer, a gyroscope, a magnetometer, and the like.

In one embodiment, posture data of the cleaning device 100, for example, a pitch angle, a roll angle, and a yaw angle, can be obtained directly or indirectly by the pose sensor 400. When one or more angles of the cleaning device 100 meet a preset angle condition, for example, are less than a preset angle threshold, the cleaning device 100 moves in an original moving posture. When the one or more angles of the cleaning device 100 do not meet the preset angle condition, for example, are greater than the preset angle threshold, the cleaning device 100 adjusts the moving posture and then moves in the adjusted moving posture. For example, when the cleaning device moves on the bottom wall, if the pitch angle is greater than a preset angle, the moving posture of the cleaning device is adjusted to prevent the cleaning device from slipping at the edge of the bottom wall or climbing in the height direction of the side wall.

In one embodiment, more than one pose sensor may be disposed on the cleaning device. For example, a six-axis IMU (for example, a three-axis accelerometer and a three-axis gyroscope) and a single-axis IMU (for example, a single-axis gyroscope) are disposed on the cleaning device. The six-axis IMU is at least configured to obtain an acceleration in each of an X direction, a Y direction, and a Z direction, an angular velocity in each of the X direction and the Y direction, and a low-precision angular velocity in the Z direction. The single-axis IMU is configured to obtain a high-precision angular velocity in the Z direction. Because the angular velocity in the Z direction is usually measured by the gyroscope, if a high-precision six-axis IMU is used, costs of the cleaning device are increased, and if a low-precision six-axis IMU is used, it is difficult to obtain the accurate angular velocity in the Z direction. The six-axis IMU is combined with the high-precision single-axis IMU, so that the accurate angular velocity in the Z direction can be obtained, and costs can be effectively controlled. In this way, balance between posture detection accuracy and costs of the cleaning device is implemented.

An example in which the sensor included in the cleaning device and/or the station is a temperature sensor (also referred to as a temperature detection assembly) is used. In some embodiments, as shown in FIG. 4B, the temperature sensor 238 is configured to detect a temperature at a position of the temperature sensor 238 and may be any component that can detect a temperature. In some embodiments, when the temperature sensor 238 is located in the water in the pool, the temperature sensor 238 may detect a temperature of the water in the pool. In one embodiment, the temperature sensor 238 is at least partially disposed inside the body 101. Specifically, the temperature sensor 238 may be disposed inside the electronic control box 220 or outside the electronic control box 220. When the temperature sensor 238 is disposed in the electronic control box 220, the temperature sensor 238 may detect a temperature inside the electronic control box 220. When the temperature sensor 238 is disposed outside the electronic control box 220, the temperature sensor 238 may be disposed in any region, in the body 101, in which the temperature sensor 238 can be in contact with liquid flowing from the target region into the body 101. Specifically, when the cleaning device 100 is located in the target region, the liquid in the target region may enter the body 101, and the temperature sensor 238 is in contact with the liquid entering the body 101 to detect the temperature of the liquid in the target region. The temperature sensor 238 is disposed inside the body 101. This reduces a probability of damage to the temperature sensor 238 due to collision, sunlight irradiation, or the like. In addition, the temperature sensor 238 is in direct contact with the liquid in the target region. This ensures accuracy of the detected temperature. FIG. 4B is a partial schematic structural view of a cleaning device according to an embodiment of the present disclosure. As shown in FIG. 4B, the temperature sensor 238 is disposed outside the electronic control box 220 and may be connected to the electronic control box 220 through a line (not shown in the figure) to transmit detected temperature data to the control system 231 in the electronic control box 220. In some embodiments, the temperature sensor 238 may be disposed in a part of space formed by a bottom housing (not shown in FIG. 4B) of the body 101. As shown in FIG. 4A, the bottom housing is provided with at least one water discharge opening 1113. The water discharge opening 1113 always communicates with an external environment, so that when the cleaning device 100 is placed in the liquid environment of the target device, a part of the liquid is retained in the part of the space of the bottom housing, and at least a part of a detection part of the temperature sensor 238 is in contact with the part of the liquid to detect a temperature of the part of the liquid. In this way, the temperature of the liquid in the target region is detected.

The cleaning device 100 may further feed back the temperature detected by the temperature sensor 238 to a communication device connected to the cleaning device 100, and temperature data, for example, a real-time water temperature detected by the cleaning device 100, a water temperature detected before the cleaning device 100 leaves the water surface last time, or the temperature inside the electronic control box 220, is displayed on the communication device. Alternatively, when the temperature is abnormal (for example, when the temperature is greater than or less than a preset threshold), alarm information is displayed on the communication device to prevent operation of the cleaning device 100 from being affected by an excessively high or low temperature. In this way, user experience is not affected. The communication device may be a mobile phone, a tablet computer, a notebook computer, a desktop computer, an electronic watch, an electronic band, the station of the cleaning device 100, or the like. However, this is not limited thereto.

An example in which the sensor included in the cleaning device and/or the station is a humidity sensor (also referred to as a humidity detection assembly) is used. In some embodiments, the humidity sensor is configured to detect humidity at a position of the humidity sensor and may be any component that can detect humidity. In some embodiments, the humidity sensor is placed in the electronic control box 220, and the humidity sensor may detect humidity in the electronic control box 220. The cleaning device 100 may further feed the humidity detected by the humidity sensor to the communication device connected to the cleaning device 100, and humidity data, for example, the humidity in the electronic control box 220, is displayed on the communication device. Alternatively, when the humidity is abnormal (for example, when the humidity is greater than or less than a preset threshold), alarm information is displayed on the communication device to prevent operation of the cleaning device 100 from being affected by excessively high or low humidity. In this way, user experience is not affected.

An example in which the sensor included in the cleaning device and/or the station is a vision sensor (also referred to as a vision sensing assembly or a vision identification assembly) is used. As shown in FIG. 16, the vision sensor 140 is configured to collect an image of the target region, an image of the body 101 or any component in the body, and/or an image of the station or any component in the station, and the collected image is processed by the control system to control an action of the cleaning device 100. In some embodiments, the vision sensor 140 is configured to shoot an environment of the target region and identify an image feature, so that functions such as localization, target identification, map construction, obstacle avoidance, and the like are implemented based on the image feature. For example, a previous frame of shot image is compared with a next frame of shot image to correct a positioning error due to slipping or overturning of the cleaning device 100, an accumulated error of the inertial measurement unit of the cleaning device 100, or the like. In addition, pictures are continuously shot during operation of the cleaning device 100. If the cleaning device 100 determines that construction of the map is completed, and a same picture matches a history picture, the cleaning device 100 may perform repositioning in a case where the cleaning device 100 is lost. Furthermore, a specific target may be identified, and whether the specific target is trash that needs to be cleaned or an obstacle that needs to be avoided is determined, so that cleaning or obstacle avoidance is performed subsequently. The vision sensor 140 and/or the distance sensor may be configured to plan a motion path of the cleaning device 100, so that the cleaning device 100 is prevented from climbing, slipping, overturning, or hitting the obstacle, enabling the cleaning device 100 to regularly and safely clean the target region, construct a map, and the like. This can improve cleaning efficiency and the cleaning effect of the cleaning device 100.

The vision sensor 140 may be disposed on any side of the body 101. In one embodiment, the vision sensor 140 is disposed toward the forward direction or a backward direction of the cleaning device 100, that is, may be disposed on the front portion or the rear portion of the body 101 to obtain image data in the forward direction or the backward direction of the cleaning device. In one embodiment, when there is a single vision sensor disposed on the body 101, the vision sensor 140 may be disposed at an approximate middle position on the side portion of the body 101, so that when the cleaning device 100 is located on the bottom of the pool, an image of a motion surface that is usually close to the bottom of the body 101 can be collected, and when the cleaning device 100 is located on the water surface, an image of the water surface that is usually close to the top of the body 101 can be collected. This expands an image collection range of the vision sensor 140.

Figure 17:
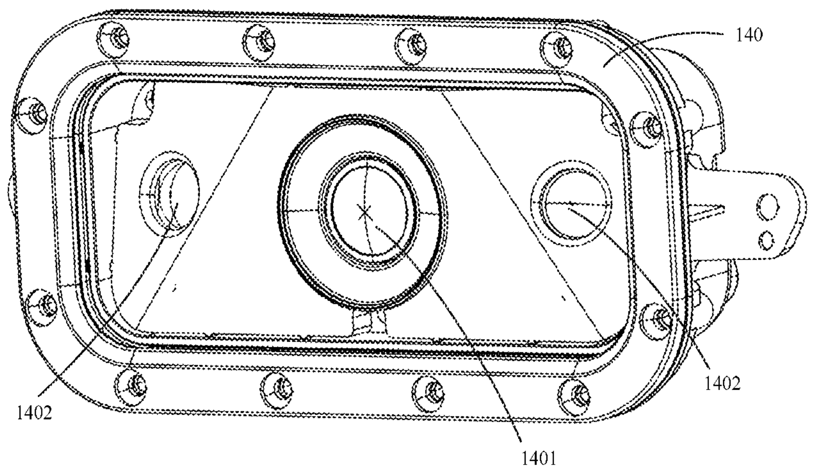
FIG. 17 is a schematic structural view of a vision sensor of a cleaning device according to an embodiment of the present disclosure.

In some embodiments, as shown in FIG. 17, the vision sensor 140 includes a shooting unit 1401. In some embodiments, the vision sensor 140 includes a shooting unit 1401 and a light supplement part 1402. The shooting unit 1401 is configured to capture an image of the pool and may be, but is not limited to, a lens. The light supplement part 1402 is configured to emit light to adjust brightness of a shot region of the shooting unit 1401, and may be, but is not limited to, a fill-in light or a flash. For example, the light emitted by the light supplement part 1402 can directly illuminate the shot region, and brightness of the light emitted by the light supplement part 1402 is adjusted to adjust the brightness of the region. When there are a plurality of shooting units 1401, different shooting units 1401 may share a light supplement part 1402, or different shooting units 1401 may correspond to different light supplement parts 1402.

In some embodiments, a state of the light supplement part 1402 (for example, whether the light supplement part is turned on, and the brightness of the light emitted by the light supplement part) may be determined based on the brightness of the environment in which the cleaning device is located.

In some embodiments, if the cleaning device 100 collides with an obstacle, the state of the light supplement part 1402 is not changed, to ensure that collision does not interfere with environment brightness detection accuracy, so that the light supplement part 1402 is prevented from being adjusted to a state that is not suitable for a current environment.

In some embodiments, a single light supplement part 1402 is disposed adjacent to the shooting unit 1401, or a plurality of light supplement parts 1402 are disposed around the shooting unit 1401.

In some embodiments, the single light supplement part 1402 or the plurality of light supplement parts 1402 arc disposed separately from the shooting unit 1401 and may be mounted at different positions on the cleaning device 100 based on an actual requirement, provided that the brightness of the shot region of the shooting unit 1401 can be adjusted by using the light emitted by the light supplement part.

In some embodiments, the vision sensor 140 further includes a light shielding part (not shown in the figure). The light shielding part is disposed at a periphery of the shooting unit 1401 or an edge of a side of the shooting unit 1401, where the side of the shooting unit 1401 is close to the light supplement part 1402. The light shielding part is disposed, so that the following case can be avoided: The light directly radiates from the light supplement part 1402 to the shooting unit 1401, leading to damage to a photosensitive element of the shooting unit 1401. In addition, a possibility that the light directly radiates from the light supplement part 1402 to the shooting unit 1401, leading to overexposure of an image shot by the shooting unit 1401 can be reduced. This improves a service life and imaging quality of the shooting unit 1401.

In some embodiments, a waterproof structure is disposed on the shooting unit 1401. For example, a hydrophobic layer may be disposed on a surface of a lens of the shooting unit 1401, to prevent water drop condensation and a residue of a water flow trace from affecting a shooting effect, so that the vision sensor 140 can obtain clearer and more accurate image information. In addition, damage to the shooting unit 1401 and performance degradation due to water erosion are avoided. This extends the service life of the shooting unit 1401.

In some embodiments, the shooting unit 1401 and the light supplement part 1402 may be adjacent to each other or located on a side of the body 101, and the side of the body 101 is provided with the first water inlet 101A and/or the second water inlet 101B. When the shooting unit 1401 of the cleaning device identifies that there is trash within a field of view of the shooting unit 1401, the cleaning device 100 may directionally move to a trash region and perform spot cleaning on the region. This improves the cleaning effect of the cleaning device 100. In some embodiments, when the shooting unit 1401 of the cleaning device identifies that there is the trash within the field of view of the shooting unit 1401, the cleaning device 100 can position the trash and plan a motion path based on a position of the trash, and the cleaning device 100 moves along the planned path, enabling the second water inlet 101B to be close to the trash. When the second water inlet 101B is close to the trash, a second blocking part 119 at the second water inlet 101B is opened to allow the trash to be sucked into the filtering unit through the second water inlet 101B. In this case, the cleaning unit 900 of the cleaning device does not need to be started to maximally save power. In addition, the cleaning device 100 moves along the planned path, so that the trash can be prevented from entering a dead zone of the shooting unit 1401. Alternatively, the cleaning device 100 moves along the planned path, enabling the first water inlet 101A to be close to the trash. When the first water inlet 101A is close to the trash, a first blocking part 1213 at the first water inlet 101A is opened to allow the trash to be sucked into the filtering unit through the first water inlet 101A, so that the trash can be directionally cleaned. During this cleaning process, there is no limitation on whether the cleaning unit 900 is turned on.

In one specific embodiment, the vision sensor 140 is away from the second water inlet 101B to prevent a dynamic change (for example, fluctuations of a water flow, a splash, or movement of trash) generated at the second water inlet 101B from interfering with an environment within the field of view of the vision sensor 140 when the vision sensor 140 is close to the second water inlet 101B. This improves operation stability of the vision sensor 140.

In some embodiments, as shown in FIG. 16, when the second water inlet 101B, the vision sensor 140, and the distance sensor are located on a same side, the second water inlet 101B, the vision sensor 140, and the distance sensor may be sequentially arranged in an order from top to bottom.

In some embodiments, the vision sensor 140 includes more than one vision sub-sensor configured to collect images within different fields of view (that is, obtaining environment data within different fields of view in the target region). In one embodiment, as shown in FIG. 16, the vision sensor 140 includes a first vision sub-sensor **140*a* and a second vision sub-sensor 140*b*. The first vision sub-sensor 140*a* and the second vision sub-sensor 140*b* are disposed at different positions on the cleaning device 100. In the height direction of the cleaning device 100, the first vision sub-sensor 140*a* is higher than the second vision sub-sensor 140*b***.

In one specific embodiment, the first vision sub-sensor **140*a* is disposed at a position on the cleaning device 100, so that the first vision sub-sensor 140*a* is partially or completely exposed above the water surface when the cleaning device 100 moves on the water surface, and the second vision sub-sensor 140***b* is disposed at a position, so that the second vision sub-sensor 140*b* submerges when the cleaning device 100 moves on the bottom of the pool.

The cleaning device 100 is usually partially exposed above the water surface and partially submerges when moving on the water surface, and the cleaning device 100 usually completely submerges when moving on the bottom of the pool. Therefore, there are differences in relative positions of the cleaning device 100 and the bottom of the pool and relative positions of the cleaning device 100 and the water surface. If a single vision sensor is used, omission or deviation of the obtained environment data may occur. For example, when the cleaning device 100 is located on the water surface, a vision sensor disposed at a lower position on the cleaning device 100 may be located underwater, and therefore cannot accurately detect an obstacle on the water surface. Therefore, different vision sub-sensors are disposed to obtain environment data, so that the vision sub-sensors at appropriate positions can be chosen based on conditions of the water surface and the bottom of the pool to obtain the accurate environment data.

In one specific embodiment, maps of different regions in the pool may be constructed by using different vision sub-sensors. For example, a map of the water surface is constructed by using the first vision sub-sensor 140*a,* and a map of the bottom of the pool is constructed by using the second vision sub-sensor 140*b*.

In one specific embodiment, structures of the different vision sub-sensors may be different. The first vision sub-sensor 140*a* and the second vision sub-sensor 140*b* are used as an example. When the first vision sub-sensor 140*a* is configured to obtain environment data of the water surface, the shooting unit 1401 may include a vision apparatus, for example, any one of a monocular camera, a binocular camera, a trinocular camera, and a surround-view camera. When the second vision sub-sensor 140*b* is configured to obtain environment data of the bottom of the pool, the shooting unit 1401 may further include an optical apparatus in addition to the vision apparatus, for example, a lidar sensor or a laser module. When the cleaning device is on the bottom of the pool, the second vision sub-sensor 140*b* may emit a laser to water to increase feature points, so that a problem of fewer feature points at the bottom of the water is resolved. In contrast, because an environment of the water surface is complex, and there are many feature points, there is no need to increase feature points, and the first vision sub-sensor 140*a* may directly identify the existing feature points. Therefore, vision sub-sensors of different structures are disposed to obtain environment data, so that the vision sub-sensors of appropriate structures can be chosen based on conditions of the water surface and the bottom of the pool to obtain the accurate environment data.

In one specific embodiment, as shown in FIG. 16, the first vision sub-sensor 140*a,* the second vision sub-sensor 140*b,* the first distance sub-sensor 1121, the second distance sub-sensor 1122, and the fifth distance sensor 300 are disposed on the front side of the body 101. The first vision sub-sensor 140*a* is disposed above the second vision sub-sensor 140*b* and avoids the second water inlet 101B. The second water inlet 101B is disposed above the second vision sub-sensor 140*b*. The first distance sub-sensor 1121 and the second distance sub-sensor 1122 are disposed side by side and lower than the second vision sub-sensor 140*b*.

In some embodiments, at least a part of the first vision sub-sensor 140*a* is higher than the second water inlet 101B. When the cleaning device operates on the water surface, at least a part of the first vision sub-sensor 140*a* is located above the water surface, to ensure that the first vision sub-sensor 140*a* detects trash on the water surface. When it is detected that there is trash on the water surface, the cleaning device moves toward the trash and then moves to a position of the trash to perform spot cleaning on the trash. When the cleaning device performs underwater cleaning, the first vision sub-sensor 140*a* can also detect trash on the bottom of the pool. When it is detected that there is trash on the bottom of the pool, the cleaning device moves toward the trash and then moves to a position of the trash to perform spot cleaning on the trash.

Further, most of the first vision sub-sensor 140*a* is higher than the second water inlet. When the cleaning device operates on the water surface, the first vision sub-sensor 140*a* is located above the water surface, and a larger height difference between the first vision sub-sensor and the water surface indicates a larger detection range of the first vision sub-sensor 140*a*. In this way, the first vision sub-sensor can detect trash within a larger region range. For example, as shown in FIG. 16, there are two first vision sub-sensors 140*a*. The two first vision sub-sensors 140*a* are arranged beyond two sides of the second water inlet 101B, and the first vision sub-sensors 140*a* are closer to the top of the body 101 than the second water inlet in the height direction of the cleaning device.

In one embodiment, as shown in FIG. 16, the front side wall of the body 101 includes a first wall 10101 and a second wall 10102, and the first wall is higher than the second wall. The first wall extends substantially in the height direction of the cleaning device. The second wall tilts relative to the first wall. The second wall protrudes forward from the first wall. The fifth distance sensor 300 is disposed on the second wall, so that a detection range of the fifth distance sensor 300 is not blocked by other components on the cleaning device, and the fifth distance sensor can exchange a signal with the station to implement a station finding function.

In some embodiments, the cleaning device further includes a determining assembly. The determining assembly may be embedded in or independent of the control system in a form of hardware (for example, a microcontroller, an embedded control system, or an ASIC), may be stored in a memory of the cleaning device in a form of software, to be invoked and executed by the control system, or may be a combination of the form of hardware and the form of software.

The determining assembly has an identification function and a determining function. The determining assembly can analyze an image through machine learning to identify an obstacle (for example, a ladder or a stone) or a cleanable object (for example, fallen leaves or a platform) in the target region, so that obstacle avoidance or a cleaning action is triggered. The determining assembly can further identify a structure of the target based on the shot image, so that the cleaning device 100 can complete cleaning of one region before cleaning another region. This avoids a case where the cleaning device 100 moves to another region before completing cleaning of the region in which the cleaning device 100 is located.

In some embodiments, the determining assembly can further track trash. This avoids a case where the trash enters the dead zone of the shooting unit 1401, causing the trash to fail to be cleaned.

In some embodiments, the vision sensor 140 and/or the determining assembly are/is enabled in a specific cleaning mode. A specific mode may be enabled independently or enabled after a regular mode is completed. This is not limited herein. A conventional cleaning mode is a mode in which the vision sensor 140 and/or the determining assembly are/is not enabled. Specifically, the specific cleaning mode is a mode in which the cleaning device 100 cruises and performs cleaning in the target region along a preset cleaning path, for example, a bow-shaped path (the bow-shaped path means that two adjacent paths are parallel to each other, and the cleaning device moves along the two adjacent paths in two opposite forward directions) or a square spiral path. If in a process of cruising and performing cleaning, it is determined that there is a specific target in the target region, for example, a leaf, the cleaning device 100 moves to the specific target to perform cleaning and after completing cleaning, the cleaning device 100 may move backward, move forward, or perform steering to return to an original cleaning path. In other words, after the cleaning device completes cleaning of the specific target, the cleaning device returns to the original cleaning path and continues to cruise along the preset cleaning path. Whether cleaning of the specific target is completed may be determined in a plurality of manners. For example, the determining assembly may directly identify whether the target has been cleaned, or a determining condition may be preset, and if the condition is met, it is considered that cleaning is completed. For example, the determining condition is a time condition, and if the cleaning device 100 stays at the specific target for preset time, it is considered that cleaning is completed. Specific content of the determining condition is not limited herein.

In some embodiments, in the specific cleaning mode, a spacing between adjacent sub-paths of the preset cleaning path may be dynamically adjusted. For example, if the determining assembly does not identify trash on a consecutive preset quantity of adjacent sub-paths, the cleaning device 100 is controlled to expand the spacing between adjacent to-be-cruised sub-paths. For example, the spacing is adjusted from a first path spacing to a second path spacing, and the second path spacing is greater than the first path spacing. If the determining assembly identifies the trash on the consecutive preset quantity of adjacent sub-paths or identifies a plurality of pieces of trash on a single sub-path, the cleaning device 100 is controlled to adjust the spacing between the adjacent to-be-cruised sub-paths from the second path spacing to the first path spacing or any spacing less than the second path spacing. In this way, cleaning effectiveness can be improved, and the cleaning efficiency can also be improved.

In some embodiments, in the specific cleaning mode, a stop condition is included. The stop condition may be completion of cruising of the target region or end time of cleaning estimated based on an arca of the target region. The area of the target region may be estimated after a map of the target region is constructed.

In some embodiments, whether to enable the vision sensor 140 and/or the determining assembly may be determined by a user. For example, the user may manually turn on/turn off the vision sensor 140 and/or the determining assembly by using a function button on the communication device connected to the cleaning device 100 or on the body 101. Alternatively, the cleaning device 100 determines an environment of the target region and/or a parameter of the cleaning device 100, to determine whether to enable the vision sensor 140 and/or the determining assembly. For example, if a preset condition is met, for example, a remaining battery level of the cleaning device 100 is insufficient to support turning-on of the vision sensor 140 and/or the determining assembly, the vision sensor 140 and/or the determining assembly are/is turned off. In this way, cleaning flexibility and efficiency can be improved.

In some embodiments, the vision sensor is configured to collect image data in real time, perform target detection on the image data, and then determine the position of the station based on a detection result. Specifically, a machine learning model may be pre-trained based on a specific shape of the station, and then the vision sensor may detect the station from the collected image data based on the trained model. When the vision sensor detects the station, the position of the station may be obtained correspondingly.

In one specific embodiment, the vision sensor 140 has a field of view tilting upward in the moving direction of the cleaning device 100. The vision sensor 140 may be fixed or may rotate. In other words, a shooting angle of the vision sensor 140 may be adjusted. When the vision sensor 140 is disposed at the top, the vision sensor 140 may further move between a first position and a second position. For example, at the first position, the vision sensor 140 is located in the housing of the cleaning device 100. In this case, the vision sensor 140 is in a non-operation state. At the second position, the vision sensor 140 may protrude out of a contour of the housing of the cleaning device 100. In this case, the vision sensor 140 is in an operation state. Accommodating space of the vision sensor 140 is disposed at the body of the cleaning device 100. A drive mechanism is further disposed near the accommodating space. The drive mechanism is electrically connected to a control mechanism of the cleaning device 100. The control mechanism may control an action of the drive mechanism, so that the vision sensor 140 can be switched between the first position and the second position.

In one embodiment, the cleaning device 100 obtains the position of the station based on a pre-constructed map of the pool. When constructing the map of the pool, the cleaning device 100 records the position of the station in the map of the pool, and when needing to return to the station, the cleaning device may obtain the position of the station based on the map of the pool. The map of the pool may be a two-dimensional map or a three-dimensional map.

An example in which the sensor included in the cleaning device and/or the station is a cleanliness sensor is used. In some embodiments, cleanliness of the filtering unit or cleanliness of the target region is detected by the cleanliness sensor. Cleanliness may reflect an amount of trash in the filtering unit, a clogging degree of a filtering mesh, cleanliness of the liquid in the target region, and the like. There may be cleanliness sensors of a plurality of types.

In one embodiment, the cleanliness sensor is a pressure sensor. The pressure sensor is disposed at any position on the cleaning water path. When the pressure sensor detects that pressure is abnormal, it indicates that there may be too much trash in the filtering unit, or the filtering mesh is clogged to a certain degree. Consequently, water cannot flow smoothly in the cleaning water path. Specifically, the pressure sensor may be disposed on the cleaning water path and in front of the filtering unit. When the pressure sensor detects that the pressure is greater than a specific value, it may be determined that the cleanliness of the filtering unit and/or the target region is low. Alternatively, the pressure sensor may be disposed on the cleaning water path and behind the filtering unit. When the pressure sensor detects that the pressure is less than a specific value, it may be determined that the cleanliness of the filtering unit and/or the target region is low. A difference between water pressure before the filtering unit performs filtering and water pressure after the filtering unit performs filtering may alternatively be detected. When the water pressure difference is greater than a specific value, it is determined that the cleanliness of the filtering unit and/or the target region is low.

In one embodiment, the cleanliness sensor is a flow rate sensor. The flow rate sensor is disposed at any position on the cleaning water path. When the water flow rate detects that a flow rate of water is less than a specific value, it is determined that the cleanliness of the filtering unit and/or the target region is low. In one embodiment, the cleanliness sensor is a turbidity sensor. The turbidity sensor is disposed at the first water outlet 101C and configured to detect turbidity of liquid discharged from the liquid outlet portion. When the turbidity sensor detects that the turbidity is greater than a specific value, it indicates that a filtration effect of the filtering unit may be deteriorated due to clogging. In this case, it may be determined that the cleanliness of the filtering unit and/or the target region is low.

In one embodiment, the cleanliness sensor is a photoelectric sensor. The photoelectric sensor (for example, a photoelectric transmitter-receiver pair) is disposed at the first water inlet 101A and/or at least one second water inlet 101B. When the photoelectric sensor cannot detect a signal within preset time, it indicates that trash may block the first water inlet 101A and/or the at least one second water inlet 101B, or there is large trash passing through the first water inlet 101A and/or the at least one second water inlet 101B for a long time. In this case, it may be determined that the cleanliness of the filtering unit and/or the target region is low.

In one embodiment, the cleanliness sensor is a weighing sensor. The weighing sensor is disposed at the filtering unit and configured to detect a weight of the filtering unit. When the weighing sensor detects that the weight of the filtering unit is greater than a specific value, it is determined that the cleanliness is low. In one embodiment, the cleanliness sensor is a vision sensor (also referred to as an image sensor). The image sensor is disposed in the filtering unit and configured to obtain an image of the inside of the filtering unit, and then the cleanliness of the filtering unit is determined through image identification.

In one embodiment, the cleanliness sensor is an electrical indicator sensor that detects cleanliness based on an electrical indicator of an electrical component. The electrical indicator may be a current, a voltage, power, or the like. For example, a current of the suction mechanism may be detected. When the current is greater than a specific value, it indicates that there may be too much trash in the filtering unit, or the filtering mesh is clogged to a certain degree, leading to an increase in the current of the suction mechanism. In this case, it may be determined that the cleanliness of the filtering unit and/or the target region is low.

In one embodiment, operation time, water flow data, and/or energy consumption changes of the cleaning device during a specific operation period may be analyzed by using the cleanliness sensor, to obtain the cleanliness of the filtering unit and/or the target region. The above cleanliness detection manners are merely examples and may be used separately or may be used in combination. This is not limited herein.

Whether the filtering unit is cleaned or replaced is determined based on the cleanliness of the filtering unit. For example, when it is detected that the cleanliness of the filtering unit is less than a preset value, the cleaning device 100 may perform a self-cleaning task. For another example, when it is detected that the cleanliness of the filtering unit is less than the preset value, a reminder may be sent to the user to remind the user to clean or replace the filtering unit in time. Alternatively, a cleanliness prompt light or a voice prompt apparatus may be disposed on the cleaning device 100 and configured to reflect the cleanliness of the filtering unit, so that the user can intuitively know a state of the filtering unit and clean or replace the filtering unit in time.

An example in which the sensor included in the cleaning device and/or the station is an anomaly sensor is used. In some embodiments, the anomaly sensor detects an anomaly of the cleaning device or the station or an anomaly of a single component of the cleaning device or the station. In one embodiment, the anomaly sensor is an electrical indicator sensor that detects an anomaly of a component based on an electrical indicator of an electrical component. For example, a current of a drive motor (for example, a drive motor of the moving mechanism 103 or a drive motor of the second blocking part 119) is detected. When the current is greater than a specific value, the electrical component may be damaged or may malfunction because the electrical component is entangled by an obstacle. The motor may rotate reversely, so that the drive motor attempts to get out of an anomaly state, a reminder may be sent to the user to prompt the user to clean or repair the drive motor in time, or an anomaly prompt light or a voice prompt apparatus may be disposed on the cleaning device 100 and configured to reflect an anomaly of the cleaning device, so that the user can intuitively know an operation state of the cleaning device and clean or replace the cleaning device in time.

An example in which the sensor included in the cleaning device and/or the station is a water quality test sensor (also referred to as a water quality test assembly) is used. In some embodiments, the water quality test sensor is mainly configured to obtain water quality data of the target region. The water quality data may include a pH value, turbidity, total solids, salinity, and the like of water, so that the user can know water quality of the pool. In one embodiment, the water quality test sensor may alternatively be disposed on the station.

In one embodiment, as shown in FIG. 19A, FIG. 19B, and FIG. 19C, the water quality test sensor includes a test box 11601, a test strip 11603, a detection assembly, a stripping part 11605, and a drive assembly. The test strip 11603 includes a test paper 116031 and a protection film 116032. The protection film 116032 is waterproof. Before the test strip 11603 performs testing, the protection film 116032 is attached to a first side surface of the test paper 116031. There are a plurality of test regions on the first side surface. A plurality of test color blocks are disposed in each test region. For example, the test color block may be a pH test color block, a test color block of residual chlorine in water, a test color block of cyanuric acid in water, a calcium hardness test color block, a total alkalinity test color block, a water turbidity test color block, a test color block of total solids content in water, a water salinity test color block, or the like. The protection film 116032 and the test paper 116031 are formed as a whole. The protection film 116032 protects the test regions on the test paper 116031 to prevent external moisture from entering the test regions, so that a test effect of the test paper 116031 is not affected. When the water quality needs to be tested, the protection film 116032 is stripped from the test paper 116031 by using the stripping part 11605, so that the test color block in the test region on the test paper 116031 is exposed to be in contact with liquid. After the liquid is in contact with the test color block on the test paper 116031, a color of the test color block changes. The detection assembly collects a changed color of the test color block, and the control system processes and compares data of the detection assembly to obtain information of a water quality test and then output the information to a screen of the station or an APP interface of a user terminal, so that the user can intuitively view a result of the water quality test. When the station or the cleaning device includes a reagent spreading assembly (also referred to as a medicament spreading assembly), the user or the control system controls whether the reagent spreading assembly spreads a reagent into the pool to treat the liquid in the pool.

In some embodiments, as shown in FIG. 18, a reagent spreading assembly 1150 is disposed on the cleaning device or the station. The reagent spreading assembly 1150 includes a reagent storage assembly 1151 (also referred to as a reagent kit). The reagent storage assembly may be configured to store a to-be-spread reagent. The reagent storage assembly may be disposed in the body 101. The reagent storage assembly may alternatively be detachably mounted to the body 101. A reagent opening is disposed on the reagent storage assembly. The to-be-spread reagent may be a reagent required for maintenance of water, for example, algae removal, clarification, and disinfection, and may include, but is not limited to, a disinfectant, an algaecide, a coagulant aid, a pH adjuster, and the like. In some embodiments, the reagent spreading assembly 1150 further includes a spreading drive assembly 1152. A reagent opening is disposed on the cleaning device body. The spreading drive assembly 1152 is disposed in the cleaning device body 101 and connected to the reagent storage assembly 1151. The spreading drive assembly 1152 is configured to drive and control the reagent in the reagent storage assembly 1151 to flow out through the reagent opening. The spreading drive assembly 1152 may control, based on an operation parameter, the reagent storage assembly 1151 to spread the reagent through the reagent opening. The operation parameter may at least include a speed, for example, a flow rate, at which the to-be-spread reagent leaves the reagent storage assembly 1151.

In one embodiment, the above detection assembly may be a vision sensor (for example, a camera). The color of the test color block in the test region is shot, and the control system compares the color shot by the camera with a standard color card to obtain the test result of the water quality test sensor.

In some embodiments, at least a part of the water quality test sensor is replaceable. In one specific embodiment, the test box 11601 is replaceable and may be replaced with a new test box when the test paper in the test box is depleted.

In some embodiments, the water quality may be tested regularly. In one specific embodiment, the water quality may be tested at a fixed time every day, for example, once in the morning, once at noon, and once in the evening. In one specific embodiment, the water quality may be tested once at a specific interval, for example, every two hours. A test interval may be set by the user or may vary based on a season or an environment. This is not limited herein.

In some embodiments, water quality testing may be triggered to be performed under a specific condition. For example, for an outdoor pool, water quality testing may be triggered after rain, dust, and the like. For another example, water quality testing may be triggered when it is identified that there is a person on the side of the pool. Water quality may alternatively be tested after the cleaning device completes the cleaning task or reagent spreading to determine an effect of the cleaning task or reagent spreading.

Certainly, water quality may alternatively be tested in response to a user requirement. The above water quality testing manners may be performed separately or may be performed in combination. This is not limited herein. A water quality test apparatus on the cleaning device and a water quality test apparatus on the station may be used independently or may be used in combination. In one specific embodiment, the water quality test apparatus on the cleaning device is configured to perform testing on the whole water region, the water quality test apparatus on the station is configured to perform testing at the station in a fixed-point manner, and the two water quality test apparatuses may cooperate with each other to implement a more comprehensive test effect.

In some embodiments, a reagent spreading scheme may be automatically recommended for the user after the water quality test result is obtained. For example, a reagent spreading calculation formula may be preset, and the water quality test result may be substituted into the formula to obtain a quantity and/or concentration of spread reagents and/or duration of reagent spreading. For another example, a water quality-reagent model may be obtained in advance through training, a current water quality result may be input into the model, and the model may output a reagent spreading scheme. The recommended reagent spreading scheme may be displayed on the screen of the station or pushed to a mobile device of the user terminal.

In some embodiments, the water quality test sensor may be disposed on the station. Construction of the water quality test sensor on the station may be the same as or different from construction of the water quality test sensor on the cleaning device. This is not limited herein.

In one embodiment, when the water quality test sensor is disposed on the cleaning device, if the cleaning device returns to the station, the station may replace the test box of the water quality test assembly or remind the user to replace the test box of the water quality test assembly on a body of the station.

An example in which the sensor included in the cleaning device and/or the station is an in-position detection sensor (also referred to as an in-position sensing assembly or an in-position detection mechanism) is used. In some embodiments, the in-position detection sensor is configured to detect whether a to-be-detected component of the cleaning device or the station is mounted in position. In one embodiment, the in-position detection sensor includes a detection part and a sensing part. One of the detection part and the sensing part is disposed on the to-be-detected component, and the other is disposed in a mounting region of the to-be-detected component. If the detection part receives a signal from the sensing part, it indicates that the to-be-detected component is mounted in position. In another embodiment, the in-position detection sensor includes only a detection part. The detection part detects a change in the detection part or a change in an environment of a mounting region (for example, detecting whether the detection part is deformed or whether an ambient temperature changes) to sense whether the to-be-detected component is mounted in position.

In one embodiment, the in-position detection sensor includes at least one of a magnetic induction assembly, an inductance assembly, or a switch assembly. During actual use, a detection manner may be adjusted based on an actual requirement. For example, the in-position detection sensor may be the magnetic induction assembly, the inductance assembly, or the switch assembly. Alternatively, the in-position detection sensor may include all of the magnetic induction assembly, the inductance assembly, and the switch assembly. The magnetic induction assembly may sense, in a magnetic induction manner, whether the to-be-detected component is in position. A Hall element and a Hall magnet may mate with each other to implement the magnetic induction manner. The inductance assembly may detect, in an inductance manner, whether the to-be-detected component is in position. The switch assembly detects, by using a switch part, whether the to-be-detected component is in position. It should be noted that a waterproof structure may be disposed on the in-position detection sensor based on an actual requirement, to prevent a short circuit. This ensures use performance of the in-position detection sensor and improves stability of the in-position detection sensor.

In one embodiment, the in-position detection sensor is configured to detect whether the filtering box 120 is mounted in the first accommodating cavity 111 in position, that is, the to-be-detected component is the filtering box. In one embodiment, the in-position detection sensor includes a detection part and a sensing part. One of the detection part and the sensing part is disposed on the filtering box, and the other is disposed on the first accommodating cavity 111 or the body 101. When the filtering box is mounted in the first accommodating cavity 111, the detection part receives a signal from the sensing part, indicating that the filtering box is mounted in the first accommodating cavity in position. For example, the sensing part is a magnetic object, for example, a magnet, and the detection part is a Hall sensor. The Hall sensor detects the magnet, indicating that the filtering box is mounted in position.

In one embodiment, the in-position detection sensor is configured to detect whether the reagent kit is mounted in position, that is, the to-be-detected component is the reagent kit, to ensure that only after the reagent kit is mounted in position, the cleaning device 100 or the station can normally spread the reagent. In this way, the following case can be avoided: The reagent kit is not mounted in position or has not been mounted in the cleaning device 100 yet, causing the reagent not to be spread normally.

In some embodiments, the reagent spreading assembly further includes a reagent quantity detection assembly. The reagent quantity detection assembly is configured to detect an in-position state of the reagent kit and/or a quantity of to-be-spread reagents stored in the reagent kit. The in-position state of the reagent kit is a state of whether the reagent kit is mounted to the body 101. When the reagent kit is mounted to the cleaning device 100, the reagent kit is in the in-position state. When the reagent kit is not mounted to the cleaning device 100, the reagent kit is not in the in-position state. Based on the above disposition, the cleaning device 100 may detect in time or on-line, by using the reagent quantity detection assembly, whether a storage quantity of to-be-spread reagents can meet a spreading requirement, so that the user can supplement the to-be-spread reagents in time.

In one embodiment, the in-position detection sensor is configured to detect whether the test box 11601 is mounted in position, that is, the to-be-detected component is the test box 11601, to ensure that only after the test box 11601 is mounted in position, the cleaning device 100 or the station can normally test the water quality. In this way, the following case can be avoided: The test box 11601 is not mounted in position or has not been mounted in the cleaning device 100 yet, causing the water quality not to be normally tested.

An example in which the sensor included in the cleaning device and/or the station is a position arrival detection sensor (also referred to as a position arrival detection assembly) is used. In some embodiments, the position arrival detection sensor is mainly configured to detect whether the cleaning device 100 arrives at a specified position (for example, a specified position on the station or in the target region), so that the cleaning device 100 or the station can conveniently perform a subsequent operation (for example, when arriving at the specified position, the cleaning device 100 stops moving, or when the cleaning device arrives at a specified position, one or more components of the station are turned on).

In one embodiment, the position arrival detection sensor includes a position arrival sensor and a sensed part. One of the position arrival sensor and the sensed part is disposed on the cleaning device, and the other is disposed at the specified position. If the position arrival sensor detects the sensed part, it indicates that the cleaning device moves to the specified position. For example, one of the position arrival sensor and the sensed part is disposed on the cleaning device, and the other is disposed on the station. For example, the position arrival sensor is a Hall sensor, and the sensed part is an iron block. For another example, the position arrival sensor is a position arrival switch, and the sensed part is a mating part configured to collide with the position arrival switch. For another example, the position arrival sensor is a light transmitter, and the sensed part is a light receiver.

An example in which the sensor included in the cleaning device and/or the station is a submersion sensor (also referred to as a submersion detection assembly) is used. In some embodiments, the submersion sensor is configured to detect whether the cleaning device 100 or the station partially or completely submerges in the liquid in the target region.

In some embodiments, the submersion sensor may be a capacitive sensor (also referred to as a capacitive submersion detector). The capacitive sensor may be disposed inside or outside the electronic control box 220. Specifically, the capacitive sensor may be disposed on an inner bottom wall or an outer bottom wall of the electronic control box 220. The capacitive sensor may be fixed to the electronic control box 220 in a manner, for example, rivet fixing, welding fixing, bonding fixing, bolt fixing, pin-key fixing, snap-fit fixing, or magnetic adsorption fixing. This is not limited thereto. The capacitive sensor is a non-contact liquid level detector. The capacitive sensor can detect whether the cleaning device 100 or the station partially or completely submerges, without being in contact with the liquid in the target region, and the capacitive sensor is not affected by barometric pressure, liquid pressure, and the like, leading to high accuracy of the capacitive sensor.

In some embodiments, whether at least a part of the station submerges in the liquid in the target region is detected to ensure normal operation of some apparatuses disposed on the station. For example, in some application scenarios, the reagent spreading assembly, a third submodule 2141 (mentioned below), and the like need to submerge, and the submersion sensor may be disposed at a mounting position of this apparatus on the station. If the submersion sensor detects that the position of the submersion sensor submerges, it indicates that an environment condition required for operation of the apparatus is met. If the submersion sensor detects that the position of the submersion sensor does not submerge, the user or the control system may control the station to adjust the position of the station or supplement water into the target region, to ensure normal operation of the apparatus.

In some embodiments, the submersion sensor may be a photoelectric sensor. Whether the cleaning device or the station partially or completely submerges is detected based on a difference in reflection/refraction of light in air and water. The submersion sensor may alternatively be a humidity sensor to detect, based on an instantaneous change in humidity, whether the cleaning device or the station partially or completely submerges.

An example in which the sensor included in the cleaning device and/or the station is a depth sensor 233 (also referred to as a liquid level detection assembly or a water depth sensor) is used. In some embodiments, the depth sensor 233 is configured to detect a liquid level at a current position of the cleaning device 100. The liquid level may be represented as a distance between a position of the cleaning device 100 and the water surface of the target region in an approximately vertical direction. In some embodiments, the control system 231 determines the current position of the cleaning device 100 based on the liquid level detected by the depth sensor 233, jointly determines the current position of the cleaning device 100 with reference to a scene graph currently shot by the shooting unit 1401, and chooses, based on the current position of the cleaning device 100, to start at least one of the moving mechanism 103 or the propulsion assembly 180 to drive the cleaning device 100 to move. When the cleaning device 100 is in an on state, the depth sensor 233 may be started, or after the submersion sensor detects that the cleaning device 100 has currently entered the liquid in the target region, the depth sensor 233 may be started, or the depth sensor 233 may be started in any case where a liquid level needs to be detected. This is not limited herein.

In some embodiments, the depth sensor 233 may be a pressure liquid level detector or a pressure sensor. The control system 231 determines the liquid level at the current position of the cleaning device 100 based on liquid pressure applied to the pressure sensor. The pressure sensor may be disposed in a non-negative pressure zone of the body 101, for example, disposed to be away from a trash suction flow channel in the cleaning device 100, for example, the above cleaning water path. It may be understood that the liquid pressure can be classified into static pressure and dynamic pressure. A depth of the cleaning device 100 is usually calculated by a static pressure gauge, and the dynamic pressure affects depth detection accuracy. Therefore, the pressure liquid level detector is disposed in the non-negative pressure zone, so that the liquid pressure that can be detected by the pressure liquid level detector is only the static pressure. This reduces an impact of the dynamic pressure on the depth calculation accuracy and helps the depth sensor 233 accurately identify a depth of the depth sensor 233 in the water. Further, this can assist the control system 231 in accurately determining the position of the cleaning device 100 and improve identification accuracy.

In some embodiments, as shown in FIG. 20, a part of the depth sensor 233 is disposed inside the electronic control box 220, and a part of the depth sensor 233 extends through a side wall of the electronic control box 220 to the outside of the electronic control box 220. A part of the depth sensor 233 is in contact with the side wall of the electronic control box 220, and the part of the depth sensor 233 may be sealed in any manner to prevent liquid from infiltrating into the electronic control box 220. The part located outside the electronic control box 220 at least includes a detection end 2331. The detection end 2331 is configured to detect liquid pressure in an environment outside the electronic control box 220. The part located inside the electronic control box 220 at least includes a transmission end. The transmission end is connected to the control system 231 inside the electronic control box 220 to transmit detected liquid pressure information to the control system 231.

In some embodiments, space in which the detection end 2331 is located is away from the cleaning water path. For example, the space in which the detection end 2331 is located is far away from the cleaning water path, and/or there is an isolation structure (not shown in the figure) between the space in which the detection end 2331 is located and the cleaning water path, for example, a baffle plate, or the space in which the detection end 2331 is located is separated from the cleaning water path, and/or there is one or more components between the space in which the detection end 2331 is located and the cleaning water path to reduce an impact of the dynamic pressure in the trash suction flow channel on detection of the detection end 2331.

In some embodiments, when the cleaning device 100 is placed in a liquid environment of the target region, the liquid in the target region enters the body 101 through the second water outlet 1113. The second water outlet 1113 always communicates with the external environment. The detection end 2331 may be disposed inside space in fluid communication with the second water outlet 1113 to detect liquid pressure in the space. Liquid inside the space communicates with the liquid in the target region in real time through the second water outlet 1113. Therefore, the liquid pressure detected by the detection end 2331 is close to or equivalent to actual pressure of the liquid at the current position of the cleaning device 100. This improves liquid pressure detection accuracy.

In some embodiments, the depth sensor 233 may alternatively be an ultrasonic detector, an optical detector, a ranging detector, an infrared detector, a distance code disk, or the like. However, this is not limited thereto.

An example in which the sensor included in the cleaning device and/or the station is a water level detection sensor (also referred to as a water level detection assembly) is used. The water level detection sensor is configured to detect a water level of the target region.

In some embodiments, an example in which the target region is a pool is used. The water level detection sensor is disposed on the station and configured to detect a water level of the pool, thereby facilitating timely detection of the water level of the pool, so that the water level of the pool is between a minimum preset water level and a maximum preset water level. In this way, the water level of the pool is prevented from being too high or too low.

In one embodiment, the station includes a first cavity, and the water level detection sensor is disposed in the first cavity. In this case, at least a part of the station is located below the water surface, so that the first cavity communicates with the liquid in the pool. In this way, the water level detection sensor can detect the water level of the pool in time.

In one embodiment, the water level detection sensor includes a float, at least one first sensing part, and at least one first detection part. The float is rotatably disposed in the first cavity, and a first end portion of the float may float on the water surface. One of the first sensing part and the first detection part is disposed on a second end portion of the float, and the other is disposed on the station. When a water surface in the first cavity drops from a first height to a second height, the float rotates, so that the first end portion of the float drops from the first height to the second height and floats on the water surface. If the first sensing part and the first detection part trigger a signal, or a signal is conducted, it indicates that the water level of the pool is less than the minimum preset water level. In one embodiment, based on the trigger signal, water may be input into the pool by a water supply system (also referred to as a water source system) to adjust the water level of the pool, so that the water level of the pool is not less than the minimum preset water level.

When one first sensing part is disposed on the float, a second detection part is further disposed on the station. When the water level of the first cavity rises from the first height to a third height, the float rotates, so that the first end portion of the float rises from the first height to the third height and floats on the water surface. If the first sensing part on the second end portion of the float and the second detection part trigger a signal, or a signal is conducted, it indicates that the water level of the pool is greater than the maximum preset water level. In this case, the water in the pool is discharged through a water discharge system to adjust the water level of the pool, so that the water level of the pool is not greater than the maximum preset water level. Alternatively, the first detection part is disposed on the second end portion of the float, and the first sensing part and a second sensing part are disposed on the station. If the first detection part and the first sensing part trigger a signal, it indicates that the water level of the pool is less than the minimum preset water level. If the first detection part and the second sensing part trigger a signal, it indicates that the water level of the pool is greater than the maximum preset water level. The water supply system adjusts the water level of the pool based on the trigger signal. For example, the first detection part or the second detection part is a Hall sensor, and the first sensing part or the second sensing part is a magnet. Magnetic flux of the magnet is detected by the Hall sensor to identify the water level of the pool.

In still another embodiment, the water level detection sensor may include a first detection circuit and a second detection circuit. The first detection circuit includes a first detection part exposed in the pool. When the water level of the pool rises to be in contact with the first detection part, the first detection circuit is conducted, indicating that the water level of the pool is greater than the maximum preset water level. In this case, excess liquid in the pool is discharged through the water discharge system. The second detection circuit includes a second detection part exposed in the pool. When the water level of the pool drops from a first height to a second height, the second detection part of the second detection circuit is switched from a state of being in contact with the liquid in the pool to a state of not being in contact with the liquid in the pool, and then the second detection circuit is cut off, indicating that the water level of the pool is less than the minimum preset water level. In this case, water may be input into the pool through the water supply system to adjust the water level of the pool, so that the water level of the pool is not less than the minimum preset water level.

An example in which the sensor included in the cleaning device and/or the station is a communication sensor 410 (also referred to as a communication unit, a communication module, a communication assembly, or a data transmission assembly, where the communication sensor 410 of the cleaning device may also be referred to as a device communication module, and the communication sensor 410 of the station may also be referred to as an assembly communication module) is used. The communication sensor 410 enables communication between various components of the cleaning device and/or the station, and may further communicate with an external device of the cleaning device and/or the station (for example, the cleaning device communicates with the station, and the cleaning device communicates with a first terminal device).

The station and/or the cleaning device may be communicatively connected to various external devices in various means. In some embodiments, the station and/or the cleaning device may directly communicate with various external devices in a wired or wireless manner. Regardless of whether the station and/or the cleaning device is located on the water surface or under the water surface, the station and/or the cleaning device can communicate with the external devices in a same environment or different environments. The wireless communication manner may be radio communication (for example, an ultra-high frequency such as 433 MHz), Wi-Fi. Bluetooth communication, ultrasonic or acoustic wave communication, LoRa (Long Range Radio) communication, near field communication (NFC, Near Field Communication), Li-Fi (Light Fidelity), or the like. However, this is not limited thereto. Communication between the cleaning device and the station is used as an example. In one embodiment, when the cleaning device is located on the water surface, the station may communicate with the cleaning device through Wi-Fi, Bluetooth, or the like. When the cleaning device is located under the water surface, the station may communicate with the cleaning device through low-frequency magnetic induction, acoustic wave communication, optical communication, or the like. In one embodiment, regardless of whether the station and/or the cleaning device are/is located on the water surface or under the water surface, the station and/or the cleaning device may communicate with the external device in a same manner.

Figure 21:
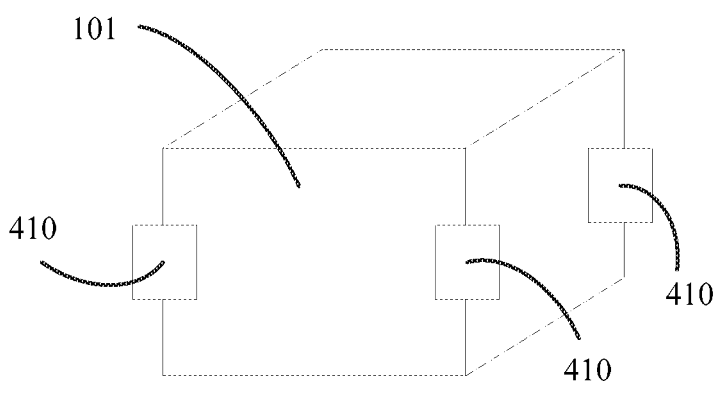
FIG. 21 is a schematic view of a cleaning device according to an embodiment of the present disclosure.

In some embodiments, the station and/or the cleaning device may communicate with each external device through Li-Fi, that is, the communication sensor 410 may be a visible light sensor. Specifically, as shown in FIG. 21, the communication sensor 410 may be disposed at a position on the body 101 different from the top of the body 101, for example, a front side surface, a rear side surface, a left side surface, or a right side face, or located at a joint between these side surfaces, to avoid a problem that the communication sensor 410 is disposed at the top, causing sunlight to interfere with communication. This ensures communication efficiency of Li-Fi. The communication sensor 410 may include a photodiode or any apparatus such as a solar panel that can receive and send a light signal.

In some specific embodiments, the station and/or the cleaning device may include more than one communication sensor 410 to expand a coverage area of receiving a signal and a coverage arca of sending a signal. For example, the communication sensor 410 is disposed at each of joints between the front side surface, the rear side surface, the left side surface, and the right side surface of the body 101. Communication coverage areas of various communication sensors 410 do not at least partially overlap, and an angle of a coverage range in which each communication sensor 410 receives a signal and an angle of a coverage range in which each communication sensor 410 sends a signal are both greater than or equal to 90°, to implement all-around signal coverage. In this way, the user can stably communicate with the cleaning device at any angle through the external device.

In some embodiments, the station and/or the cleaning device may directly communicate with various external devices. In one embodiment, the station communicates with the cleaning device through a water surface relay device. The water surface relay device may be a device that floats or is fixed to the water surface and has a communication function. The water surface relay device may communicate with the cleaning device located under the water surface in a wired or wireless manner and may also communicate with the station located above the water surface in a wired or wireless manner. In this way, communication between the station and the cleaning device may be relayed through the water surface relay device.

In some embodiments, the station and/or the cleaning device may alternatively communicate with a cloud server or the first terminal device in a wired or wireless manner, for example, through the Ethernet, a 4G module, or a 5G module. The first terminal device may be, for example, a remote control, a mobile phone, a tablet computer, a notebook computer, or a desktop computer, and is usually located outside the pool.

In some embodiments, the communication sensor 410 is disposed on the body 101. When the cleaning device 100 is located on the water surface, the communication sensor 410 is at least partially located above the water surface. In one specific embodiment, when the cleaning device 100 is located on the water surface, a signal transceiver of the communication sensor 410 is completely located above the water surface, to improve an effect of communication between the cleaning device and another device. For example, the communication sensor 410 is a Wi-Fi assembly or a Bluetooth assembly. When the cleaning device 100 is located on the water surface, an antenna of the Wi-Fi assembly is completely located above the water surface.

Figure 22:
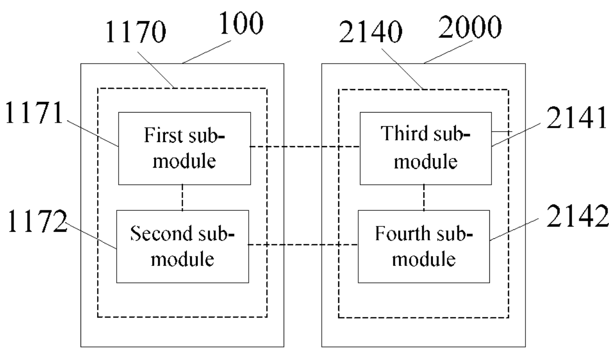
FIG. 22 is a schematic view of a cleaning device and a station according to an embodiment of the present disclosure.

In one specific embodiment, as shown in FIG. 22, the cleaning device 100 includes a device communication module 1170 configured to communicate with the station 2000, the first terminal device, and/or the cloud server in a wireless or wired manner. The station 2000 may include an assembly communication module 2140 configured to communicate with the cleaning device 100, the first terminal device, and/or the cloud server. The device communication module 1170 may include at least one of a first sub-module 1171 or a second sub-module 1172. The assembly communication module 2140 may include at least one of a third sub-module 2141 or a fourth sub-module 2142. The first sub-module 1171 and the third sub-module 2141 are configured to perform underwater communication. The second sub-module 1172 and the fourth sub-module 2142 are configured to perform overwater communication.

In some embodiments, each of the first sub-module, the second sub-module, the third sub-module, and the fourth sub-module may be a communication module, an antenna, or a signal terminal. The first sub-module 1171 and the second sub-module 1172 are electrically connected to the control system of the cleaning device. The third sub-module 2141 and the fourth sub-module 2142 are electrically connected to a control unit of the station. Communication may be understood as signal transmission, data transmission, and the like. The first sub-module 1171 may communicate with the second sub-module 1172 and/or the third sub-module 2141. The fourth sub-module 2142 may communicate with the third sub-module 2141, the second sub-module 1172, and/or the first terminal device. The second sub-module 1172 may communicate with the first terminal device. The first sub-module 1171 may communicate with the second sub-module 1172 through the control system of the cleaning device 100. The third sub-module 2141 may communicate with the fourth sub-module 2142 through the control unit of the station. The control unit of the station may obtain various pieces of data information of the station and analyze and process the obtained data information to control various components of the station. A structure of the control unit may be the same as or different from that of the control system of the cleaning device.

Figure 23:
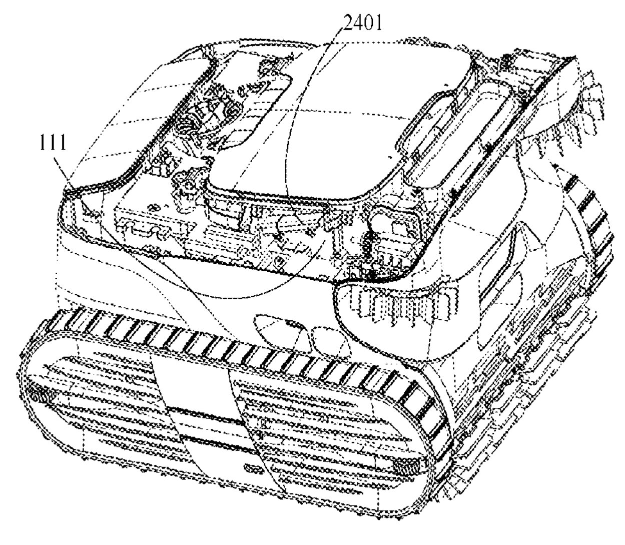
FIG. 23 is a partial schematic structural view of a cleaning device according to an embodiment of the present disclosure.

In some specific embodiments, the first sub-module 1171 and the second sub-module 1172 are separate modules, and the second sub-module 1172 may be disposed on an inner top wall of the body 101, above the buoyancy cavity of the cleaning device, or at any other position close to the top of the body 101, so that when the cleaning device 100 is located on the water surface of the pool or docks at the station, the second sub-module 1172 is located above the water surface, to implement overwater communication between the second sub-module 1172 and the fourth sub-module 2142 or the first terminal device. The second sub-module 1172 may alternatively be disposed in the electronic control box 220 or another confined space. As shown in FIG. 23, an antenna 2401 included in the second sub-module 1172 may be disposed adjacent to or located at the top of the body 101, so that when the cleaning device 100 is located on the water surface of the target region, the antenna 2401 is located above the water surface. In this way, the second sub-module 1172 can send and receive data through the antenna 2401 and further establish the communication connection with another device. The second sub-module 1172 and/or the antenna 2401 may be disposed in a manner, for example, screwed connection, bolt connection, adhesive bonding, snap-fit connection, or magnetic adsorption connection. However, this is not limited thereto. Certainly, the second sub-module 1172 and/or the antenna 2401 may alternatively be disposed at other positions, provided that it can be ensured that the second sub-module 1172 and/or the antenna 2401 can be located above the water surface when the cleaning device 100 is located on the water surface of the target region. Based on the above disposition, the second sub-module 1172 can transmit a data signal in air. This reduces problems, for example, signal attenuation caused by transmission of the data signal between air and liquid.

In some specific embodiments, the first sub-module 1171 and the second sub-module 1172 may be a same module. A position of the body 101 in water is adjusted, so that the device communication module 1170 is submerged or exposed above the water surface, to implement a corresponding function of the first sub-module 1171 or the second sub-module 1172. In some specific embodiments, the first sub-module 1171 and the second sub-module 1172 may be an integrated module. A corresponding function of the first sub-module 1171 or the second sub-module 1172 may be implemented through antennas at different positions or of different types included in the module. For example, if the cleaning device 100 is located in the pool, and at least one antenna of the device communication module 1170 is located above the water surface, the corresponding function of the first sub-module 1171 may be implemented, and if the at least one antenna of the device communication module 1170 is located under the water surface, the corresponding function of the second sub-module 1172 may be implemented.

In other embodiments, the third sub-module 2141 and the fourth sub-module 2142 may be separate modules. The third sub-module 2141 may be disposed at a submerged part of the station. The fourth sub-module 2142 may be disposed at a part of the station, and the part of the station is exposed above the water surface or disposed on the poolside and is connected to the station in a wired or wireless manner. In some specific embodiments, the third sub-module 2141 and the fourth sub-module 2142 may be a same module and disposed near a joint between the station and the water surface of the pool to implement overwater communication and underwater communication. In some specific embodiments, the third sub-module 2141 and the fourth sub-module 2142 may be an integrated module. The integrated module may include antennas disposed at different positions to implement corresponding functions. For example, if at least one antenna of the assembly communication module 2140 is located above the water surface, a corresponding function of overwater communication may be implemented, and if the at least one antenna of the assembly communication module 2140 is located under the water surface, a corresponding function of underwater communication may be implemented.

In some specific embodiments, communication between the first terminal device and the cleaning device 100 may be implemented in the following manners. When the cleaning device 100 docks at the station or is at least partially located above the water surface, and the second sub-module 1172 is located above the water surface, a communication connection may be established between the first terminal device and the second sub-module 1172, so that the first terminal device can directly communicate with the second sub-module, or the first terminal device communicates with the fourth sub-module 2142, and the fourth sub-module 2142 communicates with the second sub-module 1172, or a communication connection may be established between the first terminal device and the second sub-module 1172, the second sub-module 1172 communicates with the first sub-module 1171, and the first sub-module 1171 communicates with the third sub-module 2141, so that the first terminal device can send a control instruction, a signal, data, and the like to the station through the cleaning device 100.

When the cleaning device 100 docks at the station or is located in the water, a communication path may be formed by the first terminal device, the fourth sub-module 2142, the third sub-module 2141, and the first sub-module 1171. Certainly, the first terminal device may send a control instruction and the like to the cleaning device 100 along the communication path, and the cleaning device 100 may also send a signal or data to the first terminal device along the communication path. In this way, a communication connection between the first terminal device and the second sub-module 1172 or the first sub-module 1171 is established.

In one embodiment, if the cleaning device 100 is located in the water, performs communication through the first sub-module 1171, and an amount of signal data that needs to be transmitted is small, for example, a single instruction, one or more transmitters and receivers which are suitable for inefficiently transmitting a sound wave, an ultrasonic wave, a radio signal, or the like over a long distance may be used, so that the cleaning device 100 can establish a communication connection with the station at a position far away from the station. If the amount of signal data that needs to be transmitted is large, for example, updating data or sending a video or a photo, one or more modules, for example, a Wi-Fi assembly, a Bluetooth assembly, or a near field communication assembly, which are suitable for short-distance communication and have high signal transmission efficiency may be used, so that the cleaning device 100 can communicate with the station, for example, transmitting data to the station, at a position in the water, where the position is close to the station, or when the cleaning device 100 docks at the station. If the cleaning device 100 is located on the water surface, that is, performs communication through the second sub-module 1172, one or more modules, for example, the Wi-Fi assembly, the Bluetooth assembly, or the near field communication assembly, which are suitable for overwater communication may be used. It may be understood that when a large amount of data needs to be transmitted, for example, when OTA (Over-the-Air) is performed on the cleaning device 100 such as data update or software update, the cleaning device 100 docks at the station, and the first sub-module 1171 and the third sub-module 2141 may be respectively disposed on relative contact surfaces of the cleaning device 100 and the station and adjacent to each other. When the cleaning device 100 docks, the first sub-module 1171 is adjacent to or abuts against the third sub-module 2141. This improves transmission efficiency of a large amount of data.

In some specific embodiments, the cleaning device 100 may perform a water surface/waterline cleaning mode and an underwater cleaning mode (including at least one of the bottom of the pool, the pool wall, or a suspended object in the water). When the cleaning device 100 is in the underwater cleaning mode, the device communication module 1170 at least includes one first sub-module 1171, that is, at least one sub-module, antenna, or signal terminal of the device communication module 1170 is located under the water surface. When the cleaning device 100 is in the water surface/waterline cleaning mode, the device communication module 1170 at least includes one second sub-module 1172, that is, at least one sub-module, antenna, or signal terminal of the device communication module 1170 is located above the water surface.

In some embodiments, the assembly communication module 2140 may alternatively be an independent module and may be independently disposed at any position in the pool or may be detachably disposed on the station, so that the assembly communication module 2140 can be disposed based on an actual requirement. For example, the assembly communication module 2140 may be disposed at a position in the pool with a strong signal. This is not limited herein. This increases flexibility of disposing the assembly communication module 2140. In some specific embodiments, the assembly communication module 2140 may be fixed in the pool, for example, fixed on an inner wall of the pool or any fixed structure. The assembly communication module 2140 may alternatively be a floating part that floats near the waterline. However, this is not limited thereto. One or more assembly communication modules 2140 may be disposed in a single pool. This is not limited herein.

When the assembly communication module 2140 is an independent module, a control unit may also be disposed only for the assembly communication module 2140. Correspondingly, the third sub-module 2141 and the fourth sub-module 2142 may be electrically connected to the control unit of the assembly communication module. When the third sub-module 2141 and the fourth sub-module 2142 are separate modules, the third sub-module 2141 may be disposed at a submerged part of the assembly communication module 2140, and the fourth sub-module 2142 may be disposed at a part of the assembly communication module 2140, where the part is exposed above the water surface. When the third sub-module 2141 and the fourth sub-module 2142 are an integrated module, the integrated module may include antennas disposed at different positions to implement corresponding functions. For example, if at least one antenna of the assembly communication module 2140 is located above the water surface, a corresponding function of overwater communication may be implemented, and if the at least one antenna of the assembly communication module 2140 is located under the water surface, a corresponding function of underwater communication may be implemented.

In some embodiments, a network access module (not shown in the figure) is further disposed on the station or the assembly communication module 2140. The station or the assembly communication module 2140 can directly have a networking function by using the network access module without being connected to another network device to obtain the networking function, for example, without being connected to a wireless access point through Wi-Fi or connected to a wired access point through a network cable to obtain the networking function, so that the following case can be avoided: Connection fails due to problems, for example, an unstable signal, causing the station or the cleaning device 100 that performs communication through the assembly communication module 2140 to lose a signal. This improves communication stability of the station and/or the cleaning device 100 and prevents mounting and maintenance difficulties and costs from being increased caused by a wired connection.

In some embodiments, as shown in FIG. 16, the communication sensor 410 and the fifth distance sensor 300 may be a same sensor (denoted as a communication ranging sensor), for example, an underwater acoustic sensor. In other words, the communication ranging sensor has a function of measuring a distance and a function of communicating with another device. This effectively reduces costs. In one embodiment, the cleaning device simultaneously sends a ranging signal and a communication signal to an external device through the communication ranging sensor, and the external device simultaneously returns a feedback signal after receiving the ranging signal and receives the communication signal. In other words, a ranging process and a communication process may be implemented in parallel, and one of the ranging process and the communication process can be performed before the other one of the ranging process and the communication process is completed. This significantly improves efficiency of interaction between the cleaning device and the external device.

In one embodiment, the communication sensor 410 is the underwater acoustic sensor. The communication efficiency of the underwater acoustic sensor is higher in water than in air. Therefore, regardless of whether the cleaning device is in the first motion state, the second motion state, or the third motion state, the communication sensor 410 submerges, to improve the communication efficiency of the communication sensor 410.

Figure 24:
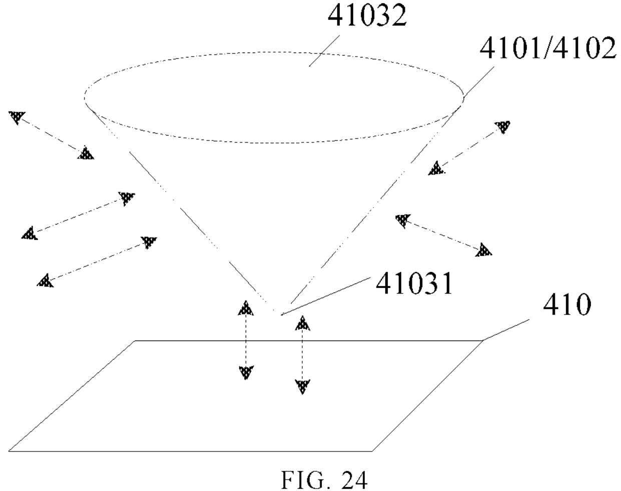
FIG. 24 is a schematic view of a light convergence apparatus and/or a light dispersion apparatus according to an embodiment of the present disclosure.

In some embodiments, when the communication sensor 410 is an optical sensor (including a visible light sensor and an invisible light sensor), a light convergence apparatus 4101 and/or a light dispersion apparatus 4102 may be disposed on the cleaning device and/or the station. The light convergence apparatus 4101 is configured to converge a received light signal to the optical sensor, to effectively avoid signal loss and strength reduction caused by reflection or refraction of the light signal in a propagation process and expand a range in which the optical sensor can receive a signal. The light dispersion apparatus 4102 is configured to disperse a light signal emitted by the optical sensor, to increase a range in which the light signal can be propagated, thereby expanding a communication range of the communication sensor 410. A structure of the light convergence apparatus 4101 may be the same as or different from that of the light dispersion apparatus 4102. As shown in FIG. 24, the light convergence apparatus 4101 and/or the light dispersion apparatus 4102 may include a tapered structure. One end of the tapered structure is sharp and may be considered as a top end 41031. The tapered structure gradually contracts, so that a small opening or a tip is formed. The other end of the tapered structure is wide, may be considered a bottom end 41032, and is usually presented as an approximately circular or oval plane. The tapered structure is gradually expanded from the top end 41031 to the bottom end 41032. When a light signal enters from any point on a transition surface from the top end 41031 to the bottom end 41032, the tapered structure can effectively converge the light signal to the top end 41031. In contrast, if a light signal enters from the top end 41031, the tapered structure may disperse the light signal at any point on the transition surface. The tapered structure is at least made of any material having a light reflection characteristic. An arrow in FIG. 24 indicates a transmission direction of a light signal.

In one embodiment, the communication sensor 410 is disposed adjacent to the top end 41031 of the tapered structure and is located on a convergence path and/or a dispersion path of the light signal, so that the light signal can be effectively received and/or dispersed.

In one embodiment, after the cleaning device 100 communicates with the station, the cleaning device 100 may obtain a position of the station from the station. The position of the station may be obtained after the station identifies the cleaning device 100. After the cleaning device 100 communicates with the station, the cleaning device 100 may float up to the water surface to reduce an impact of electromagnetic attenuation on the device communication module caused by water. The cleaning device 100 may also directly communicate with the station in the water.

In one embodiment, the cleaning device 100 may access a network through the communication sensor 410 and establish a communication connection with an external device, for example, a mobile phone, a tablet computer, a notebook computer, a desktop computer, or the station, so that the user can conveniently control the cleaning device 100 by using the external device.

In some embodiments, after the cleaning device 100 establishes the communication connection with the external device, the user may control, by using the external device, the cleaning device 100 to perform operations, for example, moving, returning to a specific position, starting working, stopping working, selecting a cleaning mode, and selecting a cleaning region. The user may control, by using a physical or virtual button on the external device, the cleaning device 100 to move in any direction, for example, pressing, tapping, or sliding the button. Duration for pressing the button or pressing strength of the button may be adjusted to change moving duration and/or a moving speed of the cleaning device 100. However, this is not limited thereto.

In some embodiments, after the cleaning device 100 establishes the communication connection with the external device, data of the cleaning device 100 may be displayed on a display apparatus of the external device, for example, a remaining battery level of the cleaning device 100, a network connection state, a working state, a map of the target region constructed by the cleaning device 100, a motion trajectory of the cleaning device 100 in the target region, or data detected by the cleaning device 100, for example, water quality data or water temperature data.

In some embodiments, the cleaning device 100 may return to a poolside through the external device in a one-click manner. When the cleaning device 100 floats on the water surface, the user may control, through the external device in the one-click manner, the cleaning device 100 to return to the poolside from the water surface, so that the user can conveniently lift the cleaning device 100 out of the water surface of the swimming pool at the poolside. Specifically, when the cleaning device 100 floats on the water surface, a current orientation of the front side of the cleaning device 100 on the water surface is set as an initial orientation of the cleaning device 100. In this case, the user sends, through the external device based on a use requirement, an instruction that the cleaning device 100 needs to return to the poolside in the one-click manner, and then the cleaning device 100 returns toward a poolside corresponding to the initial orientation. In a returning process, the cleaning device 100 continuously corrects the direction, so that the cleaning device 100 always moves toward the poolside corresponding to the initial orientation until the cleaning device returns to the poolside. Because the handle of the cleaning device may be at an uppermost position on the cleaning device 100, the user can lift the handle at the poolside to quickly lift the cleaning device 100 out of the water surface.

An embodiment provides a method for controlling a cleaning device. The control method is performed by a control system that controls the cleaning device. The control system controls, by using a sensor of the cleaning device, the cleaning device to move and/or perform cleaning in a target region.

Figures 5A, 5B, 6, 7:
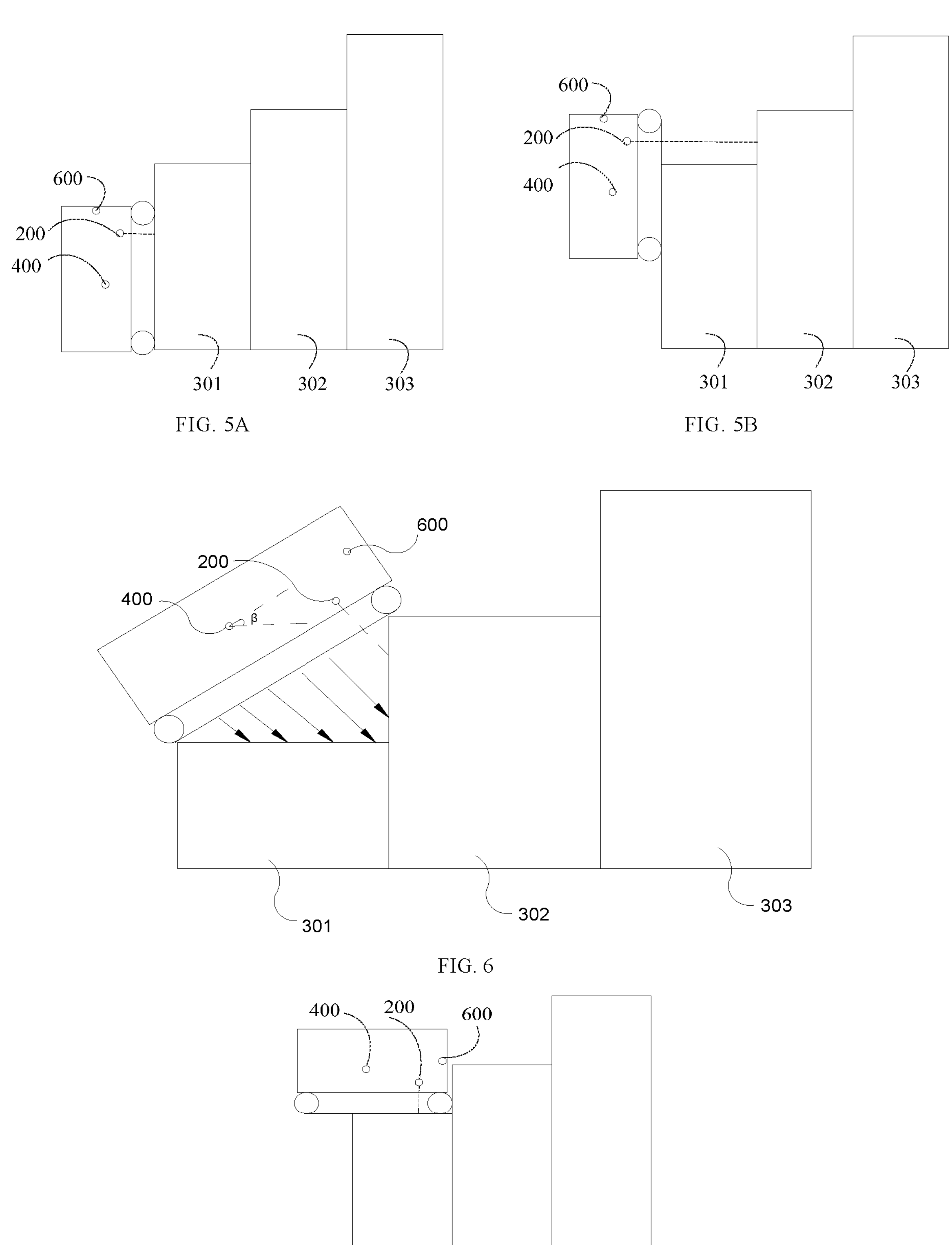
FIG. 5A is a side view showing that a cleaning device moves to be in a vertical state according to an embodiment of the present disclosure.
FIG. 5B is a side view showing that a cleaning device moves to be in a vertical state according to an embodiment of the present disclosure.
FIG. 6 is a schematic view showing that a cleaning device climbs a step according to an embodiment of the present disclosure.
FIG. 7 is a side view showing that a cleaning device is located on a horizontal surface of a first step according to an embodiment of the present disclosure.

In one embodiment, as shown in FIG. 5B, FIG. 6, and FIG. 7, it is first defined that there are M steps, where M≥1 and M is a natural number. For example, the steps include a first step, a second step, a third step, and the like. Each step may include a first surface and a second surface. For case of understanding, in the following descriptions, the first surface of each step is named a vertical surface, and the second surface is named a horizontal surface. An overall process in which the cleaning device meets a step, climbs the step, and cleans the step includes the following:

After a third distance sensor 600 at a front portion of the cleaning device detects an obstacle, or the front portion collides with an obstacle, motion parameters of various components of the cleaning device start to be adjusted. For example, a main water pump may be controlled to be temporarily turned off to reduce downward pressure applied to the cleaning device, so that the cleaning device is switched to a climbing posture, or the front portion of the cleaning device is lifted, so that a moving mechanism 103 continues to move. In this case, a change in a value of a first distance sensor 200 specifically includes the following:

In one embodiment, if a height of the vertical surface of the first step 301 is less than a length of the cleaning device, the first distance sensor 200 is configured as an infrared sensor. Diffuse reflection of signals received and sent by the infrared sensor may occur, so that a receiving portion of the infrared sensor can receive a second signal when the cleaning device is at most tilt angles. In other words, the infrared sensor can obtain a detection value of a distance between the infrared sensor and the obstacle in most cases.

In a process in which the cleaning device climbs the step, a change in the detection value obtained by the infrared sensor includes at least the following: a stable value (indicating a distance between the infrared sensor and a bottom of a pool)→a trend to become larger (the front portion of the cleaning device is lifted, and the distance between the infrared sensor and the bottom of the pool facing the infrared sensor increases)→a relative maximum value (in this case, the infrared sensor faces a joint between the bottom of the pool and the vertical surface of the first step 301)→a trend to become smaller (indicating a distance between the infrared sensor and the vertical surface, of the first step 301, facing the infrared sensor)→a minimum value (indicating that the infrared sensor faces a joint between the vertical surface and the horizontal surface of the first step 301)→a trend to become larger (indicating a distance between the infrared sensor and the horizontal surface of the first step 301)→a relative maximum value (in this case, the infrared sensor faces a joint between the horizontal surface of the first step 301 and the vertical surface of the second step 302) . . . .

In another embodiment, the first distance sensor 200 is configured as an ultrasonic sensor. If the cleaning device tilts at an angle, causing a tilt angle of the receiving portion of the ultrasonic sensor to be too large (for example, greater than 20°) when the receiving portion of the ultrasonic sensor receives the second signal, the receiving portion of the ultrasonic sensor cannot receive the second signal. In this case, a change in a detection value obtained by the ultrasonic sensor includes at least the following: a stable value (indicating a distance between the ultrasonic sensor and the bottom of the pool) sensor and the bottom of the pool)→a trend to become larger (indicating that the front portion of the cleaning device is lifted, and the distance between the ultrasonic sensor and the bottom of the pool facing the ultrasonic sensor becomes larger)→no detection value (indicating that the cleaning device tilts to a certain degree, the sensor does not receive a reflected signal from the bottom of the pool or from the vertical surface of the first step 301, and this process does not necessarily occur)→a large detection value (indicating that the sensor makes a transition from receiving no signal to receiving the reflected signal from the vertical surface of the first step 301, and this process does not necessarily occur)→a small detection value (indicating a detection value at a tail end of the vertical surface at a joint between the vertical surface and the horizontal surface of the first step 301 facing the sensor, and this process also does not necessarily occur)→a minimum value (indicating that the sensor obtains the detection value at a start end of the horizontal surface at the joint between the vertical surface and the horizontal surface of the first step 301 facing the sensor, and this process also does not necessarily occur) →becoming larger (in this case, the sensor can detect the horizontal surface of the first step 301, there is a trend for the detection value to become larger, and this process also does not necessarily occur)→no detection value (indicating that the cleaning device tilts, causing the receiving portion of the sensor to be unable to detect the reflected signal from the horizontal surface of the first step 301 again, and this process does not necessarily occur) . . . .

The change in the value of the first distance sensor 200 occurs in a process in which the cleaning device climbs the first step 301. In this case, the cleaning device continues to climb up in a tilt posture. In another embodiment, if the height of the vertical surface of the first step 301 is greater than the length of the cleaning device, when the cleaning device is in a vertical state, the first distance sensor 200 may obtain a stable detection value. In other words, when the cleaning device moves to be in the vertical state, the first distance sensor 200 detects the distance between the vertical surface of the first step 301 and the first distance sensor 200, and then the cleaning device continues to move until the front portion of the cleaning device exceeds the horizontal surface of the first step 301. In this process, a detection value of each of first distance sensors 200 of different types at least presents the following change rule: a stable value (indicating that the distance between the sensor and the bottom of the pool changes slightly)→the detection value becomes larger (indicating that the front portion of the cleaning device is lifted, the cleaning device starts to climb the step, and the sensor still faces the bottom of the pool)→the detection value becomes smaller (indicating that the cleaning device moves to be substantially in the vertical state, and the sensor faces the vertical surface of the first step 301)→the stable value (indicating that the cleaning device is close to the vertical surface of the first step 301). A posture of the cleaning device may be detected by the above pose sensor. In other words, the stable value may be a detection value of the first distance sensor when the cleaning device moves on a plane.

In one embodiment, the height of the vertical surface of each step is less than or equal to the length of the cleaning device, and the cleaning device climbs the step in the tilt posture. For the above process in which the cleaning device climbs the first step 301, whether the obstacle met by the cleaning device is a step may also be determined based on the change in the detection value obtained by the first distance sensor 200.

Specifically, in one embodiment, if there is a minimum detection value in a plurality of detection values obtained by the first distance sensor 200, that is, indicating that a position detected by the first distance sensor 200 is near a joint line between a vertical surface and a horizontal surface of one step, it indicates that in this case, the cleaning device continues to climb the step upward in the tilt posture. For example, this case may be a case where the first distance sensor 200 is an infrared sensor. If the first distance sensor 200 has not obtained a stable value after the cleaning device climbs over the vertical surface of the first step 301, it indicates that the first distance sensor 200 cannot receive the second signal or indicates that the cleaning device continues to climb the step upward in the tilt posture. For example, this case may be a case where the first distance sensor 200 is an ultrasonic sensor.

In another embodiment, if the cleaning device climbs a step whose height of the vertical surface is greater than the length of the cleaning device, when the cleaning device is completely vertical, the detection value obtained by the first distance sensor 200 is stable. Then, the cleaning device continues to climb upward, so that the first distance sensor 200 obtains a large detection value after a period of time. The detection value is a detection value, obtained by the first distance sensor 200, of a distance between the first distance sensor 200 and the vertical surface of the second step 302, that is, a position detected by the first distance sensor 200 makes a transition from the vertical surface of the first step 301 to the vertical surface of the second step 302. Then, the cleaning device makes a transition from the vertical state to a horizontal state, and a change in the detection value obtained by the first distance sensor 200 is consistent with the above change of the detection value when the cleaning device climbs the step. Details are not described herein.

To facilitate climbing and cleaning of the step by the cleaning device, an example in which the height of the vertical surface of the step is less than or equal to the length of the cleaning device is used in this embodiment to describe steps of climbing and cleaning the step by the cleaning device. After the cleaning device leans against the to-be-cleaned bottom of the pool and the first step 301, if the moving mechanism 103 continues to move forward, and the main water pump is turned off, the cleaning device always moves upward at a tilt angle at which the cleaning device leans against the to-be-cleaned bottom of the pool and the first step 301.

In one embodiment, if a width of the step, namely, a width of the horizontal surface of the step, is less than or equal to the length of the cleaning device, when the cleaning device makes a transition from the vertical surface of the step in a tilt state, the cleaning device moves upward in the tilt posture without passing through the horizontal surface of the step. Alternatively, the cleaning device may adjust a moving direction, so that the bottom of the cleaning device is at least partially attached to the horizontal surface of the step. In this way, the cleaning device makes a transition from the vertical surface of the step to the horizontal surface of the step, and then moves from the horizontal surface of the step to a vertical surface of a next step.

In another embodiment, if the width of the horizontal surface of the step is greater than the length of the cleaning device, when the cleaning device makes a transition from the vertical surface of the step in the tilt state, the cleaning device may make a transition from the vertical surface of the step to the horizontal surface of the step, and then move from the horizontal surface of the step to a vertical surface of a next step.

In the above two embodiments, in the process in which the cleaning device climbs the step, the main water pump may be turned on or a moving speed of the moving mechanism 103 may be reduced at suitable time, so that the cleaning device can directly fall on a horizontal surface of each step in the step climbing process to clean the step.

Figure 8:
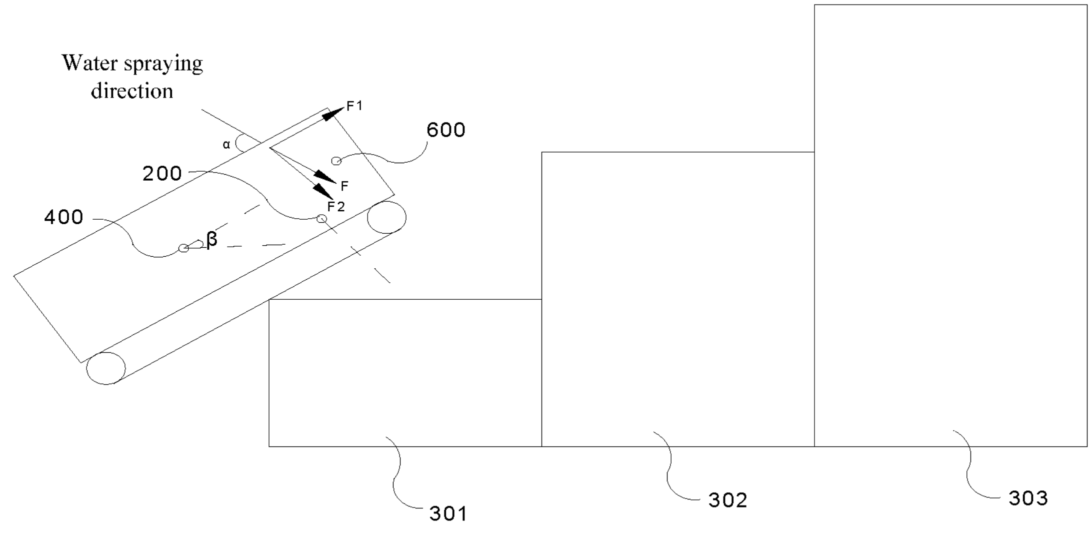
FIG. 8 shows a water spraying direction of a cleaning device when the cleaning device climbs a step according to an embodiment of the present disclosure.

In one embodiment, as shown in FIG. 6, FIG. 7, and FIG. 8, when the cleaning device is about to climb up to the horizontal surface of the first step 301 in the tilt state, the tilt angle of the cleaning device is adjusted based on the detection value obtained by the first distance sensor 200. In this case, the moving mechanism 103 may stop moving, or the moving speed of the moving mechanism may be reduced, and the cleaning device may make a transition from the tilt state to the horizontal state under gravity of the cleaning device, to fall on the horizontal surface of the first step 301. Alternatively, water is sprayed through a first water outlet 101C at the top of the cleaning device (for example, disposed at a front portion at the top of the cleaning device) in a direction away from the cleaning device, to apply pressure F, whose direction is opposite to the water spraying direction, to the cleaning device, so that the cleaning device is pressed toward the horizontal surface of the first step 301. This improves stability of transition of the cleaning device from the vertical surface of the first step 301 to the horizontal surface of the first step 301.

Figure 9:
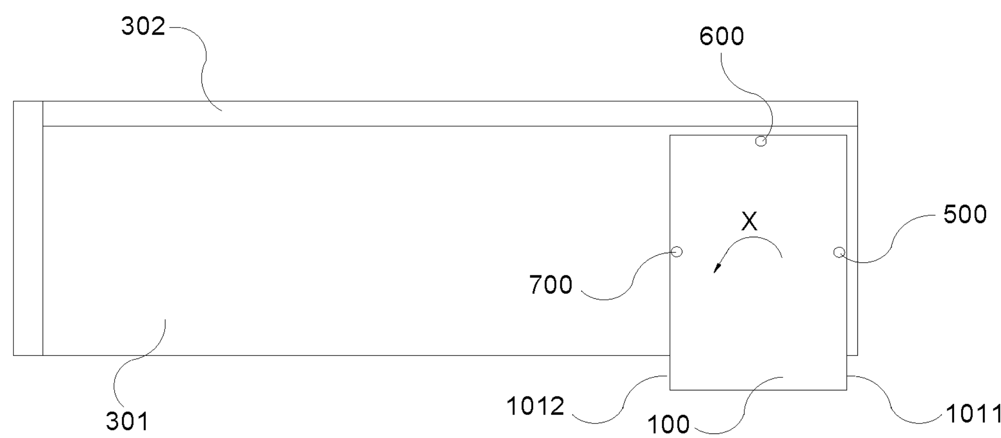
FIG. 9 is a top view showing that a cleaning device is located on a horizontal surface of a first step according to an embodiment of the present disclosure.
Figure 9:
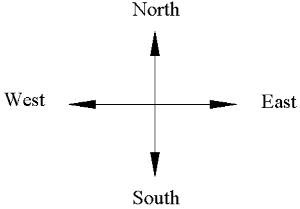
Figure 10:
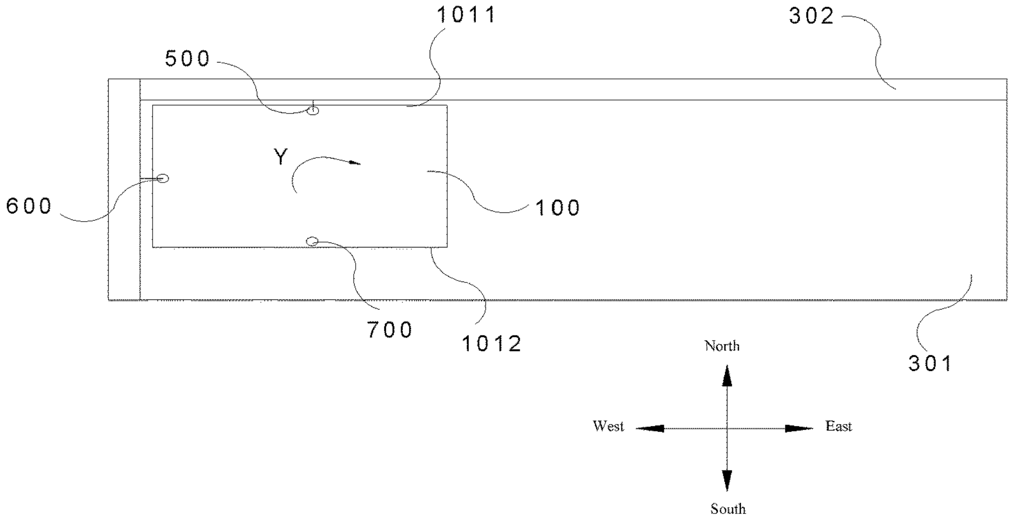
FIG. 10 is a top view showing that a cleaning device cleans a horizontal surface of a first step according to an embodiment of the present disclosure.

In one embodiment, as shown in FIG. 9 and FIG. 10, an example in which the step is a rectangular step whose longer side runs east-west is used. The first distance sensor 200 located at a front end of the bottom of the body 101, a second distance sensor 500 located on a first side surface 1011 of the body 101, or a fourth distance sensor 700 located on a second side surface 1012 of the body 101 is disposed on the cleaning device. When the cleaning device climbs to the horizontal surface of the first step 301, the cleaning device moves toward the vertical surface of the second step 302 until a front end of the cleaning device touches the vertical surface of the second step 302, or a distance between the front end of the cleaning device and the vertical surface of the second step 302 is less than a preset distance. Then, the cleaning device moves backward in a direction away from the vertical surface of the second step 302, and then translates in a first direction Z shown in FIG. 15. Then, the cleaning device continues to move toward the vertical surface of the second step 302. The rest is deduced by analogy until a motion route of the cleaning device covers the horizontal surface of the first step 301, so that cleaning of the entire horizontal surface of the first step 301 is completed. After cleaning the entire horizontal surface of the first step 301, the cleaning device moves to an initial position at which the cleaning device first climbs up to the first step 301 or moves to another end of the first step 301 as a start position, and then climbs from the first step 301 to the second step 302. The above steps are repeated, so that the second step 302, the third step 303, and the like are cleaned.

In this embodiment, whether the cleaning device covers the horizontal surface of the first step 301 is determined in the following manner. If there are walls at two ends of the step, the second distance sensor 500 or the fourth distance sensor 700 may be used to determine whether the cleaning device meets an obstacle (for example, the wall) in an east-west direction, that is, to determine whether the cleaning device is at a tail end of the first step 301, or the first distance sensor 200 may be used to determine whether the cleaning device is close to an overhanging region in the east-west direction, and if the cleaning device is close to the overhanging region, it indicates that the cleaning device has reached an end portion of the first step 301 along this motion path. If the two ends of the first step 301 are open-ended, that is, there are no obstacles at the two ends of the step, as shown in FIG. 4A, first distance sensors 200 are disposed close to a left edge and a right edge of the bottom of the cleaning device, and the two first distance sensors 200 may be configured to respectively detect ground conditions on the left side and the right side of the cleaning device. In one embodiment, the first distance sensors 200 may be symmetrically disposed on the body 101.

In one embodiment, when there is more than one first distance sensor 200, types of different first distance sensors may be different or the same. For example, when the cleaning device includes two first distance sensors, the two first distance sensors may be both ultrasonic sensors or infrared sensors, or one is an ultrasonic sensor, and the other one is an infrared sensor.

In this embodiment, the first direction Z is a length direction of the horizontal surface of the step, and a preset distance over which the cleaning device translates on the horizontal surface of the step may be set to be, for example, greater than or equal to half of the width of the cleaning device or less than or equal to the width of the cleaning device.

In another embodiment, as shown in FIG. 1, FIG. 4A, FIG. 4B, FIG. 9, FIG. 10, FIG. 11, and FIG. 12, the first distance sensor 200 located at the front end of the bottom of the body 101, the second distance sensor 500 located on the first side surface 1011 of the body 101, and the fourth distance sensor 700 located on the second side surface 1012 of the body 101 are disposed on the cleaning device. The first distance sensor 200 cooperates with the second distance sensor 500 and the fourth distance sensor 700, so that safety of motion of the cleaning device on the motion surface of the step can be improved, and a risk that the cleaning device falls can be reduced.

Specifically, when the cleaning device moves to the horizontal surface of the first step 301, the cleaning device moves toward the vertical surface of the second step 302 until the front end of the cleaning device touches the vertical surface of the second step 302, or the third distance sensor 600 detects that the cleaning device is close to the vertical surface of the second step 302. Then, the cleaning device rotates by 90° in a first rotation direction X, that is, the cleaning device rotates counterclockwise by 90°, so that the first side surface 1011 of the cleaning device and the second distance sensor 500 face the vertical surface of the second step 302. In this case, the cleaning device moves from cast to west in the length direction of the horizontal surface of the first step 301 until the front end of the cleaning device is close to an obstacle (for example, the wall), and the cleaning device is at the tail end of the first step 301. In this case, the cleaning device has completed cleaning of the horizontal surface of the first step 301 and may rotate by 90° in a second rotation direction Y, that is, the cleaning device rotates clockwise by 90° and then climbs from the first step 301 to the second step 302.

After climbing the second step 302, the cleaning device rotates by 90° in the second rotation direction Y, that is, the cleaning device rotates clockwise by 90°, so that the second side surface 1012 of the cleaning device and the fourth distance sensor 700 face the vertical surface of the third step 303. Then, the cleaning device moves from west to cast in a length direction of the horizontal surface of the second step 302 until the front end of the cleaning device is close to an obstacle (for example, a wall), and the cleaning device is at a tail end of the second step 302. In this case, the cleaning device completes cleaning of the horizontal surface of the second step 302. The rest is deduced by analogy until the cleaning device completes cleaning of all steps. In other descriptions, for each step, an cast tail end may be defined as a first end, and a west tail end may be defined as a second end.

In this embodiment, if a width of each step is much greater than the width of the cleaning device, it indicates that after the cleaning device moves once, the cleaning device cannot cover the horizontal surface of each step in a width direction of the horizontal surface of the step. In other words, when the cleaning device cleans the horizontal surface of the step along an edge, the cleaning device cannot directly complete cleaning of the horizontal surface of each step once. The cleaning device may clean the horizontal surface of the step along any cleaning path, for example, a bow-shaped path (the bow-shaped path means that two adjacent paths are parallel to each other, and the cleaning device moves along the two adjacent paths in two opposite forward directions), a square spiral path, or a random path. For example, a process of cleaning the horizontal surface of the step may include: If $N<M$, after the cleaning device performs cleaning once on an $N^{th}$ step in the Z direction, the cleaning device translates for a specific distance on a horizontal surface of the step in a direction away from a vertical surface of an $N+1^{st}$ step, and then continues to repeatedly clean the horizontal surface of the $N^{th}$ step in the Z direction until cleaning of the horizontal surface of the $N^{th}$ step is completed. If $N=M$, and an $M^{th}$ step is close to a vertical surface of a non-step, for example, a wall, after the cleaning device performs cleaning once on the $N^{th}$ step in the Z direction, the cleaning device may translate for a specific distance on a horizontal surface of the step in a direction away from the vertical surface of the non-step, and then continue to repeatedly clean the horizontal surface of the $N^{th}$ step in the Z direction until cleaning of the horizontal surface of the $N^{th}$ step is completed. If the $M^{th}$ step is a platform, the cleaning device may perform cleaning on the step along any cleaning path. Herein, $1 \leq N \leq M$, and N is a natural number.

Figure 13:
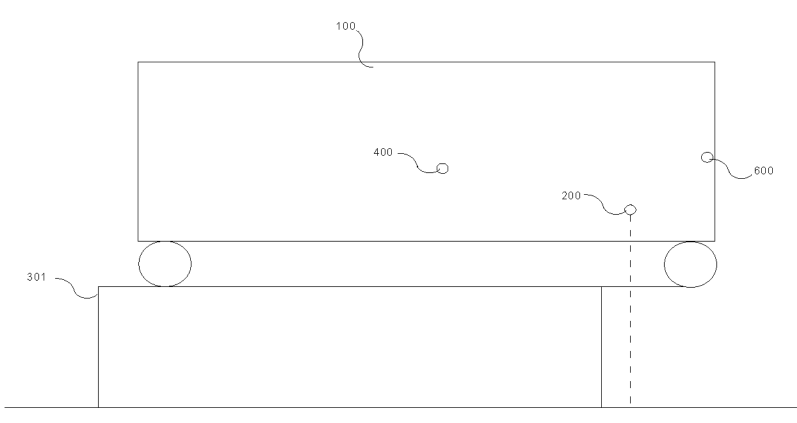
FIG. 13 is a side view showing that a cleaning device is located on a horizontal surface of a first step according to an embodiment of the present disclosure.

In one embodiment, as shown in FIG. 13, usually, when the cleaning device moves on the horizontal surface of each step or moves in another region in which the cleaning device may fall, the detection value collected by the first distance sensor 200 at the bottom of the cleaning device should always be within a fixed range. However, when the detection value collected by the first distance sensor 200 suddenly becomes larger or is suddenly lost, it indicates that the first distance sensor 200 detects a surface lower than the horizontal surface of the step, and the cleaning device is located at an edge (also referred to as an open edge or an unenclosed edge) of the step. In this case, the cleaning device may be prevented from continuing to move beyond the edge of the step in at least one of the following measures: controlling the moving mechanism 103, the propulsion assembly 180, or the suction mechanism to gradually slow down, stop operating, or operate reversely to control the cleaning device to brake; controlling the cleaning device to change a moving direction, for example, controlling the cleaning device to move backward in an opposite direction or turn around; or controlling the suction mechanism or another apparatus having a water spraying function to adjust a water spraying direction, so that a sprayed water flow generates a reaction force whose direction is opposite to the current moving direction of the cleaning device, to prevent the cleaning device from continuing to move beyond the edge of the step. In the above manner, a risk that the cleaning device falls from the overhanging region in a process of continuing to move forward can be reduced.

In other embodiments, a change in a topography of a region in the pool can be further estimated based on a curve indicating the change in the detection value collected by the first distance sensor 200, so that a map of the region in the pool can be drawn based on the change and updated to a map of the pool. This improves efficiency of the cleaning device in subsequently cleaning the pool. For example, a position, at an edge of the step or at an edge of the overhanging region, at which the cleaning device is located is recorded, so that when the cleaning device subsequently approaches the position again, a measure for preventing the cleaning device from falling can be taken in time. This further reduces the risk that the cleaning device falls from the overhanging region in the moving process.

In other embodiments, the cleaning device may further move on the water surface or perform water surface cleaning. In this case, the first distance sensor 200 may detect a condition of the bottom of the pool in real time, and a map of the bottom of the pool may also be drawn and updated based on the detection value obtained by the first distance sensor 200. For example, when the cleaning device moves on the water surface, the first distance sensor 200 detects a topography condition below the water surface in real time. When the cleaning device moves to a position on the water surface, and there is a step below the position, the detection value of the first distance sensor 200 can reflect a topography characteristic below the position on the water surface. When the cleaning device traverses the water surface, underwater topography parameters of the entire pool can be obtained, so that an original map of the pool can be updated to show detected data such as step data on the updated map, thereby constructing a more complete 3D map of the pool.

In one embodiment, if the cleaning device is falling from the edge of the overhanging region, the cleaning device may be prevented from continuing to fall in at least one of the following measures: controlling the moving mechanism 103, the propulsion assembly 180, or the suction mechanism to operate reversely to control the cleaning device to move reversely; controlling the cleaning device to change a moving direction, for example, controlling the cleaning device to turn around; or controlling the suction mechanism or another apparatus having a water spraying function to adjust a water spraying direction, so that a sprayed water flow generates a reaction force whose direction is opposite to the current moving direction of the cleaning device, so that the cleaning device returns to the edge of the overhanging region. In the above manner, the following case can be avoided: The cleaning device 100 steps into the overhanging region, causing the cleaning device 100 to flip or be damaged and an operation process of the cleaning device to be interrupted. This improves operation efficiency of the cleaning device. Whether the cleaning device is falling from the edge of the overhanging region may be determined by the pose sensor and/or the first distance sensor 200. For example, when the pose sensor detects that a tilt angle of the cleaning device gradually increases, and the detection value of the first distance sensor 200 gradually decreases, it is considered that the cleaning device is falling from the edge of the overhanging region.

Figure 15:
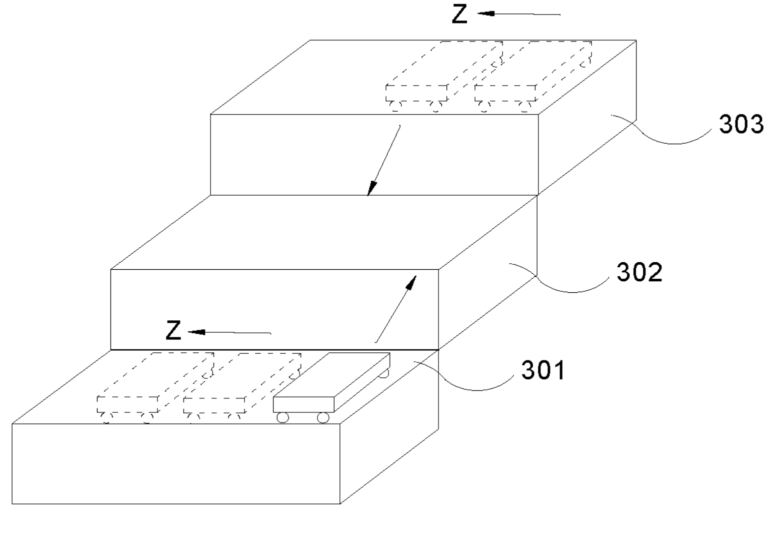
FIG. 15 is a schematic view showing that a cleaning device climbs from a bottom of a step to a top of the step according to an embodiment of the present disclosure.

In one embodiment, as shown in FIG. 15, the present disclosure further provides a method for controlling a cleaning device. The method includes the following steps.

After it is detected that the cleaning device approaches or collides with an obstacle, the cleaning device is controlled to move on a bottom of a pool in a posture in which the cleaning device is prepared to climb the obstacle, and a detection value of a first distance sensor 200 is obtained.

Specifically, after it is detected that the cleaning device is about to approach or meet an obstacle, the cleaning device is controlled to climb the obstacle, a front portion of the cleaning device is lifted to continue to move in the posture of climbing the obstacle, and the detection value collected by the first distance sensor 200 is obtained in real time or is controlled to be obtained. It may be understood that in this case, the detection value collected by the first distance sensor 200 is a detection value of a distance between the first distance sensor 200 and the obstacle and can reflect a shape of the obstacle or reflect posture information of the cleaning device when the first distance sensor is in combination with a pose sensor (for example, an inertial measurement unit IMU) on the cleaning device. In a pool or a swimming pool, the obstacle is mainly a fixed construction, for example, a side wall and a step. For example, a stone and a bump at the bottom of the pool may be sensed in other manners, and the cleaning device may be controlled correspondingly. In this embodiment, the cleaning device identifies a wall and a step by using a plurality of sensors disposed on the cleaning device, and the cleaning device is correspondingly controlled to efficiently clean the step. That the cleaning device approaches the obstacle may be that a distance between the cleaning device and the obstacle is less than a preset distance.

In one embodiment, at least one third distance sensor 600 is disposed at the front portion of the cleaning device. The third distance sensor 600 is configured to collect a detection value of a distance between the cleaning device and an obstacle in front of the cleaning device. When the detection value collected by the third distance sensor 600 is less than or equal to a preset threshold, it is determined that the cleaning device is about to collide with or collides with the obstacle.

In one embodiment, a collision sensor may be disposed at the front portion of the cleaning device or inside the cleaning device. After it is detected that the collision sensor is triggered, or a detection data of the collision sensor suddenly changes, it is determined that the cleaning device collides with the obstacle.

In one embodiment, the obstacle is determined as a step based on at least one of a detection value of the first distance sensor 200, posture information of the cleaning device, depth information of the cleaning device, or detection information of a vision sensor of the cleaning device. In a specific embodiment, if after a stage in which the detection value collected by the first distance sensor 200 becomes larger from a relatively stable value occurs at least once, a stable detection value is not collected again within a preset time period, it is determined that the obstacle is the step. In a specific embodiment, if the posture information indicates that the cleaning device becomes from approximately horizontal to approximately vertical and then to approximately horizontal at least once, it is determined that the obstacle is the step. The posture information may be obtained by the pose sensor on the cleaning device. In a specific embodiment, if the depth information indicates that a depth of the cleaning device decreases, it is determined, in combination with the detection value of the first distance sensor 200 and/or the posture information of the cleaning device, that the obstacle is the step. The depth information may be obtained by a depth sensor on the cleaning device. In a specific embodiment, if similarity between an image of the obstacle captured by the vision sensor and an image of the step is greater than a preset threshold, it is determined that the obstacle is the step.

After it is determined that the obstacle is the step, the cleaning device is controlled to climb up to a horizontal surface of the step.

An orientation of the cleaning device on the horizontal surface of the step is adjusted, so that a first side surface or a second side surface is substantially parallel to a vertical surface of another step higher than the step.

The cleaning device is controlled, at least based on a detection value of a second distance sensor or a detection value of a fourth distance sensor, to clean the horizontal surface of the step.

Specifically, as shown in FIG. 5B, FIG. 6, FIG. 7, and FIG. 8, after it is detected that there is an obstacle in front of the cleaning device, the cleaning device may perform a climbing action and be in a climbing posture. Under the combined action of a moving mechanism 103 and/or a main water pump of the cleaning device, the front portion of the cleaning device is lifted, and the moving mechanism 103 at the front portion moves to a surface of the obstacle detected by the third distance sensor 600, and the moving mechanism 103 at a rear portion remains on a to-be-cleaned surface. A plurality of sensors, for example, pose sensors, disposed on the body 101 of the cleaning device may detect a tilt state of the cleaning device.

When the cleaning device climbs upward from the bottom of the pool, due to characteristics of the first distance sensor 200, for example, an ultrasonic sensor or an infrared sensor, each of the ultrasonic sensor and the infrared sensor includes a transmitting portion and a reflection receiving portion. When there is a signal at the reflection receiving portion, it indicates that it is suitable to use the sensor to detect an obstacle under the bottom of the cleaning device at a current position of the cleaning device.

In one embodiment, in a climbing process of the cleaning device, the ultrasonic sensor goes through at least one of the following stages: The detection value gradually increases, there is no detection value, the detection value is large, or the detection value gradually decreases until the detection value is within a normal detection value range existing when the cleaning device moves on the to-be-cleaned surface. That the detection value gradually increases indicates that a tilt degree of the front portion of the cleaning device relative to the to-be-cleaned surface increases. That there is no detection value indicates that the first distance sensor 200 cannot receive an effective reflected signal when the tilt degree of the front portion of the cleaning device increases. That the detection value is large indicates that the first distance sensor 200 can receive the reflected signal again as a posture of the cleaning device changes, and in this case, the sensor is further away from a detected surface. That the detection value decreases indicates that when the cleaning device continues to remain the above movement trend, a distance between the cleaning device and the to-be-detected surface becomes smaller until the cleaning device is approximately parallel to the to-be-detected surface, and subsequently, the detection value of the first distance sensor 200 remains stable.

In another embodiment, the obstacle in front of the cleaning device is a wall of the pool, and in the climbing process of the cleaning device, as described above, the detection value of the first distance sensor 200 goes through the following stages: The detection value gradually increases, there is no detection value (this stage does not necessarily occur), the detection value is large, or the detection value gradually decreases until the detection value is within a normal detection value range. If the obstacle in front of the cleaning device is a step, the step herein may be understood as a step with a specific height, and in the climbing process of the cleaning device, after the detection value of the ultrasonic sensor goes through a stage in which the detection value gradually increases and a stage in which there is no detection value (this stage does not necessarily occur), the detection value usually changes all the time, and the detection value remains stable for a short time.

In one embodiment, if the height of the step is high, for example, greater than the length of the cleaning device, the cleaning device may climb to be in a state shown in FIG. 5A, and the first distance sensor 200 may detect the vertical surface of the step 301. Then, as shown in FIG. 5B, the cleaning device continues to move upward along the vertical surface of the step 301, and after the cleaning device exceeds the horizontal surface of the step 301, the detection value of the first distance sensor 200 suddenly increases, that is, the first distance sensor detects the vertical surface of the step 302. Dashed lines in FIG. 1, FIG. 5A, FIG. 5B, FIG. 6, FIG. 7, FIG. 8, and FIG. 13 indicate a detection orientation of the first distance sensor 200.

In another embodiment, if the height of the step is small, for example, less than the length of the cleaning device, a moving process of the cleaning device may be as shown in FIG. 6. When the moving mechanism 103 at the front portion of the cleaning device moves upward along the vertical surface of the first step 301, and the cleaning device has not yet been completely vertical or is still far from vertical, there is a high probability that the cleaning device always moves across the steps at this tilt angle. In this process, if the width of the horizontal surface of each step is less than the length of the cleaning device or slightly greater than the length of the cleaning device, a change trend of the detection value of the first distance sensor 200 is substantially as follows: a normal value (in this case, the cleaning device moves on the to-be-cleaned surface and has not reached the step), the detection value gradually increases (the front portion of the cleaning device is lifted, the cleaning device starts to climb the step, and a distance between the first distance sensor 200 and the to-be-cleaned bottom of the pool gradually increases), there is no detection value (for the to-be-cleaned bottom of the pool and a lower part of the vertical surface of the first step 301, a tilt degree of the cleaning device is beyond the detection range of the ultrasonic sensor) . . . . Subsequently, when the cleaning device always moves in this posture, an unstable detection value may be obtained by the ultrasonic sensor based on the height of the step, the width of the step, and the moving speed and posture of the cleaning device. In general, the detection value changes regularly. The width of the step indicates a distance between a vertical surface of an $N^{th}$ step and a vertical surface of an $N+1^{st}$ step, where $1 \le N \le M$, and N and M are natural numbers.

In this embodiment, if an infrared sensor is used, a change trend of the detection value of the first distance sensor 200 is approximately as follows: a normal value (in this case, the cleaning device moves on the to-be-cleaned surface and has not reached the step), the detection value gradually increases (the front portion of the cleaning device is lifted, the cleaning device starts to climb the step, and a distance between the infrared sensor and the to-be-cleaned bottom of the pool gradually increases), a relatively maximum detection value (the infrared sensor of the cleaning device faces a joint between the bottom of the pool and the first step 301), the detection value gradually decreases (the infrared sensor faces the vertical surface of the first step 301), a small detection value (the infrared sensor faces a joint between the vertical surface and the horizontal surface of the first step 301), the detection value gradually increases (for the horizontal surface of the first step 301), a large detection value (for a joint between the horizontal surface of the first step 301 and the vertical surface of the second step 302) . . . .

For a case where a height of a step of a current swimming pools is usually less than the length of the cleaning device, a method for determining whether the obstacle in front of the cleaning device is a step is as follows: If in a process in which the cleaning device moves at a specific operation parameter, the detection value obtained by the first distance sensor 200 does not remain stable after going through a change stage, and additionally, the pose sensor indicates that the tilt angle of the cleaning device also remains stable, it may be roughly determined that this topography feature is a step.

Alternatively, if in a process in which the cleaning device moves at a specific operation parameter, the detection value obtained by the first distance sensor 200 changes suddenly, is greater than a preset threshold, or is suddenly lost, and additionally, the tilt angle of the cleaning device obtained by the pose sensor indicates that the cleaning device is climbing, it may be roughly determined that this topography feature is a step.

In the above method for controlling the cleaning device, whether the obstacle met by the cleaning device is a step is determined by using the first distance sensor 200, and when it is determined that the obstacle is the step, the cleaning device is controlled to climb the step. This improves operation efficiency of the cleaning device.

In an application scenario, a stable detection value obtained by the first distance sensor 200 is set to be a first distance threshold, and the first distance threshold is equal to a detection value collected by the first distance sensor 200 when the cleaning device moves on a plane. Specifically, if the detection value collected by the first distance sensor 200 is less than or equal to the detection value collected by the first distance sensor 200 when the cleaning device moves on the plane, it indicates that the cleaning device moves on the plane. If the detection value collected by the first distance sensor 200 is greater than the detection value collected by the first distance sensor 200 when the cleaning device moves on the plane, namely, the first distance threshold, it indicates that there is an overhanging region at the plane, or the plane is recessed downward.

In another application scenario, considering that there may be small dents on some to-be-cleaned surfaces, if the first distance threshold is set to be equal to the detection value collected by the first distance sensor 200 when the cleaning device moves on the plane, the control system may determine the small dent as an overhanging region to perform avoidance. Therefore, to reduce a misjudgment probability, the first distance threshold is set to be a reliable range.

The normal detection value of the first distance sensor 200 is a conventional distance between a detection unit of the first distance sensor 200 and the to-be-cleaned surface when the cleaning device moves on the plane, for example. 5 cm. The first distance threshold may be set to range from 3 cm to 10 cm, for example, set to be any of 3 cm. 4 cm. 5 cm, 6 cm. 7 cm. 8 cm. 9 cm, and 10 cm, to reduce misjudgment.

In one embodiment, at least two first distance sensors 200 are disposed at the front end of the bottom of the cleaning device. The at least two first distance sensors 200 are arranged in a direction perpendicular to the moving direction of the cleaning device, that is, along the width direction of the cleaning device. The two first distance sensors 200 are a first distance sensor disposed on a left side and a first distance sensor disposed on a right side in the forward direction of the cleaning device, that is, a sensor located on the left and a sensor located on the right in a direction from the rear portion to the front portion of the cleaning device. The two first distance sensors 200 are disposed to respectively detect whether there is an overhanging region on two sides of the cleaning device. In one embodiment, for example, when the cleaning device cleans the horizontal surface of the step, if the width of the horizontal surface of the step is greater than or equal to the width of the cleaning device, the two first distance sensors 200 both have a detection value. In another embodiment, if the width of the horizontal surface of the step is less than the width of the cleaning device, when the cleaning device moves along the length direction of the horizontal surface of the step, only one first distance sensor 200 has a detection value, and the other first distance sensor 200 does not have a detection value, or detection values of the two first distance sensors are unequal, and if the right side of the cleaning device moves along the length direction of the horizontal surface of the step, the first distance sensor on the right side detects a distance between the first distance sensor and the horizontal surface of the step, the first distance sensor on the left side detects a distance between the first distance sensor and a horizontal surface of a previous step relative to the step or a distance between the first distance sensor and the bottom wall, and a difference between the two detection values obtained on the left side and the right side is approximately a height of the step.

In still another embodiment, if the cleaning device moves on and performs cleaning on a platform or a step, the cleaning device may be controlled by using the first distance sensor 200, to prevent the cleaning device from falling into an overhanging region.

For example, a process of cleaning the platform or the step includes: identifying the platform or the step based on data of a sensor (for example, the vision sensor 140 and/or the depth sensor 233), and after the platform or the step is identified, controlling the cleaning device 100 to directly move to the platform or the step to perform cleaning, or recording position information of the platform or the step, and after another task is completed, controlling, based on information of an end position, the cleaning device 100 to move to the recorded platform or step to perform cleaning. The position information of the recorded platform or step may be coordinate information of the platform or the step in the constructed map of the target region or may be another positioning information. A manner in which the cleaning device 100 moves to the platform or the step may be that the cleaning device 100 is controlled to move along the bow-shaped path in a direction of a recorded position of the platform or the step relative to the end position until the cleaning device 100 is close to the platform or the step, or the cleaning device 100 may directly plan a path and move to the platform or the step based on the recorded position and the information of the end position. This is not limited herein.

In some embodiments, after reaching the platform, the cleaning device 100 may climb upward from a step of the platform until the cleaning device 100 moves to a surface of the platform, and then clean the surface of the platform. If a cleaning condition is not met, for example, an area of the current platform is less than a preset moveable area of the cleaning device 100, for example, less than an area of the bottom of the cleaning device 100, and there are also other steps on the platform, the cleaning device 100 may be controlled to continue to climb until cleaning of a specific surface of the platform is completed, cleaning time is greater than preset time, a cleaning height is greater than a preset height (that is, a depth at which the cleaning device is located is less than a preset depth), or cleaning of the entire plane of the platform is completed. After cleaning is completed, or the cleaning condition is not met, the cleaning device 100 may move backward or turn around to leave the platform to perform subsequent operations, for example, moving to a next recorded platform, continuing to perform another cleaning task, or returning to a specific position.

In some embodiments, after reaching the step, the cleaning device 100 may climb upward until the cleaning device 100 moves to the horizontal surface of the step, and then clean the horizontal surface of the step. If a cleaning condition is not met, for example, an area of the horizontal surface of the current step is less than the preset moveable area of the cleaning device 100, for example, less than the area of the bottom of the cleaning device 100, and there are also other steps, the cleaning device 100 may be controlled to continue to climb until cleaning of a specific horizontal surface of the step is completed, cleaning time is greater than preset time, a cleaning height is greater than a preset height (that is, a depth at which the cleaning device is located is less than a preset depth), or cleaning of the entire step is completed. After cleaning is completed, or the cleaning condition is not met, the cleaning device 100 may move backward or turn around to move toward an N−1$^{st}$ step or the bottom of the pool to leave the step, to perform subsequent operations, for example, moving to a step at another position, continuing to perform another cleaning task, or returning to a specific position.

In some embodiments, the cleaning device may move to the side wall, the water surface, the bottom of the pool, a next platform or step, a docking location (for example, an edge of the target region), the station, or the like to leave the platform or the step.

In some specific embodiments, the cleaning device may move to the bottom of the pool to leave the platform or step in the following manners.

The cleaning device moves toward the N−1$^{st}$ step and then moves downward step by step until the cleaning device reaches the bottom of the pool, to leave the platform or step.

The cleaning device moves to an edge of the platform or the step without passing another platform or step, and directly moves from the edge to the bottom of the pool.

The cleaning device moves to a pool wall connected to the platform or the step and then climbs the pool wall and floats up to the water surface, or the cleaning device directly floats up to the water surface from the step or the platform and then moves downward from the water surface to the bottom of the pool. Before moving downward to the bottom of the pool, the cleaning device may move on the water surface or in the water for a specific distance, so that when moving downward from the water surface, the cleaning device can avoid a range of the platform or the step and directly move downward to the bottom of the pool.

The cleaning device moves to a pool wall connected to the platform or the step and then climbs the pool wall until the cleaning device moves beyond a range of a vertical projection of the platform or the step, and then moves from the pool wall to the bottom of the pool.

In addition, the range of the platform or the step may be determined based on the detection value of the first distance sensor. For example, whether the cleaning device moves to the edge of the platform or the step on which the cleaning device is currently located is determined based on whether the detection value of the first distance sensor 200 is greater than the preset threshold or is lost, thereby defining the range of the platform or the step. It should be noted that when leaving the platform or the step, the cleaning device may be located at any position, for example, on the platform or any step.

Certainly, in other embodiments, only one first distance sensor 200 may alternatively be disposed at the front end of the bottom of the cleaning device. In this case, the first distance sensor 200 may be centered at the front end of the bottom of the cleaning device. Based on this disposition manner, when the cleaning device meets an overhanging region in the forward process, the cleaning device can avoid the overhanging region.

In one embodiment, as shown in FIG. 5B, FIG. 7, and FIG. 8, when the front portion of the cleaning device is hit, or the third distance sensor 600 detects an obstacle, the moving speed of the cleaning device and/or operation power of the main water pump may be adjusted, so that when the moving mechanism 103 abuts against the vertical surface of the step, the moving mechanism 103 continues to move, the front portion of the cleaning device moves upward along the vertical surface of the step, and the rear portion of the cleaning device continues to move along the to-be-cleaned surface. In this way, the cleaning device is in a tilt posture in which the cleaning device leans against the vertical surface of the step and the to-be-cleaned surface until a first wheel 1031B crosses a joint between the vertical surface and the horizontal surface of the step. Then, the cleaning device continues to move, and the track 1032 supports the cleaning device at the joint between the vertical surface and the horizontal surface of the step. When at least one half of the cleaning device is beyond the joint between the vertical surface and the horizontal surface of the step (that is, at least one half of a projection area of the body 101 in the vertical direction falls within the horizontal surface of the step), under the action of gravity or other forces and with the above joint as a demarcation point, there is a trend that the front portion of the cleaning device moves downward and the rear portion of the cleaning device moves upward. In this way, the body 101 presents a trend of being switched from the tilt posture to a horizontal posture. It should be understood that various possible moving postures of the cleaning device are related to a parameter of the step and a motion parameter of the cleaning device.

In one embodiment, the pose sensor detects the tilt angle of the cleaning device in real time, and the first distance sensor 200 detects a distance between the bottom of the cleaning device and the motion surface in real time.

In one embodiment, when the cleaning device climbs the vertical surface of the step, the cleaning device may move vertically, move horizontally, or move on the vertical surface at a rotation angle, so that the cleaning device can clean the vertical surface of the step.

In one embodiment, after the cleaning device climbs over the vertical surface of the first step 301, there may be the following cases about the position of the cleaning device.

In the first case: the cleaning device directly makes a transition from the vertical surface of the first step 301 to the horizontal surface of the first step 301. As shown in FIG. 5B, the front portion of the cleaning device moves upward along the vertical surface of the first step 301, and the entire cleaning device is in an approximately vertical posture. After the moving mechanism 103 of the cleaning device and/or the bottom of the cleaning device is substantially attached to the vertical surface of the first step 301, the main water pump may be turned on or power of the main water pump is increased to apply a thrust to the cleaning device, so that the cleaning device can be switched from the vertical posture to a horizontal posture in which the bottom of the cleaning device falls on the horizontal surface of the first step 301. In this case, the vertical surface of the first step 301 usually has a specific height, for example, at least greater than ⅔ of the length of the cleaning device.

In the second case: as shown in FIG. 6, the cleaning device leans against the first step 301 and the second step 302 adjacent to the first step 301. When the track 1032 of the cleaning device supports the cleaning device at the joint between the vertical surface and the horizontal surface of the first step 301, as the cleaning device continues to move forward, the cleaning device may continue to remain the tilt posture, enabling the cleaning device to subsequently lean against the first step 301 and the second step 302. In this case, the height of the vertical surface of the step is usually small, or the width of the horizontal surface of the step is small (both are usually less than the length of the cleaning device).

To clean the horizontal surface of the step, the cleaning device may be controlled to be located on the horizontal surface of the step. In the second case, the cleaning device may be controlled to move backward for a specific distance and then slowly fall on the horizontal surface of the first step 301.

In one embodiment, as shown in FIG. 3A, FIG. 5B, and FIG. 6, the top of the cleaning device is provided with a first water outlet 101C whose water spraying direction may be adjusted. A process of controlling the cleaning device to move upward includes: if one part of the cleaning device is between the horizontal surface of the first step 301 and the vertical surface of the second step 302, and another part is lower than the horizontal surface of the first step 301 (that is, the cleaning device is in a state shown in FIG. 8), adjusting the water spraying direction of the first water outlet 101C, so that at least a part of the cleaning device can move to the horizontal surface of the first step 301.

In an application scenario, in a process in which the cleaning device climbs the step, the track 1032 is in contact with the joint between the vertical surface and the horizontal surface of the first step 301 to support the cleaning device. In this case, a bottom surface of the cleaning device is at least partially separated from the vertical surface of the first step 301. In the moving direction of the cleaning device, water is sprayed through the first water outlet 101C at the top of the cleaning device in a direction away from the cleaning device, and a reaction force (denoted as pressure F) generated by sprayed water at least includes a component force toward a front side of the joint (that is, toward the horizontal surface of the first step 301), so that the cleaning device is pressed toward the horizontal surface of the first step 301. This improves stability of transition of the cleaning device from the vertical surface of the first step 301 to the horizontal surface of the first step 301.

Specifically, the adjusting the water spraying direction of the first water outlet 101C includes: adjusting the water spraying direction of the first water outlet 101C, so that a first included angle $\alpha$ between the water spraying direction and a top surface of the cleaning device is within a first preset angle range, where the first preset angle range may be greater than or equal to 80° and less than or equal to 90°. In this application scenario, the first included angle may be 90° to increase the pressure F, so that the front end of the cleaning device can be better pressed toward the horizontal surface of the first step 301 under the action of the pressure F. The first water outlet 101C whose direction may be adjusted is disposed on the cleaning device, so that the water spraying direction of the first water outlet 101C can be adjusted. An outlet of the main water pump communicates with the outside of the cleaning device through a pipe. The pipe may be switched between a first position and a second position. At the first position, a water spraying direction of the pipe is substantially perpendicular to the top surface of the cleaning device, at the second position, the water spraying direction of the pipe is at a preset angle with the top surface of the cleaning device, and the preset angle ranges from 0 to 90°. Alternatively, one transition pipe, one first water outlet pipe, and one second water outlet pipe are disposed in the cleaning device. One end of the transition pipe communicates with the outlet of the main water pump, and the other end of the transition pipe communicates with one end of the first water outlet pipe and one end of the second water outlet pipe. The other end of the first water outlet pipe may be disposed in a direction substantially perpendicular to the top surface of the cleaning device. The other end of the second water outlet pipe may be disposed in a direction at a preset angle with the top surface of the cleaning device. A baffle plate is disposed at the end, of the first water outlet pipe, connected to the transition pipe, and the end, of the second water outlet pipe, connected to the transition pipe, so that a position of the baffle plate is adjusted to open one of the first water outlet pipe and the second water outlet pipe. In another embodiment, the transition pipe may alternatively not be disposed, and the first water outlet pipe and the second water outlet pipe may directly communicate with the outlet of the main water pump.

Figure 14:
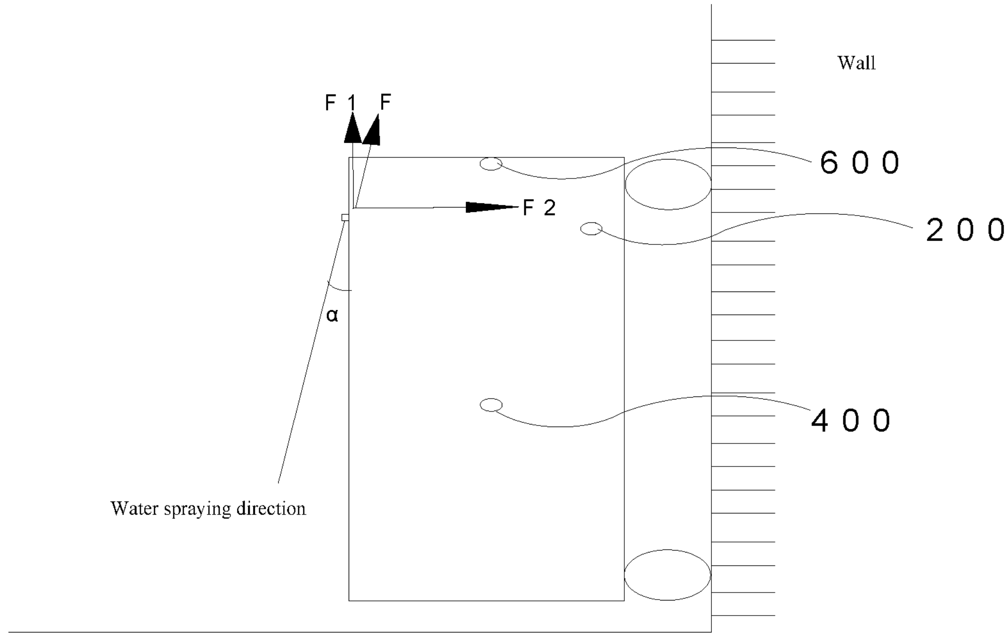
FIG. 14 shows a water spraying direction of a cleaning device when the cleaning device climbs a wall according to an embodiment of the present disclosure.

In another application scenario, as shown in FIG. 14, in a process in which the cleaning device climbs the wall, the adjusting the water spraying direction of the first water outlet 101C includes: adjusting the water spraying direction of the first water outlet 101C, so that the first included angle $\alpha$ between the water spraying direction and the top surface of the cleaning device is within a second preset angle range, where the second preset angle range may be greater than or equal to 20° and less than or equal to 60°.

Specifically, the pressure F may be roughly decomposed into a component force F1 parallel to the top surface of the cleaning device and a component force F2 perpendicular to the top surface of the cleaning device, and an included angle between F1 and F2 is 90°.

When the cleaning device climbs the pool wall, and the first included angle $\alpha$ between the water spraying direction and the top surface of the cleaning device ranges from 20° to 60°, the component force F1 is greater than the component force F2, where the pressure F applied, to the cleaning device, by the water sprayed through the first water outlet 101C in the direction away from the water spraying direction is decomposed into the component force F1 and the component force F2, so that friction between the cleaning device and the pool wall increases, that is, a wall gripping force formed by the friction when the cleaning device climbs the wall increases. This reduces a risk that the cleaning device drifts and falls from the wall in the wall climbing process.

In one embodiment, as shown in FIG. 6 and FIG. 7, if the cleaning device is in the tilt state in a process in which the cleaning device climbs the first step 301, it is determined that the cleaning device climbs over the vertical surface of the first step 301. Whether the cleaning device is in the tilt state may be obtained by the pose sensor disposed inside the cleaning device. The tilt state may indicate a state in which an angle of the cleaning device relative to the horizontal surface or relative to the motion surface is greater than a preset threshold. In the above manner, a problem that if a step climbing state is determined only by the first distance sensor 200, a normal state such as a state in which the cleaning device is above a dent is misjudged as a state in which the cleaning device climbs over a vertical surface of a step is avoided. This improves determining accuracy and reliability of the cleaning device on the step climbing state.

In one embodiment, as shown in FIG. 6, FIG. 7, and FIG. 8, obtaining pose information of the cleaning device in real time in a moving process of the cleaning device includes: obtaining a second included angle β between a bottom surface of the cleaning device and the horizontal surface; and determining a pose of the cleaning device based on the second included angle β and the detection value collected by the first distance sensor 200.

After the cleaning device climbs up the vertical surface of the first step 301, the cleaning device tilts, the second included angle β reflects the tilt angle of the cleaning device, and the detection value collected by the first distance sensor 200 indicates a distance between the first distance sensor of the cleaning device and the first step 301, so that the pose of the cleaning device can be determined based on the second included angle β and the detection value collected by the first distance sensor 200.

In one embodiment, as shown in FIG. 6, FIG. 7, and FIG. 8, a process of determining a pose of the cleaning device based on the second included angle β and the detection value collected by the first distance sensor 200 includes: if the second included angle β is less than or equal to an included angle threshold, and the detection value collected by the first distance sensor 200 is less than or equal to a second distance threshold, determining that the cleaning device is on the horizontal surface of the first step 301. In this embodiment, the included angle threshold may range from 5° to 10°.

The second distance threshold and the first distance threshold may be equal or unequal. This may be specifically set based on a requirement.

If the second included angle β is less than or equal to the included angle threshold, it indicates that the bottom surface of the cleaning device is approximately parallel to the horizontal surface, and if the detection value collected by the first distance sensor 200 is less than or equal to the second distance threshold, it indicates that the cleaning device has been substantially close to the horizontal surface of the first step 301. In this case, it can be determined that the cleaning device is on the horizontal surface of the first step 301.

In another embodiment, if the second included angle β is greater than the included angle threshold, and after the cleaning device climbs over the vertical surface of the first step 301, the detection value collected by the first distance sensor 200 at least goes through a change process of becoming larger and then becoming smaller, it is determined that the cleaning device leans against the first step 301 and the second step 302. When the first distance sensor 200 faces the horizontal surface of the first step 301, the first distance sensor 200 usually has an effective detection value at any moment. For example, if the first distance sensor 200 is an infrared sensor, as the cleaning device moves in the tilt posture, the detection value changes from a small value to a large value until a detection position is a joint between the horizontal surface of the first step 301 and the vertical surface of the second step 302. Then, when the first distance sensor 200 faces the vertical surface of the second step 302, the detection value changes from a large value to a small value until the detection position is a joint between the vertical surface and the horizontal surface of the second step 302. Certainly, if the first distance sensor 200 is an ultrasonic sensor, in the entire moving process, because the tilt angle of the cleaning device relative to the step is beyond a tilt range in which the receiving portion of the ultrasonic sensor can receive a reflected signal, the first distance sensor 200 may not have a detection value in some time periods. For details, refer to the above descriptions.

In an application scenario, a step climbed by the cleaning device can be determined based on the change in the detection value collected by the first distance sensor 200.

For example, the height of each step in the pool is h, for example, about 12 cm, and the length of the cleaning device is L, for example, about 44 cm. Because the length of the cleaning device is much greater than the height of each step, in the step climbing process, the cleaning device may directly climb over the first step 301 and then lean against the second step 302 and the third step 303. In this case, if a stage in which the detection value collected by the first distance sensor 200 becomes larger and then becomes smaller occurs twice in a process in which the cleaning device continues to climb the step after climbing over the vertical surface of the first step 301, it indicates that the cleaning device leans against the second step 302 and the third step 303. Therefore, a motion position of the cleaning device can be determined based on the change in the detection value. Further, the cleaning device is controlled to continuously move backward to the horizontal surface of the first step 301 to clean the horizontal surface of the first step 301. Certainly, position information of the cleaning device in a depth direction may be obtained by the depth sensor disposed on the cleaning device, so that the step climbed by the cleaning device can be determined based on the position information.

In one embodiment, as shown in FIG. 6, FIG. 7, and FIG. 8, if the cleaning device leans against the first step 301 and the second step 302, the cleaning device is controlled to move backward until the cleaning device is on the horizontal surface of the first step 301, to clean the horizontal surface of the first step 301.

A process of controlling the cleaning device to move backward until the cleaning device is on the horizontal surface of the first step 301 includes: when the cleaning device is controlled to move backward, if the second included angle β is less than or equal to the included angle threshold, and the detection value collected by the first distance sensor 200 becomes smaller until the detection value is less than or equal to the second distance threshold, determining that the cleaning device is on the horizontal surface of the first step 301.

Specifically, when the cleaning device leans against the first step 301 and the second step 302, the second included angle β is greater than the included angle threshold, indicating that the cleaning device is in the tilt state. If the second included angle β starts to gradually become smaller to less than or equal to the included angle threshold, it indicates that in a process in which the cleaning device moves backward from the second step 302 to the first step 301, the cleaning device is approximately parallel to the horizontal surface.

When the cleaning device is in the tilt state but continues to move backward toward the horizontal surface of the first step 301, a position detected by the first distance sensor 200 changes from the vertical surface of the second step 302 to the horizontal surface of the first step 301, causing the detection value obtained by the first distance sensor 200 to become larger and then become smaller until the detection value is less than or equal to the second distance threshold. If the detection value collected by the first distance sensor 200 is less than or equal to the second distance threshold, it indicates that the cleaning device has been substantially close to the horizontal surface of the first step 301. In this case, it may be determined that the cleaning device is on the horizontal surface of the first step 301.

In one embodiment, as shown in FIG. 9 and FIG. 10, controlling the cleaning device to clean the horizontal surface of the first step 301 includes: controlling the cleaning device to rotate by a first preset angle, for example, 90°, in a first rotation direction X, so that the first side surface 1011 of the cleaning device faces the vertical surface of the second step 302.

Specifically, an example in which the step is a rectangular step in FIG. 9, and a longer side of the step runs cast-west is used. When a coverage direction of the cleaning device for the step runs north-south, the cleaning device rotates by 90° in the first rotation direction X, that is, the cleaning device rotates counterclockwise by 90°, so that the first side surface 1011 of the cleaning device faces the vertical surface of the second step 302. The counterclockwise direction or the clockwise direction in the present disclosure is obtained by overlooking the cleaning device or the step.

Then, the cleaning device is simultaneously controlled to move forward and clean the horizontal surface of the first step 301.

In one embodiment, as shown in FIG. 9 and FIG. 10, before the cleaning device is simultaneously controlled to move forward and clean the horizontal surface of the first step 301, the method further includes: determining whether a detection value collected by a second distance sensor 500 mounted on the first side surface 1011 of the cleaning device is less than or equal to a third distance threshold.

The third distance threshold is a minimum distance between an edge and the cleaning device when the cleaning device moves along the edge, and may also be referred to as a minimum distance from the edge to the cleaning device. For example, the third distance threshold may be set to range from 3 cm to 20 cm based on configuration of the cleaning device and a detection range of the sensor.

If it is determined that the detection value collected by the second distance sensor 500 is less than or equal to the third distance threshold, the cleaning device is simultaneously controlled to move forward and clean the horizontal surface of the first step 301.

If it is determined that the detection value collected by the second distance sensor 500 is greater than the third distance threshold, the cleaning device is controlled to move toward the vertical surface of the second step 302 until the detection value collected by the second distance sensor 500 is less than or equal to the third distance threshold, and then the cleaning device is controlled to clean the horizontal surface of the first step 301 along the vertical surface of the second step 302.

The detection value collected by the second distance sensor 500 is compared with the third distance threshold. If the detection value collected by the second distance sensor 500 is less than or equal to the third distance threshold, it indicates that the cleaning device has been close to the vertical surface of the second step 302, that is, the cleaning device is located at the edge, so that it can be ensured that the cleaning device cleans the horizontal surface of the first step 301 along the edge after climbing up the step. In addition, this reduces a risk that the cleaning device falls when the cleaning device cleans the horizontal surface of the first step 301 when the cleaning device does not move along the edge.

If the detection value collected by the second distance sensor 500 is greater than the third distance threshold, it indicates that the cleaning device is not close to the vertical surface of the second step 302. In other words, the body of the cleaning device may partially overhang outside the horizontal surface of the first step 301, and a motion route of the cleaning device needs to be adjusted in real time, or the cleaning device is not close to the vertical surface of the second step 302, and a to-be-cleaned region may be missed. In this case, the cleaning device is controlled to continue to move toward the vertical surface of the second step 302. This reduces a risk that in a process of cleaning the horizontal surface of the first step 301, the body of the cleaning device partially overhangs outside the horizontal surface, leading to loss of balance, which causes the cleaning device to fall from the first step 301 and reduces a possibility that a to-be-cleaned region is missed.

Figure 11:
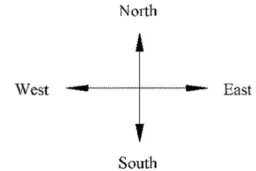
FIG. 11 is a top view showing that a cleaning device is located on a horizontal surface of a second step according to an embodiment of the present disclosure.
Figure 12:
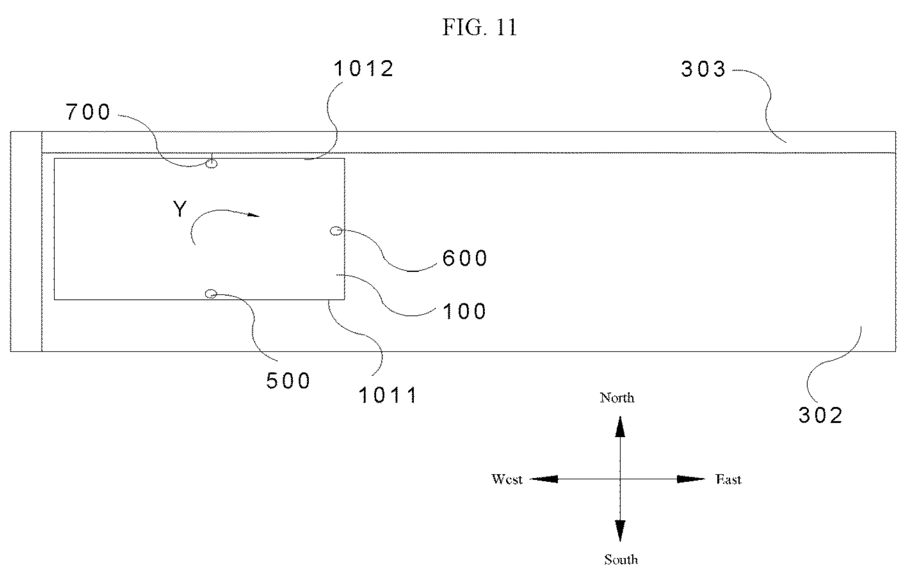
FIG. 12 is a top view showing that a cleaning device cleans a horizontal surface of a second step according to an embodiment of the present disclosure.

In one embodiment, as shown in FIG. 10, FIG. 11, and FIG. 12, a process of controlling the cleaning device to clean the horizontal surface of the first step 301 further includes: if a detection value collected by a third distance sensor 600 is less than or equal to a fourth distance threshold in a process of controlling the cleaning device to move forward, controlling the cleaning device to rotate by a second preset angle, for example, 90°, in a second rotation direction Y. The second rotation direction Y is opposite to the first rotation direction X.

If the third distance sensor 600 collects a detection value, it indicates that the cleaning device meets an obstacle in the forward process. If the detection value collected by the third distance sensor 600 is less than or equal to the fourth distance threshold, it indicates that the cleaning device has been close to the obstacle and can no longer move forward.

The cleaning device is controlled to climb from the first step 301 to the second step 302. In other words, the cleaning device climbs from the horizontal surface of the first step 301 to the horizontal surface of the second step 302.

If the cleaning device is on the horizontal surface of the second step 302, the cleaning device is controlled to rotate by the second preset angle, for example, 90°, in the second rotation direction Y, so that a second side surface 1012 of the cleaning device faces the vertical surface of the third step 303. The second side surface 1012 is disposed opposite to the first side surface 1011, and the fourth distance sensor 700 is disposed on the second side surface 1012.

The detection value collected by the fourth distance sensor 700 may be compared with the third distance threshold, and then determining is performed. The determining step is the same as the determining step of the second distance sensor 500 and is used for determining whether the cleaning device is close to the vertical surface of the third step 303 when the cleaning device is located on the horizontal surface of the second step 302.

The cleaning device is simultaneously controlled to move forward and clean the horizontal surface of the second step 302.

If the detection value collected by the fourth distance sensor 700 is less than or equal to the third distance threshold, it indicates that the cleaning device has been close to the vertical surface of the third step 303. In this case, the cleaning device may clean the horizontal surface of the second step 302 along an edge.

As shown in FIG. 10, FIG. 11, and FIG. 12, in an application scenario, an example in which the step is a rectangular step whose longer side runs east-west is used. The cleaning device moves along the edge (that is, the cleaning device is close to the vertical surface of the second step 302) on the first step 301, and when the cleaning device meets an obstacle in an east-west direction, the third distance sensor 600 may collect a detection value of a distance between the third distance sensor and the obstacle. If the collected detection value is less than or equal to the fourth distance threshold, it indicates that the front end of the cleaning device has been close to the obstacle (for example, a wall), and the cleaning device is located at a second end of the first step 301. In this case, the cleaning device has completed cleaning of the horizontal surface of the first step 301 and may rotate by the second preset angle in the second rotation direction Y, that is, the cleaning device rotates clockwise and then climbs from the first step 301 to the second step 302.

After climbing the second step 302, the cleaning device rotates by 90° in the second rotation direction Y, so that the fourth distance sensor 700 on the second side surface 1012 of the cleaning device faces the vertical surface of the third step 303, and the fourth distance sensor 700 obtains a detection value of a distance between the fourth distance sensor and the vertical surface of the third step 303.

If it is determined that the detection value collected by the fourth distance sensor 700 is less than or equal to the third distance threshold, that is, the cleaning device has been close to the vertical surface of the third step 303, that is, the cleaning device is located at the edge, a step of simultaneously controlling the cleaning device to move forward along the edge and clean the horizontal surface of the second step 302 is performed.

If it is determined that the detection value collected by the fourth distance sensor 700 is greater than the third distance threshold, it indicates that the cleaning device is not close to the vertical surface of the third step 303, and the cleaning device is controlled to continue to move toward the vertical surface of the third step 303 until the detection value collected by the fourth distance sensor 700 is less than the third distance threshold.

In one embodiment, as shown in FIG. 12 and FIG. 13, a process of simultaneously controlling the cleaning device to move forward and clean the horizontal surface of the first step 301 includes the following steps.

If the detection value collected by the first distance sensor 200 is greater than the first distance threshold in the process of controlling the cleaning device to move forward, the cleaning device is controlled to rotate by 90° in the second rotation direction Y. The second rotation direction Y is opposite to the first rotation direction X.

Usually, when the cleaning device moves on the horizontal surface of the first step 301, the detection value collected by the first distance sensor 200 at the bottom of the cleaning device should be always less than or equal to the first distance threshold. However, if the detection value collected by the first distance sensor 200 is greater than the first distance threshold, it indicates that the first distance sensor 200 detects an overhanging region lower than the horizontal surface of the first step 301. In this case, the cleaning device is controlled to rotate by 90° in the second rotation direction, or the cleaning device is controlled to stop or move backward, to reduce a risk that the cleaning device falls from the first step 301 in a process of continuing to move forward.

The cleaning device is controlled to continue to climb a higher step, for example, from the first step 301 to the second step 302.

If the cleaning device is on the horizontal surface of the second step 302, the cleaning device is controlled to rotate by the second preset angle in the second rotation direction Y, so that the second side surface 1012 of the cleaning device faces the vertical surface of the third step 303. The fourth distance sensor 700 is mounted on the second side surface 1012.

The cleaning device is simultaneously controlled to move forward and clean the horizontal surface of the second step 302.

In one embodiment, as shown in FIG. 9 and FIG. 10, a process of if a detection value collected by a third distance sensor 600 is less than or equal to a fourth distance threshold in a process of controlling the cleaning device to move forward, controlling the cleaning device to rotate by 90° in a second rotation direction Y specifically includes:

- if the detection value collected by the third distance sensor 600 is less than or equal to the fourth distance threshold, and the width of the horizontal surface of the first step 301 is less than or equal to the width of the cleaning device, controlling the cleaning device to rotate by 90° in the second rotation direction.

If the width of the horizontal surface of the first step 301 is less than or equal to the width of the cleaning device, it indicates that the cleaning device can cover the horizontal surface of the first step 301 in the width direction of the horizontal surface of the first step 301. In other words, when the cleaning device cleans the horizontal surface of the first step 301 along the edge, the cleaning device can directly complete cleaning of the horizontal surface of the first step 301 once.

If the detection value collected by the third distance sensor 600 is less than or equal to the fourth distance threshold, and the width of the horizontal surface of the first step 301 is greater than the width of the cleaning device, after the cleaning device completes cleaning along the edge of the vertical surface of the second step 302, the cleaning device is controlled to translate for a first distance in a direction away from the vertical surface of the second step 302, and then the cleaning device is controlled to move backward or turn around to continue to clean the horizontal surface of the first step 301. The first distance is less than or equal to the width of the cleaning device.

If the width of the horizontal surface of the first step 301 is greater than the width of the cleaning device, it indicates that after the cleaning device moves and performs cleaning once, the cleaning device cannot cover the entire horizontal surface of the first step 301 in the width direction of the horizontal surface of the first step 301. In other words, when the cleaning device cleans the horizontal surface of the first step 301 along the edge, the cleaning device cannot directly complete cleaning of the horizontal surface of the first step 301 once. After the cleaning device performs cleaning once, the cleaning device needs to translate for the first distance on the horizontal surface of the first step 301 in the direction away from the vertical surface of the second step 302 and then continue to clean the horizontal surface of the first step 301. In this cleaning process, a distance between the cleaning device and the vertical surface of the second step 302 may also be controlled by using a distance sensor disposed on a side portion of the body 101 of the cleaning device.

In one embodiment, as shown in FIG. 15, a process of controlling the cleaning device to climb a step includes the following steps.

The cleaning device is controlled to climb from the bottom of the step to the top of the step in a straight line direction.

In this way, the cleaning device climbs from the vertical surface of the first step 301 to the horizontal surface of the first step 301 and then from the horizontal surface of the first step 301 to the horizontal surface of the second step 302 via the vertical surface of the second step 302, and the rest is deduced by analogy until the cleaning device climbs to the horizontal surface at the top of the step, and/or, the cleaning device always moves upward at a tilt angle at which the cleaning device leans against different steps until the cleaning device climbs to the horizontal surface at the top of the step.

After the cleaning device reaches the top of the step, the cleaning device is controlled to translate in a first direction Z.

In this embodiment, the first direction Z is the length direction of the horizontal surface of the step, and the cleaning device translates for a preset distance (the preset distance may be set to be the width of the cleaning device) on the horizontal surface at the top of the step, to reduce a motion route, of the cleaning device in a previous step, repeated when the cleaning device descends the step.

The cleaning device is controlled to move backward or turn around and then move forward until the cleaning device reaches the bottom of the step.

In a process in which the cleaning device moves from the top of the step to the bottom of the step after translating for the preset distance, a moving direction of the cleaning device is approximately parallel to the moving direction of the cleaning device in a previous step.

After the cleaning device reaches the bottom of the step, the cleaning device is controlled to translate in the first direction Z.

The cleaning device translates on the horizontal surface at the bottom of the step for the preset distance.

A step of controlling the cleaning device to climb from the bottom of the step to the top of the step in the straight line direction is performed again.

The above steps are repeated until the motion trajectory of the cleaning device covers all steps, so that operation of controlling the cleaning device to climb the steps is implemented.

In this embodiment, a cleaning unit 900 may be turned on to be in an operation state both in a process in which the cleaning device climbs the step and in a process in which the cleaning device descends the step, so that a horizontal surface and a vertical surface of each step can be effectively cleaned.

In another embodiment, the cleaning device may translate at different positions. For example: the cleaning device climbs from the first step 301 to a highest step along a first path, moves backward or turns around to return to the first step 301 along the first path, and then translates on the first step 301; the cleaning device climbs from the first step 301 to the highest step along the first path, translates to a second path, moves backward or turns around to move to the first step 301 along the second path, climbs from the first step 301 to the highest step along the second path, and then translates to a third path, and the above process is repeated; or the cleaning device climbs from the first step 301 to the highest step along the first path, translates to the second path, moves backward or turns around to move to the first step 301 along the second path, translates to the third path, and then moves to the highest step along the third path. A translation distance may be controlled to be less than or equal to the width of the cleaning device or less than or equal to a width of a roller brush assembly or a first water inlet 101A of the cleaning device. The first path, the second path, and the third path are different paths.

In one embodiment, the process of controlling the cleaning device to climb a step includes the following steps.

The cleaning device is controlled to move toward the step/platform until there is a preset distance between the cleaning device and the vertical surface of the first step 301 or a pitch angle of the cleaning device is greater than or equal to a preset angle, the cleaning device starts to move from the bottom of the pool to the vertical surface of the first step 301.

The cleaning device climbs the vertical surface of the first step 301. In a process of climbing the vertical surface, the moving mechanism 103 is turned on, and a suction assembly may also be turned on, so that the cleaning device is pressed on the vertical surface of the first step 301 under the action of a thrust generated by liquid discharged through the first water outlet 101C. This reduces a possibility that the cleaning device slips from the vertical surface when climbing the vertical surface.

In the process of climbing the vertical surface, after at least a part of the cleaning device crosses the joint between the vertical surface and the horizontal surface of the first step 301, or the cleaning device moves on the vertical surface of the first step 301 until the first distance sensor goes beyond the vertical surface of the first step 301 (that is, the first distance sensor is not blocked by the vertical surface of the first step 301), a moving speed of the cleaning device is reduced, or the suction mechanism is turned on until the cleaning device makes a transition from the vertical surface of the first step 301 to the horizontal surface of the first step 301. When the detection value of the first distance sensor 200 is greater than the preset threshold, or the detection value of the first distance sensor 200 is lost, it may be considered that the first distance sensor 200 is not blocked by the vertical surface of the first step 301.

In one embodiment, if the reaction force generated by the water sprayed through the first water outlet 101C does not include a component force applied to the front portion of the cleaning device, or the reaction force generated by the water sprayed through the first water outlet 101C includes the component force applied to the front portion of the cleaning device, but the component force is less than a preset threshold, when an angle between the cleaning device and the horizontal surface of the first step 301 is less than a preset tilt angle (for example, 30°), the suction assembly is turned off, so that the cleaning device can continue to naturally fall toward the horizontal surface of the first step 301. In this way, the following case can be avoided: When the suction assembly is turned on, the cleaning device starts to move before the cleaning device has completely fallen on the horizontal surface. In one embodiment, when the reaction force generated by the water sprayed through the first water outlet 101C includes the component force applied to the front portion of the cleaning device, and the component force is greater than the preset threshold, the suction assembly may be turned on, so that the cleaning device can be pressed on the horizontal surface of the first step 301.

Whether a current horizontal surface meets the cleaning condition of the cleaning device is determined. If the cleaning condition is met, a cleaning task is performed. If the cleaning condition is not met, the cleaning device may return to the bottom of the pool or continue to climb subsequent steps. A manner for climbing the subsequent steps may be the same as a manner for climbing from the bottom of the pool to the first step 301.

When a task of cleaning the horizontal surface of one step is successfully completed, the cleaning device has climbed all the steps, climbing time exceeds preset time, or a water depth at which the cleaning device is located is less than a preset threshold, a platform/step cleaning task is terminated.

In some embodiments, the determining whether a current horizontal surface meets the cleaning condition of the cleaning device includes: detecting depth information of the cleaning device in the pool by using the depth sensor, where if a current water depth is greater than or equal to a preset water depth threshold, the cleaning condition is met. In this way, the following case can be avoided: The water depth is too shallow, affecting operation of the cleaning device (for example, the following case can be avoided: The suction assembly sucks little or no water in due to the shallow water depth, or when the track is in contact with the pool wall, an overcurrent occurs due to excessive load, and consequently, the wheel assembly stops operating).

In one embodiment, operation of the cleaning device may be suspended for a preset time period (for example, the moving mechanism and/or the suction mechanism are/is turned off) to improve water depth detection accuracy and prevent accuracy of a water depth detection results from being affected due to an unstable posture of the cleaning device or agitation of a surrounding water flow.

In some embodiments, the determining whether a current horizontal surface meets the cleaning condition of the cleaning device includes: if the current horizontal surface meets a motion range requirement of the cleaning device, the cleaning condition is met. Whether the horizontal surface meets the motion range requirement of the cleaning device may be determined based on a distance over which the cleaning device moves on the horizontal surface. For example, after moving from the vertical surface to the current horizontal surface, the cleaning device moves on the current horizontal surface in the width direction of the horizontal surface until the cleaning device moves to the vertical surface of the second step 302, and the width of the horizontal surface of the first step 301 (namely, a spacing between the first step 301 and the second step 302) is estimated based on a moving distance in the process (denoted as a moving distance on the surface of the step). If the width of the horizontal surface is less than a preset distance threshold (for example, less than the length or the width of the body 101), it is considered that the current horizontal surface does not meet the motion range requirement of the cleaning device. In this way, the following case can be avoided: The horizontal surface of the step is too narrow, causing the cleaning device to difficultly move on the horizontal surface.

In a specific embodiment, when an angle between the cleaning device and the horizontal surface of the first step 301 is less than a fourth preset angle, for example, 5°, the cleaning device may start to determine whether the current horizontal surface meets the cleaning condition of the cleaning device, so that the following case can be avoided: There is a slope on the horizontal surface of the step, causing the cleaning device to mistakenly determine that the cleaning device has not reached the horizontal surface. This ensures that the cleaning device accurately identifies that the cleaning device has reached the horizontal surface.

Figure 25A:
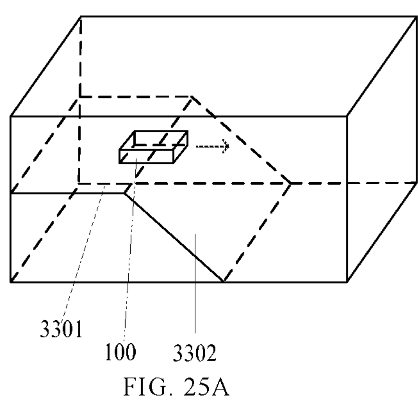
FIG. 25A is a schematic view showing that a cleaning device moves from a horizontal surface to a slope surface according to an embodiment of the present disclosure.
Figure 25B:
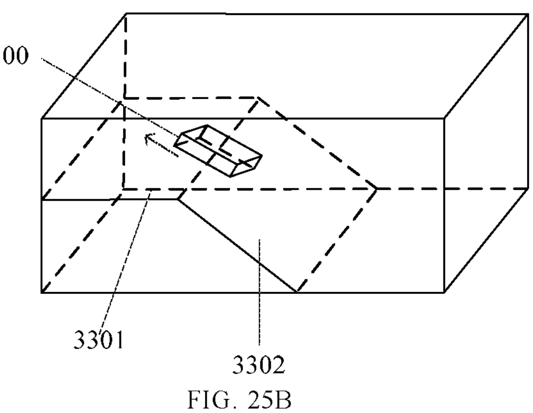
FIG. 25B is a schematic view showing that a cleaning device moves from a slope surface to a horizontal surface according to an embodiment of the present disclosure.

As shown in FIG. 25A, there is a platform or a step in the pool. For example, the platform or the step includes a first horizontal surface 3301 and a first slope surface 3302 connected to the first horizontal surface 3301 in a tilt manner. When the cleaning device moves from the first horizontal surface 3301 toward the first slope surface 3302, the front portion of the cleaning device first extends out of the first horizontal surface 3301 and is located above the first slope surface 3302. In this case, water on the first slope surface 3302 applies an upward first action force to the front portion of the cleaning device, and the front portion of the cleaning device continues to move forward due to inertia. Because the front portion of the cleaning device is lighter than the rear portion of the cleaning device, the front portion of the cleaning device cannot be pressed down on the first slope surface 3302 in time. Therefore, the front portion of the cleaning device is easily lifted, and the cleaning device does not easily reach the first slope surface 3302. On the contrary, as shown in FIG. 25B, if the cleaning device moves from the first slope surface 3302 toward the first horizontal surface 3301, the front portion of the cleaning device first extends out of the first slope surface 3302. In this case, liquid on the first horizontal surface 3301 applies a second action force to the front portion of the cleaning device, and the second action force has a component in the vertical direction and a component in the horizontal direction. Because the front portion of the cleaning device is light, the front portion of the cleaning device cannot be pressed down on the first horizontal surface 3301 in time. Therefore, the front portion of the cleaning device is lifted or flips outward in a direction away from the first horizontal surface 3301, and the cleaning device does not easily reach the first horizontal surface 3301, affecting switching of the cleaning device between the first slope surface 3302 and the first horizontal surface 3301.

In one embodiment, to resolve this technical problem, the first water outlet 101C includes a first liquid discharge sub-opening and a second liquid discharge sub-opening respectively located at the front portion and the rear portion of the cleaning device. When the cleaning device moves between a slope surface and a horizontal surface (that is, at least a part of the cleaning device, for example, the front portion, extends out of the first horizontal surface 3301), liquid discharged through the first liquid discharge sub-opening at the front portion can generate a thrust that helps the front portion of the cleaning device be quickly pressed down and adapt to a change in the slope surface. This prevents the front portion from being lifted. The first liquid discharge sub-opening and the second liquid discharge sub-opening may share a same water pump or may correspond to one water pump each. In one embodiment, the water spraying direction of the first water outlet 101C is adjusted, so that the discharged liquid generates a thrust that helps the front portion of the cleaning device be quickly pressed down. In one embodiment, when the cleaning device moves between a slope surface and a horizontal surface, the speed of the cleaning device is reduced, so that the following case can be avoided: The cleaning device rushes out of the first horizontal surface 3301 or the first slope surface 3302 due to an excessive high moving speed, causing damage to the cleaning device or causing the cleaning device to deviate from a planned path or miss a to-be-cleaned region. Whether at least a part of the cleaning device extends out of the first horizontal surface 3301 may be determined based on the detection value of the first distance sensor 200, for example, whether the detection value of the first distance sensor 200 is greater than a preset threshold or is lost. In one embodiment, the preset threshold of the detection value of the first distance sensor 200 on which whether the cleaning device extends out of the first horizontal surface is detected based is different from the preset threshold of the detection value of the first distance sensor 200 on which whether the cleaning device moves from the vertical surface of the step to the horizontal surface of the step is detected based. In other words, standards for determining, based on the detection value of the first distance sensor, whether there is an overhanging region on motion surfaces of different types may be different.

In the above embodiments, the distance sensor is disposed on the cleaning device 100 to help the cleaning device identify a to-be-cleaned surface, so that the cleaning device can be controlled correspondingly. In addition, the above embodiment provides the method for controlling the cleaning device to climb and clean the step and controlling the cleaning device to avoid falling from an overhanging region. The control method may also be applied to a delivery robot or another device having a climbing function.

In conclusion, the method for controlling the cleaning device may be implemented by a control system to control the cleaning device to identify and clean a step, a platform, or an object with an overhanging region. This improves cleaning efficiency of the cleaning device.

An embodiment of the present disclosure further provides a computer-readable storage medium. The computer-readable storage medium stores a computer program. When the computer program is executed, the method in any embodiment of the present disclosure and any combination of embodiments with no conflict with each other is implemented.

The computer program may form a program file stored in the computer-readable storage medium in a form of a software product, so that a computer device (which may be a personal computer, a server, a network device, or the like) performs all or some of the steps of the methods in embodiments of the present disclosure. The computer-readable storage medium includes any medium that can store program code, for example, a USB flash drive, a removable hard disk, a read-only memory (ROM, Read-Only Memory), a random access memory (RAM, Random Access Memory), a magnetic disk, or an optical disc, or a terminal device, for example, a computer, a server, a mobile phone, or a tablet computer.

The terms “first”, “second”, “third”, and the like in the present disclosure are merely intended for a purpose of description, and shall not be understood as an indication of a quantity of indicated technical features. Therefore, a feature limited by “first”, “second”, or “third” may explicitly or implicitly include at least one of the features. All directional indications (for example, up, down, left, right, front, rear . . . ) in embodiments of the present disclosure are merely intended for explaining a relative position relationship, movement, and the like of components in a particular posture (as shown in the accompanying drawings), and the directional indications correspondingly change if the particular posture changes. In addition, the terms “include”, “have”, and any variants thereof are intended to cover non-exclusive inclusion. For example, a process, a method, a system, a product, or a device that includes a series of steps or units is not limited to the listed steps or units, but further includes an unlisted step or unit in a specific embodiment, or further includes another inherent step or unit of the process, the method, the product, or the device in a specific embodiment.

It is clear that a person of ordinary skill in the art should understand that the modules or steps in the present disclosure may be implemented by a general-purpose computing apparatus, and the modules may be integrated on a single computing apparatus or distributed on a network including a plurality of computing apparatuses, or may be implemented by program code executed by a computing apparatus. In this way; the program code can be stored in a storage apparatus and executed by the computing apparatus. In addition, in some cases, the shown or described steps may be performed in an order different from the above order, or the modules are respectively manufactured into various integrated circuit modules, or a plurality of modules are manufactured into a single integrated circuit module. In this way, the present disclosure is not limited to any particular combination of hardware and software.

The above description describes only embodiments of the present disclosure and is not intended to limit the scope of the present disclosure. Any equivalent structure or equivalent process transformation performed based on the contents of this specification and the accompanying drawings of the present disclosure or applied directly or indirectly in other related technical fields shall fall within the protection scope of the present disclosure.

What is claimed is:

1. A method for controlling a cleaning device, wherein the cleaning device comprises a first distance sensor disposed at a bottom, wherein the first distance sensor is configured to detect a distance between the cleaning device and a to-be-cleaned surface under the cleaning device, wherein the control method comprises:

in a process in which the cleaning device moves on a bottom of a pool, when the cleaning device approaches or collides with an obstacle, controlling the cleaning device to climb the obstacle; and in a process of climbing the obstacle, if the obstacle is determined as a step at least based on a detection value of the first distance sensor, controlling the cleaning device to move from a first surface of the step to a second surface of the step, wherein the step at least comprises the approximately vertical first surface and the approximately horizontal second surface.

2. The method according to claim 1, wherein after the controlling the cleaning device to move from a first surface of the step to a second surface of the step, the method further comprises:

adjusting an orientation of the cleaning device on a second surface of an $N^{th}$ step, enabling a first side surface of the cleaning device to be substantially parallel to a first surface of an $N+1^{st}$ step, wherein $N>1$ and N is a natural number; and controlling the cleaning device to move in an adjusted orientation and clean the second surface of the $N^{th}$ step.

3. The method according to claim 1, wherein the cleaning device further comprises a second distance sensor disposed on a first side surface of the cleaning device, wherein after the controlling the cleaning device to move from a first surface of the step to a second surface of the step, the method further comprises:

when a front end of the cleaning device touches or approaches a first surface of an $N+1^{st}$ step, adjusting an orientation of the cleaning device on a second surface of an $N^{th}$ step, enabling the first side surface of the cleaning device to be substantially parallel to the first surface of the N+1$^{st}$ step, so that the second distance sensor faces the first surface of the N+1$^{st}$ step, wherein N N≥1 and N is a natural number; and controlling the cleaning device to move in an adjusted orientation and clean the second surface of the N$^{th}$ step.

4. The method according to claim 1, wherein after the controlling the cleaning device to move from a first surface of the step to a second surface of the step, the method further comprises: controlling, at least in a case where the detection value of the first distance sensor is greater than a first distance threshold, the cleaning device to stop moving, rotate, or move backward on the second surface of the step, wherein the first distance threshold is determined based on a distance between the first distance sensor and a plane when the cleaning device moves on the plane.

5. The method according to claim 1, wherein the cleaning device further comprises a suction mechanism and a first water outlet in fluid communication with the suction mechanism, wherein the first water outlet is at least partially located at a top of the cleaning device, wherein the controlling the cleaning device to move from a first surface of the step to a second surface of the step comprises:

after at least a part of the cleaning device crosses a joint between the first surface and the second surface of the step, or the cleaning device moves on the first surface of the step until the first distance sensor goes beyond the first surface of the step, controlling the cleaning device to stop moving or reduce a moving speed, or controlling water to be sprayed out through a part of the first water outlet in a direction away from the cleaning device, wherein the part of the first water outlet is located at the top of the cleaning device, enabling the cleaning device to be located on the second surface of the step.

6. The method according to claim 1, wherein the cleaning device further comprises a suction mechanism and a first water outlet in fluid communication with the suction mechanism, wherein the first water outlet is at least partially located at a top of the cleaning device, wherein the cleaning device further comprises a moving mechanism configured to allow the cleaning device to move, wherein the controlling the cleaning device to move from a first surface of the step to a second surface of the step comprises:

controlling a front portion of the cleaning device to move upward along the first surface of the step until the moving mechanism of the cleaning device is substantially attached to the first surface of the step, and the cleaning device is in an approximately vertical posture; and controlling the cleaning device to stop moving or reduce a moving speed, or controlling water to be sprayed out through a part of the first water outlet in a direction away from the cleaning device, wherein the part of the first water outlet is located at the top of the cleaning device, enabling the cleaning device to be switched from the approximately vertical posture to an approximately horizontal posture on the second surface of the step.

7. The method according to claim 1, wherein the method further comprises:

determining the obstacle as the step at least in a case where the detection value gradually increases from a stable value, then gradually decreases, and returns to the stable value, wherein the stable value is the detection value of the first distance sensor when the cleaning device moves on a plane.

8. The method according to claim 1, wherein the cleaning device further comprises a second distance sensor disposed on a first side surface of the cleaning device, wherein after the controlling the cleaning device to move from a first surface of the step to a second surface of the step, the method further comprises:

controlling the cleaning device to move along a first surface of an N+1$^{st}$ step, wherein in a process in which the cleaning device moves along the first surface of the N+1$^{st}$ step, the second distance sensor faces the first surface of the N+1$^{st}$ step, and a detection value of the second distance sensor is less than a third distance threshold, wherein N>1 and N is a natural number, wherein the third distance threshold indicates a minimum distance between the cleaning device and an edge when the cleaning device moves along the edge.

9. The method according to claim 8, wherein the method further comprises: in the process in which the cleaning device moves along the first surface of the N+1$^{st}$ step, if the detection value of the second distance sensor is greater than the third distance threshold, controlling the cleaning device to move toward the first surface of the N+1$^{st}$ step until the detection value of the second distance sensor is less than or equal to the third distance threshold.

10. The method according to claim 1, wherein the cleaning device further comprises a third distance sensor located at a front portion, wherein the third distance sensor is configured to detect a distance between the cleaning device and an obstacle in front of the cleaning device, wherein the method further comprises: controlling, at least in a case where a detection value of the third distance sensor is less than or equal to a fourth distance threshold, the cleaning device to move backward or turn around or translate for a preset distance in a direction away from a first surface of an N+1$^{st}$ step to continue to clean a second surface of an N$^{th}$ step, wherein the preset distance is less than or equal to a width of the cleaning device, wherein N≥1 and N is a natural number.

11. The method according to claim 1, wherein the method further comprises:

after the cleaning device cleans a second surface of an N$^{th}$ step, controlling the cleaning device to rotate at a tail end of the N$^{th}$ step, enabling a front portion of the cleaning device to be aligned with a first surface of an N+1$^{st}$ step, and then controlling the cleaning device to climb to a second surface of the N+1$^{st}$ step, wherein N≥1 and N is a natural number.

12. The method according to claim 1, wherein the method further comprises:

if a cleaning condition of the cleaning device is not met, or the cleaning device finishes cleaning the step, controlling the cleaning device to move from an N$^{th}$ step toward an N−1$^{st}$ step or the bottom of the pool, or controlling the cleaning device to continue to climb an N+1$^{st}$ step, wherein N≥1 and N is a natural number.

13. The method according to claim 12, wherein the cleaning device further comprises a depth sensor, wherein the depth sensor is configured to detect depth information of the cleaning device, wherein if it is determined, based on the depth information, that a depth of the cleaning device is less than or equal to a preset depth, the cleaning condition of the cleaning device is not met; or if a width of a second surface of the N$^{th}$ step is less than or equal to a length or a width of the cleaning device, the cleaning condition of the cleaning device is not met.

14. The method according to claim 1, wherein the cleaning device further comprises a third distance sensor disposed at a front portion, wherein the third distance sensor is configured to detect a distance between the cleaning device and an obstacle in front of the cleaning device, wherein the method further comprises:

after the cleaning device performs cleaning along an edge of a first surface of an N+1$^{st}$ step on a second surface of an N$^{th}$ step, controlling, at least in a case where a detection value of the third distance sensor is less than or equal to a fourth distance threshold, and a width of the second surface of the N$^{th}$ step is greater than a width of the cleaning device, the cleaning device to translate for a first distance in a direction away from the first surface of the N+1$^{st}$ step, and then controlling the cleaning device to move backward or turn around to continue to clean the second surface of the N$^{th}$ step.

15. The method according to claim 1, wherein the cleaning device further comprises:

a body;

a first water inlet disposed at a bottom of the body;

a filtering unit at least partially disposed inside the body;

a first water outlet disposed at a top of the body;

a suction mechanism at least in fluid communication with the first water inlet, the filtering unit, and the first water outlet to form a water flow, wherein the water flow flows through the first water inlet, the filtering unit, and the first water outlet;

at least one roller brush assembly disposed at a bottom of a front portion of the body and configured to clean a to-be-cleaned surface;

a moving mechanism disposed on each of two sides of the body and configured to allow the cleaning device to move on the to-be-cleaned surface; and at least one second distance sensor disposed on a first side surface of the body and configured to detect a distance between the first side surface of the cleaning device and an obstacle, wherein the first distance sensor is adjacent to the moving mechanism and is located behind the at least one roller brush assembly.

16. The method according to claim 15, wherein the first water inlet is located behind the at least one roller brush assembly, and the first distance sensor is located between the first water inlet and the at least one roller brush assembly.

17. The method according to claim 15, wherein the first distance sensor is centered at a front end of the bottom of the cleaning device.

18. The method according to claim 16, wherein the cleaning device comprises two first distance sensors, wherein the two first distance sensors are substantially symmetrically disposed at the bottom of the body, and the two first distance sensors are sensors of a same type or sensors of different types.

19. The method according to claim 16, wherein the cleaning device further comprises at least one third distance sensor, wherein the at least one third distance sensor is disposed at the front portion of the body and configured to detect a distance between the front portion of the cleaning device and an obstacle.

20. The method according to claim 16, wherein at least one transmission channel is disposed inside the body, wherein a first opening located at the bottom of the body and a second opening located inside the body are disposed on two sides of the at least one transmission channel, and the first distance sensor is adjacent to the second opening.

21. The method according to claim 1, wherein the method further comprises:

after the cleaning device moves to a second surface of an N$^{th}$ step, controlling the cleaning device to move in a length direction of the second surface of the N$^{th}$ step to clean the second surface of the N$^{th}$ step, wherein N>1 and N is a natural number; and after the cleaning device moves to a second surface of an N+1$^{st}$ step, controlling the cleaning device to move in a length direction of the second surface of the N+1$^{st}$ step to clean the second surface of the N+1$^{st}$ step, wherein a direction in which the cleaning device moves in the length direction of the second surface of the N$^{th}$ step is opposite to a direction in which the cleaning device moves in the length direction of the second surface of the N+1$^{st}$ step.

* * * * *